US012782700B2

(12) United States Patent
Hart et al.

(10) Patent No.: US 12,782,700 B2
(45) Date of Patent: Nov. 3, 2026

(54) KERATOSCOPE RELAY MECHANISM FOR AN OCT SCANNER ADAPTER

(71) Applicant: Leica Microsystems NC, Inc., Durham, NC (US)

(72) Inventors: Robert H. Hart, Deerfield, IL (US); Mehran Ghofrani, Deerfield, IL (US)

(73) Assignee: LEICA MICROSYSTEMS NC, INC., Durham, NC (US)

( * ) Notice: Subject to any disclaimer, the term of this patent is extended or adjusted under 35 U.S.C. 154(b) by 303 days.

(21) Appl. No.: 18/585,247

(22) Filed: Feb. 23, 2024

(65) Prior Publication Data

US 2024/0310615 A1 Sep. 19, 2024

(30) Foreign Application Priority Data

Feb. 24, 2023 (EP) .................................... 23158510
Feb. 24, 2023 (EP) .................................... 23158559
Feb. 24, 2023 (EP) .................................... 23158561
Mar. 3, 2023 (EP) .................................... 23159969

(51) Int. Cl.
*G02B 21/00* (2006.01)

(52) U.S. Cl.
CPC ..... *G02B 21/0032* (2013.01); *G02B 21/0028* (2013.01); *G02B 21/0056* (2013.01); *G02B 21/008* (2013.01)

(58) Field of Classification Search
CPC ................ G02B 21/00; G02B 21/0032; G02B 21/0028; G02B 21/0056; G02B 21/008; G02B 21/0048; G02B 21/0012; G02B 26/10; G02B 26/26101; A61B 5/00; A61B 5/0066; A61B 3/10; A61B 3/102; A61B 3/101; A61B 3/1015; A61B 3/1035;

(Continued)

(56) References Cited

U.S. PATENT DOCUMENTS

2012/0197102 A1 8/2012 Hanebuchi et al.
2014/0055749 A1* 2/2014 Zhou .................... G01J 1/0437 351/214
2015/0062531 A1 3/2015 Buckland (Continued)

FOREIGN PATENT DOCUMENTS

DE 102015011334 A1 3/2017
JP 2023/025820 A 2/2023

*Primary Examiner* — Jie Lei

(74) *Attorney, Agent, or Firm* — LEYDIG, VOIT & MAYER, LTD.

(57) ABSTRACT

A keratoscope relay mechanism for an OCT scanner adapter is configured as a microscope accessory for a microscope. The relay mechanism includes a plurality of light emitting diodes (LEDs) including a ring arrangement, the LED ring arrangement forming a keratoscope ring replicating an arrangement of a plurality of keratoscope LEDs of the microscope; a pair of photo detectors, each photo detector aligned with a different LED of the microscope keratoscope LEDs, at least one of the different microscope keratoscope LEDs being activated in a fixation keratoscope mode; and a light sealing gasket including two apertures aligned with the photo detectors. Based on the photo detectors detecting a keratoscope state of the microscope keratoscope LEDs, a corresponding keratoscope state of the LEDs of the keratoscope ring is activated.

11 Claims, 29 Drawing Sheets

(58) Field of Classification Search
CPC ....... A61B 3/0008; A61B 3/0091; A61B 3/14; A61B 3/12; A61B 3/145
USPC ............... 359/387, 368, 369, 385, 434, 513; 351/205, 206, 210, 212, 219, 214, 246, 351/247
See application file for complete search history.

(56) References Cited

U.S. PATENT DOCUMENTS

2016/0038024 A1 2/2016 Zhou et al.
2017/0215726 A1 8/2017 Spasovski et al.
2019/0254515 A1* 8/2019 Zhang .................. A61B 3/0008

* cited by examiner

702a

21

KERATOSCOPE RELAY MECHANISM FOR AN OCT SCANNER ADAPTER

CROSS REFERENCE TO RELATED APPLICATIONS

This application claims benefit to the following European Patent Application Nos.: i) EP 23158510.0, filed on Feb. 24, 2023, ii) EP 23158559.7, filed on Feb. 24, 2023, iii) EP 23158561.3, filed on Feb. 24, 2023 and iv) EP 23159969.7 filed on Mar. 3, 2023, the entire disclosures of which are hereby incorporated by reference herein.

FIELD

The present disclosure relates to a keratoscope relay mechanism for an optical coherence tomography (OCT) scanner having a compact design suitable for mounting to the undercarriage of a microscope and related aspects.

BACKGROUND

OCT is performed using an optical instrument which allows the generation of a cross-sectional image of biological tissue. It is possible to achieve axial resolutions well below 8 microns using monochromatic light having a constant phase difference which allows OCT scans to be useful in probing living tissue (in vivo) as well as in other applications. As OCT scans cannot necessarily penetrate to a great depth they are particularly useful for probing skin tissues and in ophthalmology. To generate an image with depth information, the OCT scanner generates a number of one-dimensional scans, known as A-scans, are performed along a scan line and when stacked together these A-scans create a two-dimensional image, known as a B-scan. By acquiring B-scans sufficiently closely and rapidly a volumetric image of a OCT probed sample tissue can also be obtained.

To generate three-dimensional images, OCT scanners scan a sample using a beam path across two dimensional spatial locations. Such scanning systems known in the art typically use orthogonal galvanometer mirrors to address the desired two dimensional spatial locations of the sample. To avoid Petzval curvature of the resulting interferometric image plane caused by the spatial separation of the galvanometer mirrors, relay optics may be required to combine the pupil of each scanning mirror to a common pupil which can then be focused to an image plane of common optical path length for each galvanometer mirror. Alternatively, electromechanical 2D scanning mirror systems are also known in the art which use a single pupil for each scan axis, but these operate at a much reduced scan speed due to physical size restrictions of the technology, making them less desirable than systems which can scan at higher speeds.

OCT scanners are available for use in a variety of surgical procedures where depth information is advantageous. For surgical procedures on small areas, or where access to the tissue region being operated on is restricted, for example when using OCT scanners during eye surgery, the form factor of the OCT scanner needs to be very different from the form factor of an OCT scanner where access is not restricted or no access is required to the region being probed by the OCT scanner whilst the OCT scan is ongoing.

Scanning systems typically use two orthogonal galvanometer mirrors separated in space to address the desired 2D spatial locations of a sample. In order to produce a flat tomographic image plane, the spatial separation of the galvanometer mirrors require relay optics which combine the pupil of each scanning mirror to a common image pupil. However, known systems have large formats as a result and such multi optical element scanner designs are less desirable for intraoperative systems requiring a minimal sterile field volume.

It is known for OCT systems which depend on galvanometric scanning mirrors due to their fast response times to use integrated optical feedback so that closed loop operation is possible. Two axis scanning requires two galvanometric scanning mirrors, one for each scanning axis, and which must be spatially separated due then to mechanical limitations. For 2D scanning mirrors such as MEMS devices an orthogonal angle of incidence is typically used to avoid geometric distortions in the resultant scan patterns.

The use of OCT scanners when performing surgical procedures creates additional design constraints for the form factor of the OCT device. On such limitation is a physical limitation on the size of the combined microscope and OCT adapter. For example, the overall height of the OCT device and any attached microscope being used by a surgeon performing a surgical procedure is limited by design so that a surgeon can view the area being scanned through the microscope whilst still accessing the area under the OCT/microscope using surgical tools for performing the surgical procedure.

Micro-electromechanical systems (MEMS), based optically reflective devices can be used to reduce the physical size restrictions of scanning mirror assembly and support higher scan rates but with much smaller clear apertures. Small clear aperture optical designs for OCT applications have been used in the past though with either low numerical apertures resulting in low lateral resolution at the image plane or complicated design results due to the use of convergent light beams incident on small aperture MEMS mirrors.

In applications such as metrology or intraoperative OCT, which benefit from a flat tomographic image plane, the spatial separation of the galvanometer mirrors require relay optics to combine the pupil of each scanning mirror to a common pupil which is then focused to an image plane. This results in large format, multi optical element scanner designs which are less desirable for intraoperative systems requiring a minimal sterile field volume. Optical designs based on small aperture reflective scanners result in low numerical aperture designs resulting in low lateral resolution or complicated optical designs due to the use of convergent light beams at high incident angles on small aperture MEMS mirrors.

The design of OCT scanning systems for surgery is accordingly subject to a variety of design constraints, particularly OCT scanning systems for eye surgery where the OCT light must access the eye interior via the pupil of the eye. Using an OCT scanner during eye surgery may impose a variety of design constraints which may be in tension with each other. In order to keep the microscope height, or other dimension of the device between the surgeon and the orientation of the tissue being operated on and depending on the form factor of the microscope, as short as possible, it is known in the art to replace the microscope objective lens with an objective lens which is part of an OCT scanner system. The OCT scanner system objective lens is aligned with the optical channel of the microscope optics and this allows the OCT scanner to use the same focal plane as the microscope uses. However, known OCT microscope adapter systems such as the Leica EnFocus™ scanner, have a form factor which currently adds around 50 mm or so at best to the stack height of the microscope when they are attached. The scanner is under carriage mounted with a side entering optical path reflected to the focal plane via a beam splitter set at an angle of incidence of 38 degrees, through the centre of the objective lens which results in a parallax alignment relative to the ocular optical channels and a large stack height due to the size and angle of incidence of the required beam splitter.

The inventors of the present application recognize that it is desirable accordingly to improve the optical design of OCT adapters allow for a more compact form factor both laterally and vertically. By vertically minimising the height of the microscope and OCT adapter assembly when they are fixed to each other, and by keeping the OCT adapter laterally to within the footprint of the microscope, more access to the area being probed by the OCT scan whilst a scan is ongoing may be provided. Advanced functionality contained in current ophthalmic surgical microscopes often includes a Keratoscope illumination source mounted concentric to the objective lens mounted on the undercarriage of the surgical microscope. This light source can consist of a series of individual LEDs arranged in a circle of a slightly larger diameter than that of the objective lens that project light onto the cornea of a patient under treatment. When imaged through the microscope, the ring of light forms a corresponding reflection from the surface of the cornea. Given that the geometric pattern from the Keratoscope illumination LEDs is circular, the corresponding shape of the surface reflection from the cornea is indicative of the cornea curvature itself.

Current under carriage mounted OCT scanners however obscure the keratoscope illumination and thus render the functionality unusable.

SUMMARY

In an embodiment, the present disclosure provides a keratoscope relay mechanism for an OCT scanner adapter configured as a microscope accessory for a microscope. The relay mechanism includes a plurality of light emitting diodes (LEDs) including a ring arrangement, the LED ring arrangement forming a keratoscope ring replicating an arrangement of a plurality of keratoscope LEDs of the microscope; a pair of photo detectors, each photo detector aligned with a different LED of the microscope keratoscope LEDs, at least one of the different microscope keratoscope LEDs being activated in a fixation keratoscope mode; and a light sealing gasket including two apertures aligned with the photo detectors. Based on the photo detectors detecting a keratoscope state of the microscope keratoscope LEDs, a corresponding keratoscope state of the LEDs of the keratoscope ring is activated.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
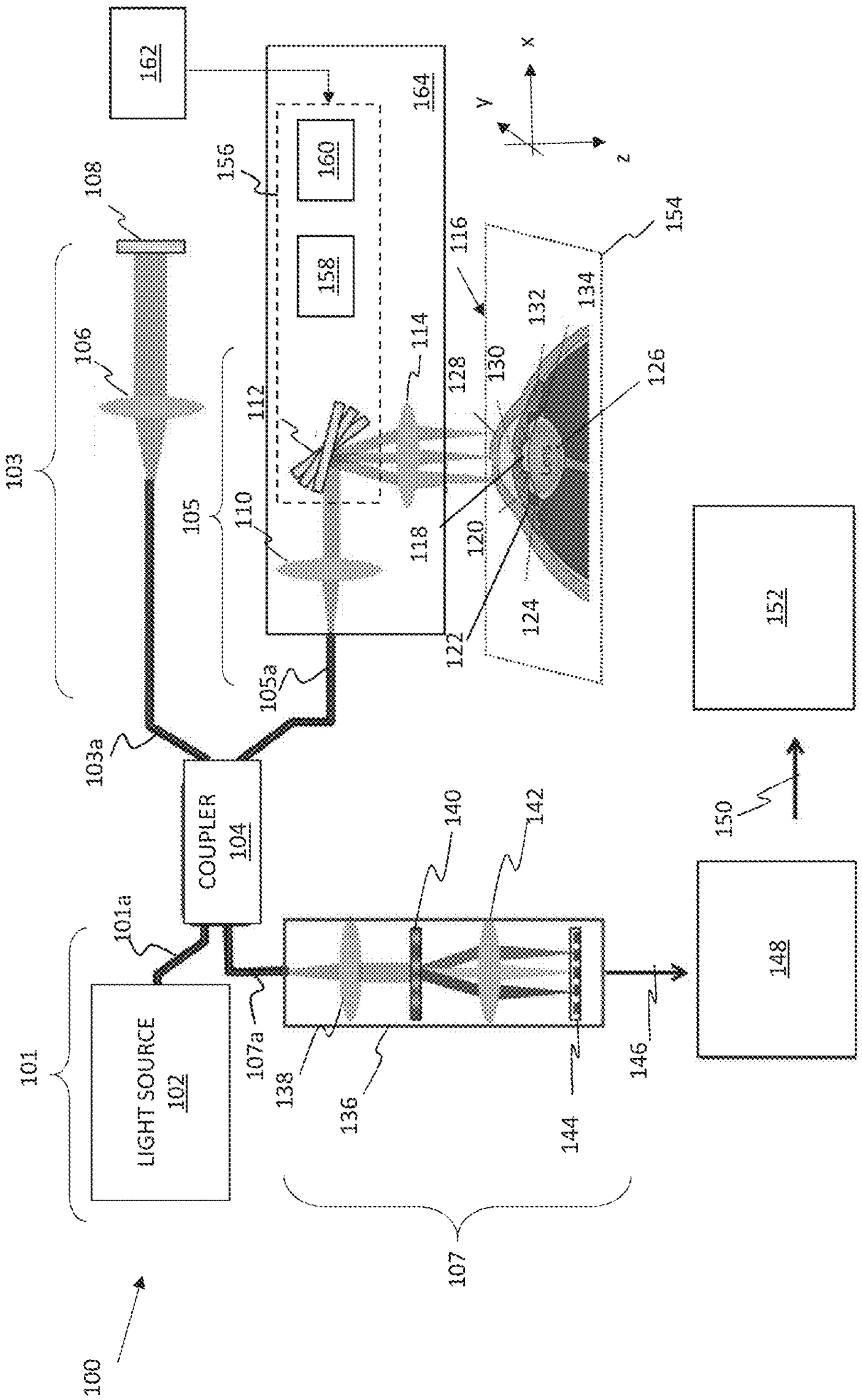
FIG. 1 shows schematically the basic principles of a spectral domain OCT system.

The following summary statements set out features, which may be preferred features in some embodiments, of the present invention.

Embodiments of the present invention can mitigate or obviate at least some of the above mentioned design limitations of known OCT scanner adapters for microscopes. For example, in an embodiment a keratoscope relay can automatically activate a keratoscope mode of a compact OCT scanner adapter to emulate the keratoscope mode activated on the microscope.

Example embodiments of the disclosed OCT scanner adapters are able to be under carriage mounted as an accessory to a microscope such as a surgical microscope and in some embodiments are provided with a keratoscope relay. The Keratoscope relay capability retains complete functionality of a microscope keratoscope while also providing completely seamless operation, as there is no need to send any control signals or commands to activate the keratoscope between the surgical microscope and the OCT scanner adapter.

Advantageously, the embodiments of the present invention can enable a compact OCT scanner having an improved MEMS-based optical design for a scanning mirror assembly suitable for OCT scanner applications to be used with keratoscope functionality.

A first aspect of an embodiment of the present invention comprises a keratoscope relay mechanism for an optical coherence tomography, OCT, scanner adapter configured as a microscope accessory for a microscope where the relay mechanism comprises a plurality of light emitting diodes, LEDs, having a ring arrangement, the LED ring arrangement replicating an arrangement of keratoscope LEDs of the microscope, a pair of photo detectors, each photo detector aligned with a different LED of the microscope keratoscope LEDs, at least one of the different microscope keratoscope LEDS being activated in a fixation keratoscope mode, and a light sealing gasket comprising two apertures aligned with photodetectors, wherein responsive to the photodetectors detecting a keratoscope state of the microscope keratoscope LEDs, a corresponding keratoscope state of LEDs the keratoscope ring is activated.

In some embodiments, the ring is provided around an objective lens of the OCT scanner adapter, wherein the objective lens functions as a microscope objective lens when the OCT scanner adapter is attached to the microscope.

In some embodiments, the photodetectors are aligned with orthogonally spaced LEDs of the microscope. By detecting when the orthogonally spaced LEDs of the microscope are activated there is less chance of light leaking from one of the gasket apertures and causing the photodetector aligned with the other gasket apertures from accidentally activating and triggering a wrong keratoscope mode on the OCT adapter ring.

In some embodiments, a corresponding keratoscope state of LEDs of the keratoscope ring which is activated based on the photodetectors detecting a corresponding state of the keratoscope LEDs on the microscope comprises one of the following keratoscope states, a keratoscope off-state, a keratoscope fixation mode state, a keratoscope full illumination state, and another type of keratoscope on-state.

Examples of the other type of keratoscope on-state include a flashing LED on-state or a change of colour on-state of the LEDs.

Another aspect of an embodiment of the present invention comprises an optical coherence tomography, OCT, scanner adapter configured as a microscope accessory for a microscope, the scanner adapter including a keratoscope relay mechanism according to the first aspect or any of its embodiments disclosed herein.

In some embodiments, the keratoscope relay mechanism comprises a plurality of light emitting diodes, LEDs, having a ring arrangement around an objective lens of the OCT scanner adapter, the LED ring arrangement replicating an arrangement of keratoscope LEDs around an objective lens of the microscope, a pair of LED light detectors located at different point around the LED ring, a gasket which prevents keratoscope LED light from the microscope entering the objective lens of the OCT scanner adapter, the gasket comprising two apertures aligned with photodetectors via which microscope keratoscope light is detectable by the photodetectors, where responsive to a keratoscope state of the microscope keratoscope LEDs being detected by the photodetectors, a corresponding keratoscope state of the keratoscope ring of the OCT scanner adapter is activated.

In some embodiments, the OCT adapter comprises a housing, a plurality of optical components contained in the housing, the optical components comprising at least a scanning mirror assembly, a folding mirror, a beam splitter and an objective lens, wherein the beam splitter and folding mirror are arranged to direct a scanning light beam emerging from the scanning mirror assembly through the objective lens offset from the central optical axis of the objective lens.

In some embodiments, the objective lens is configured to be collinear with an optical channel of the microscope when the OCT scanner adapter is attached to an undercarriage of the microscope.

In some embodiments, the optical components are housed within a housing having a height, h2, less than 40 mm.

In some embodiments, the optical components are housed within a housing having a height, h2, of about 36 mm.

In some embodiments, the OCT scanner adapter is configured as an accessory for a surgical microscope used for eye surgery.

In some embodiments, the OCT scanner adapter comprises features from or forming any one of the embodiments of an OCT scanner adapter disclosed herein.

In some embodiments, the OCT scanner adapter forms part of a scanning or probe arm of an OCT scanning system according to any one of the embodiments of an OCT scanning system disclosed herein.

Advantageously, embodiments of the disclosed OCT scanner adapter may include an example embodiment of a MEMS scanning mirror assembly having a design according to an embodiment disclosed. Such a design may limit the lateral size of the OCT adapter to below the footprint of a surgical microscope optics carrier housing.

Advantageously, embodiments of the disclosed OCT scanner adapter may include an example embodiment of a compound angle beam-splitting arrangement having a design according to an embodiment disclosed. The OCT beam-splitting arrangement allows the attached OCT scanner objective lens to be vertically highly compact which reduces the height of the OCT scanner adapter.

This is useful when eye surgery requires the surgeon to use the microscope or similar device to generate an enlarged image of the area of operation using microscope optics so that the surgeon is able to better see the area being operated on whilst still keeping the patient within the surgeon's arm's reach.

In other words, some embodiments of the OCT scanner system design disclosed herein result in a combined stack height of the microscope and attached OCT adapter which is far shorter than previously possible. The design better balances the design constraints and allows a surgeon to view an area being scanned by the OCT scanner via an eye piece or eye pieces of the microscope and keep the area being scanned in the focal plane of the microscope optics whilst still allowing the surgeon to physically reach the scanned area to perform a surgical operation.

Other aspects of embodiments of the present invention can provide additional benefits. For example, some embodiments of the OCT scanner adapter use a closed-loop feedback system to increase the B-scan rate of the OCT scanning system which allows for live stream of OCT video to be generated which may be particularly useful when the OCT scanner adapter is attached as an accessory to a surgical microscope as it allows live feedback on the region being scanned whilst an operation is ongoing.

Some embodiments of the scanning mirror assembly reflects the beam used for feedback on the scanning mirror position in the feedback system in a different optical plane from that used by the OCT scanning beam which may reduce the likelihood of returned light from the feedback arm contaminating the mirror position reference beam or its optical source or contaminating the OCT scanning beam and enables a high signal to noise to be achieved when detecting the mirror positioning beam.

The above aspects and/or examples disclosed herein above and later below may be suitably combined with each other as would be apparent to anyone of ordinary skill in the art.

The detailed description set forth below provides examples of embodiments of the present invention which are explained in sufficient detail to enable those skilled in the art to put embodiments of the present invention into practice.

There are two forms of OCT scanning, time-domain OCT (TD-OCT) and spectral domain OCT (SD-OCT). SD-OCT uses spectral interrogation of the spectrum at the OCT interferometer output.

FIG. 1 schematically shows the principles of operation of an example spectral domain optical coherence tomography, SD-OCT, interferometer scanner system 100 which comprises some examples of embodiments of the present invention.

In the example SD-OCT system 100 illustrated in FIG. 1, the SD-OCT system 100 may be used to generate optical coherence tomograms of in-vivo tissue samples 116, such as of a human eye, by using an OCT light scanning beam to probe within the tissue sample 116.

It will be apparent that the system 100 is illustrated in FIG. 1 schematically and is not drawn to scale. The position of various components and their relative sizes of the SD-OCT system 100 shown in FIG. 1 do not necessarily reflect their real or relative positions or sizes in example embodiments of the present invention.

In the following, references to an OCT scan image or image data may refer to a one-dimensional A-scan or to a two-dimensional B-scan comprising a plurality of A-scans or to a volumetric scan image comprising a plurality of B-scans where appropriate as would be apparent to someone of ordinary skill in the art.

As illustrated in FIG. 1, SD-OCT system 100 comprises a low coherence broadband optical scanning light source 102. Scanning light source 102 is suitably connected to a coupler 104 configured to split light from the light source 102 into a OCT light reference beam which follows an optical path 103*a* along reference arm 103 and an OCT light probe or scanning beam which follows an optical path 105*a* along OCT probe arm 105. OCT light returned along the reference and probe arms 103, 105 will have different phase shifts which generates interference when the returned light is recombined at the coupler 104. The combined light signal is output from the coupler along detection or output arm 107 and the light interference pattern is detected using a spectrometer 136. The output light signal 146 from spectrometer 136 is then processed by an image processor 148, for example, to apply a Fourier transform to the output light signal 146, which generates OCT scan data which can then be displayed on a suitable display 152.

The different phase shifts between the reference arm returned OCT light and the OCT returned from the probe arm which result in the interference pattern detected, arise because the OCT light is returned from one or more different structures at different depths on or within the scanned tissue sample 116. In some embodiments, the scanned tissue sample may instead comprise a different type of object of interest 112 to an in-vivo tissue sample located in an area of the human body.

The phase shift which generates the interference is affected by the different depths at which the OCT light is returned by structures within the sample scanned. The interference from the phase shift allows the signal output 146 of the spectrometer 136 to be used to generate images known as tomographs which provide a visual indication of the depth of one or more such structures in the scanned or probed area and their location in the scanned or probed area.

In some embodiments of the SD-OCT system 100 shown in FIG. 1, the broadband OCT light source 102 has a central wavelength of 860 nm over a bandwidth of 100 nm. In some embodiments, more than one light sources 102 is used to provide the broad-band low coherence OCT scanning light over a desired bandwidth.

The probe OCT beam is returned after it has been back-scattered or reflected or otherwise returned from any structures at a certain depth in the area 116 including the tissue sample being scanned. In some embodiments, one or more or all of the optical paths 101*a*, 103*a*, 105*a*, 107*a*, are provided using suitable single-mode optical fibres and may include one or more sections where a beam following the optical fibre travels in free space.

In the embodiment of the SD-OCT system 100 illustrated schematically in FIG. 1, the reference beam emerges from the coupler 104 and passes along the reference arm 103 via a collimator lens 106 before it is reflected by a translating reference mirror 108 and returned towards coupler 104 along the reference arm 103. The optical path 103*a* along the reference arm 103 and the optical path 105*a* along the probe arm 105 towards the focal plane 154 illuminating the sample or other object of interest being scanned are configured with equivalent optical path lengths. Based on the detected interference between the returned reference beam light and the returned OCT probe beam light when recombined at coupler 104, the depth(s) of any structure(s) within the sample that have back-scattered or reflected or otherwise returned the probe beam light can be determined by outputting the detected interference signal 146 to an image processor 148.

In some embodiments, the interference between the returned reference beam and returned OCT probe beam light which occurs along the output arm 107 is measured using a suitable spectrometer 136 such as that shown in FIG. 1 to determine the depth of the cross-sectional image being scanned. Other embodiments of the OCT system 100 may use other techniques to measure interference and generate output signal 146.

In some embodiments of the OCT system 100, one or more or all of the optical paths 101*a*, 103*a*, 105*a*, 107*a*, comprise suitable single-mode optical fibres and/or include one or more sections where an outward or inward (relative to the coupler 104) OCT beam following an optical fibre travels in free space.

In some embodiments of the present invention, although the optical path lengths followed by the reference beam and probe beam are matched, the dispersive properties of the optical fibre each beam travels along are configured to differ to improve the removal of a complex conjugate image from the OCT image output and so improve the image quality of the OCT scan image and the speed at which a complex conjugate resolved OCT scan image is obtained.

In some embodiments, the term OCT scan is used herein to refer to a B-scans and volumetric scan images of the tissue area (also referred to herein as a tissue sample) 116 which are generated using the spectral domain, SD-OCT scanner system 100.

In the example shown schematically in FIG. 1 of spectral-domain OCT, the broadband light source 102 generates an OCT probe beam which illuminates an area of tissue 116 which is scanned by the OCT probe beam over a range of near-infra red wavelengths.

The spectrometer 136 shown in FIG. 1 comprises a collimating lens 138 via which returned light passes through a grating 140 to generate a spectrally dependent interference pattern. The interference pattern is focused via an objective lens 142 on line camera 144 and the image signal representing the interference pattern form the output 146 to a suitable image processing system 148. However, another suitable type of interference detector in the output arm 107 may be used in alternative embodiments.

The spectrometer 136 of the embodiment of the SD-OCT system 100 shown in FIG. 1 measures spectral interference in the returned OCT light beam by measuring intensity modulations in the returned light as a function of frequency. The rate of variation of intensity over different frequencies is indicative of the location of the different reflecting layers in the samples.

The OCT probe beam follows an optical path 105*a* from the coupler 104 along the OCT probe branch 105 of the coupler 104 after which it enters an OCT scanner 164. The example OCT scanner 164 shown in FIG. 1 comprises a collimating lens 110, a scanning mirror assembly 310 (shown in FIGS. 3A and 5 for example described later below) including a scanning mirror 112 having a reflective surface 334 (see FIG. 3A or FIG. 5 for example) which deflects the OCT scanning beam out of the scanner 164 via objective lens 114 towards a focal plane 154 in the scanning area 116. The scanning mirror assembly 310 includes a mirror positioning system including a secondary light source 158 which is also reflected by a scanning mirror 112 of a scanning mirror assembly towards the sample area 116 being scanned. The scanning mirror assembly includes a mirror positioning system 156 comprising a light source 158 for detecting the mirror position and a mirror position detector, PSD 160. The OCT scanner 164 also comprises an objective lens 114 which focusses the OCT scanning beam on a focal plane 154 in the area of the tissue or sample 116 being scanned.

The scanning mirror 112 may comprise a microelectromechanical system, MEMS, scanning mirror which is moved angularly by a mirror mover. The movement of the scanning mirror 112 moves the OCT probe beam across the sample or other object of interest being scanned and the resulting interference pattern generated is used to generate an OCT B-scan image from the system output 156.

The movement of the mirror mover is performed under the control of a controller 162. The controller 162 may be located in scanning mirror assembly which includes the scanning mirror 112 or located remotely from it.

The mirror position system 156 shown in FIG. 1 comprises an optical angular displacement mirror position measurement system 156. This provides feedback on the mirror position to a controller and in some embodiments enables closed loop control of the MEMS based scanning mirror position in some embodiments.

As the scanning mirror 112 is moved in use of the OCT scanner 164 by the mirror mover mechanism under the control of the controller 162 to guide the OCT beam along a scan path. After reflection by the mirror 112, the OCT probe beam passes through a telecentric objective lens 114 which focusses the OCT probe beam at different locations in a focal plane 154 at the sample tissue 116 which is being scanned. As shown schematically in FIG. 1, the focal plane 154 is illustrated as lying in a notional x-y plane, with depth information being provided orthogonally along the z-axis.

The telecentric objective lens 114 via which the probe beam passes to reach sample 116 and via which returned probe beam light also passes is shown in FIG. 1 with three example emerging telecentric beams which focus on different locations within the focal plane 154, which lies in the x-y plane as shown in FIG. 1. Each of the example emerging telecentric beams results from a different position of the scanning mirror assembly 112, in other words, FIG. 1 is showing schematically by way of example only three sequential tele-centric beam positions. This is to show schematically how, as a B-scan or volumetric scan progresses, the telecentric OCT scanning or probe beam is moved to illuminate different areas.

The scanned area comprises a sample of tissue 116. In FIG. 1 this comprises tissue of an eye 116 which may be an in vivo or in vitro tissue sample. Other types of human or animal tissue may be scanned in vivo or in vitro in other uses of the OCT scanner system where a OCT scan image may be useful to visualise internal structures at a various depths in the tissue.

For example, as shown in FIG. 1, eye 116 is shown schematically and comprises a pupil 118, surrounded by an iris 120, behind which sits a posterior chamber 122 and zonal fibres 124 and in front of which are the lens of the eye 126 and cornea 128. FIG. 1 also shows the anterior chamber 130 of the eye as well as the ciliary muscle 132 and suspensory ligament 134 which may all be scanned using an OCT-system such as OCT system 100 and shown as internal structures in an tomogram presented on a display 152.

The likelihood of a successful outcome from a surgical procedures performed on tissue such as the human eye, or the eye of another creature, where there is very limited access may be improved by using OCT. The OCT system 100 may be used in some embodiments to create images based on two or three-dimensional scans of region of an eye 116 as it is being operated on and these can be presented in real-time to the person performing the operation. This can allow the depth of any procedure being performed is better understood as the surgery takes place. Providing this depth information for an area subject to a surgical procedure in real-time may help a surgeon avoid making an incision which is too deep (which may damage underlying tissue unnecessarily) or one which is too shallow (in which case the operation may not be a success and/or the tissue being operated on may take longer to heal).

As is shown schematically in FIG. 1, the interference signal output 146 of the spectrometer 136 of the OCT system 100 is subject to post-processing by an image processor 148. For example, the signal output 136 may be image processed using a Fourier transform or other suitable signal transform on the OCT scan. This may initially generate a warped OCT scan image which may then be subject to additional image processing to de-warp the OCT image before the OCT scan image 150 is output to a suitable display 152. Some embodiments of the OCT scanner system 100 may also use image processing to remove complex conjugate artefacts to enhance the depth range of the images obtained.

Display 152 may be part of the apparatus hosting the SD-OCT system 100 performing the image processing or a different apparatus. Some example embodiments of the present invention generate a series of OCT scan images 148 using an OCT probe light beam sufficiently quickly to provide a live-stream video comprising OCT scan images 150 on display 152. Display 152 may be a near-eye display in some embodiments. In some embodiments display 152 may be a large display system comprising a plurality of displays to present information both to the surgeon and/or to others in the operating theatre. A display 152 may be integrated into the SD-OCT system 100 or be external to it.

One or more of the components shown in FIG. 1 forming the OCT scanning system 100 may be housed separately from the optics forming the OCT scanner apparatus 164. By separating out the OCT scanner optics the OCT scanner 164 may have a more compact form-factor. A more compact OCT scanner 164 can be better positioned in close proximity to the sample areas being scanned.

Figures 2A, 2B:
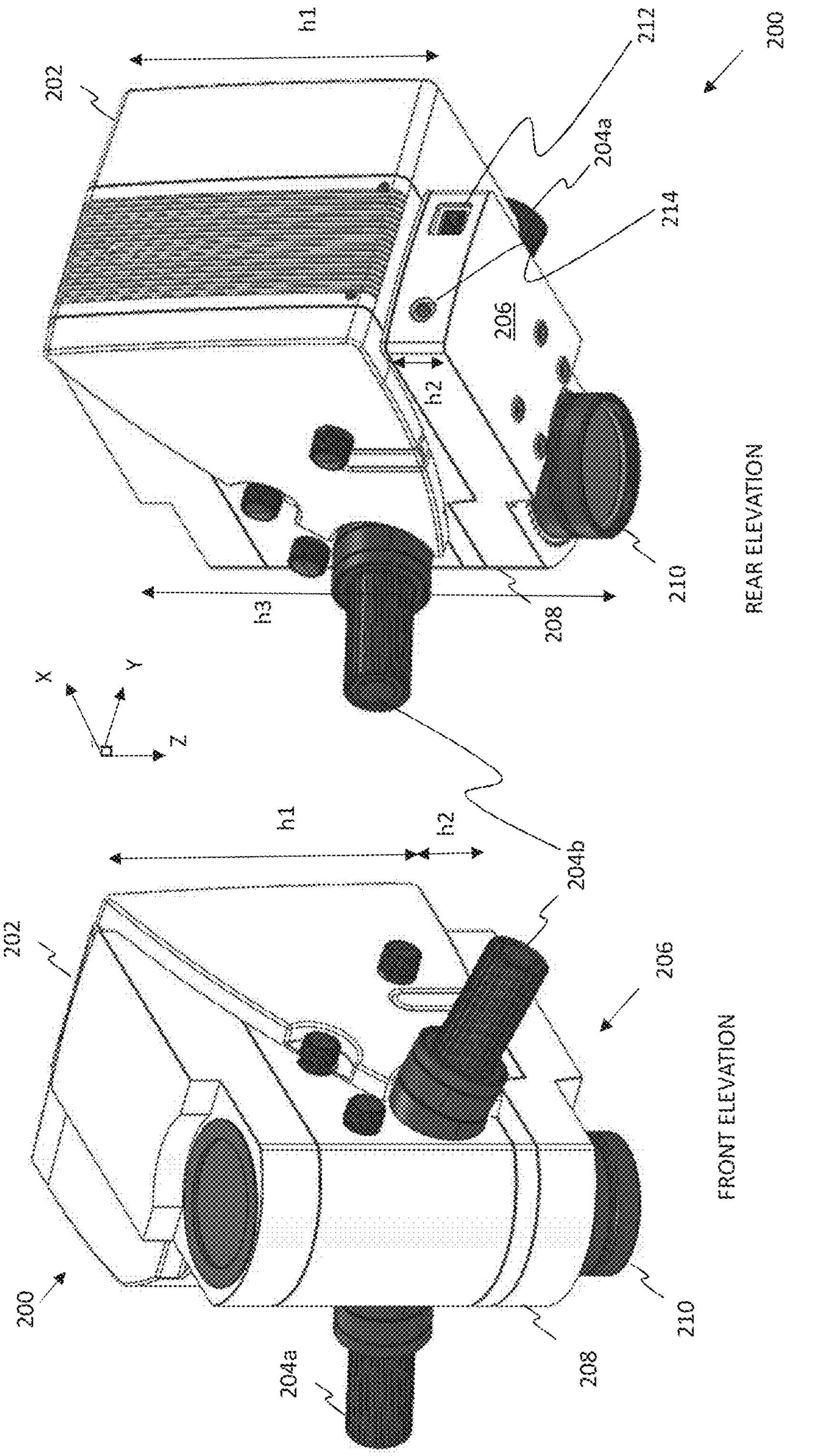
FIGS. 2A and 2B show schematically front and rear perspective views of an OCT scanner adapter for a microscope according to some embodiments of the present invention.

In some embodiments, the OCT scanner system 100 comprises an OCT scanner 164 provided as an adapter for a microscope, for example, the OCT scanner adapter 206 for the microscope 200 shown schematically in FIGS. 2A and 2B. In some embodiments, the microscope 200 comprises a surgical microscope suitable for use during surgical procedures. The housing 202 of the microscope 200 has an undercarriage configured to accept one or more microscope accessories in some embodiments, which allows an OCT scanner adapter 206 to be attached to the under carriage of the microscope housing. The OCT scanner adapter optics objective lens 114, may then also function as the microscope objective lens 210 (see also FIGS. 3A, 3B, and 4 of the drawings).

Example(s) of Microscope System with an OCT Scanner Adapter

FIGS. 2A and 2B show schematically front and rear perspective views of an OCT scanner adapter 206 for a microscope, in other words of an OCT scanner microscope accessory 206, according to some embodiments of the present invention. The term OCT scanner adapter is herein to refers to a OCT scanner adapter microscope accessory. References to the OCT scanner adapter may also refer to an apparatus including an integrated OCT scanner adapter in some embodiments of the present invention.

Figure 3A:
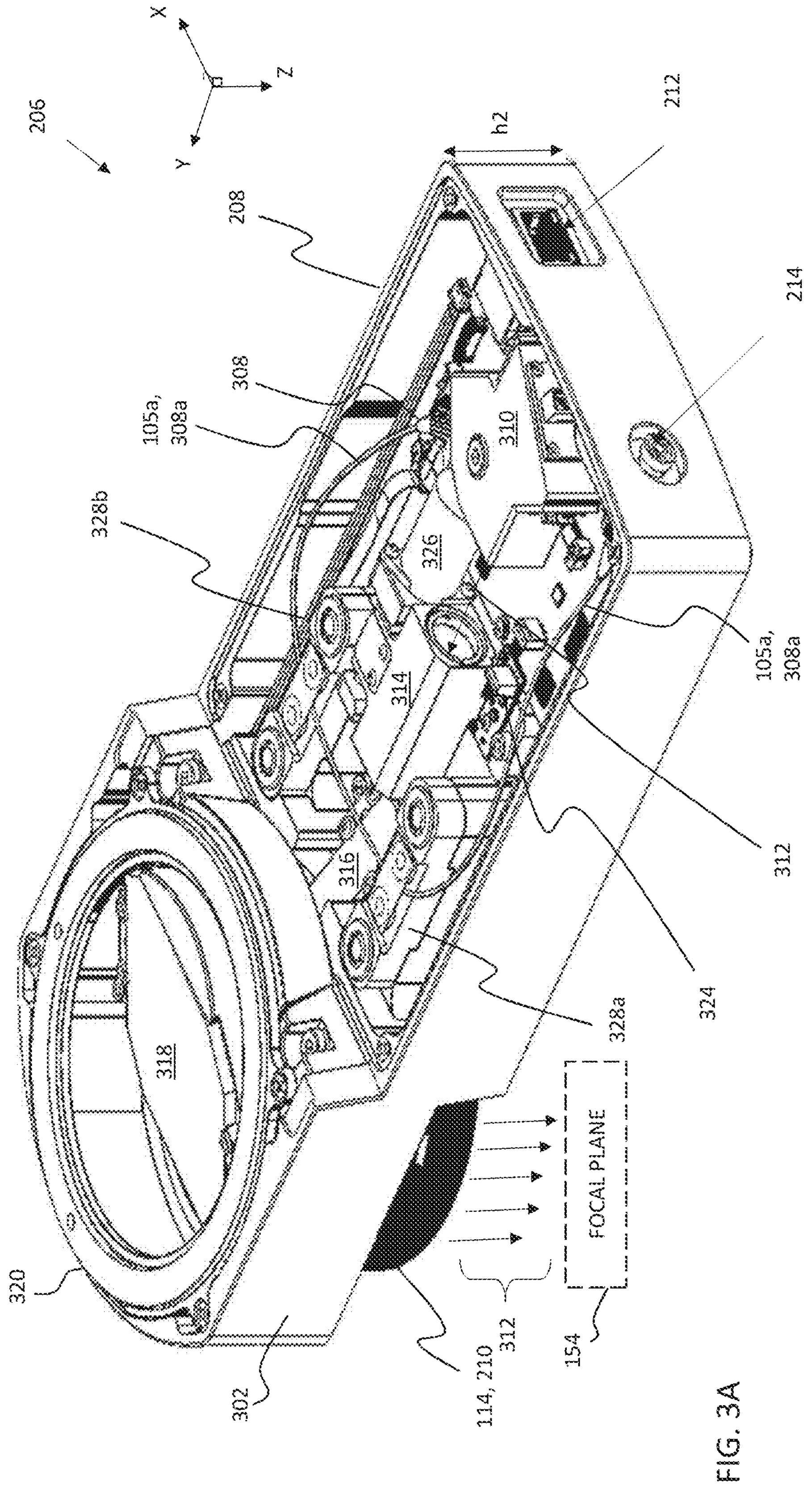
FIGS. 3A and 3B show schematically various views of the components of an example of an OCT scanner adapter according to some embodiments of the present invention.
Figure 3B:
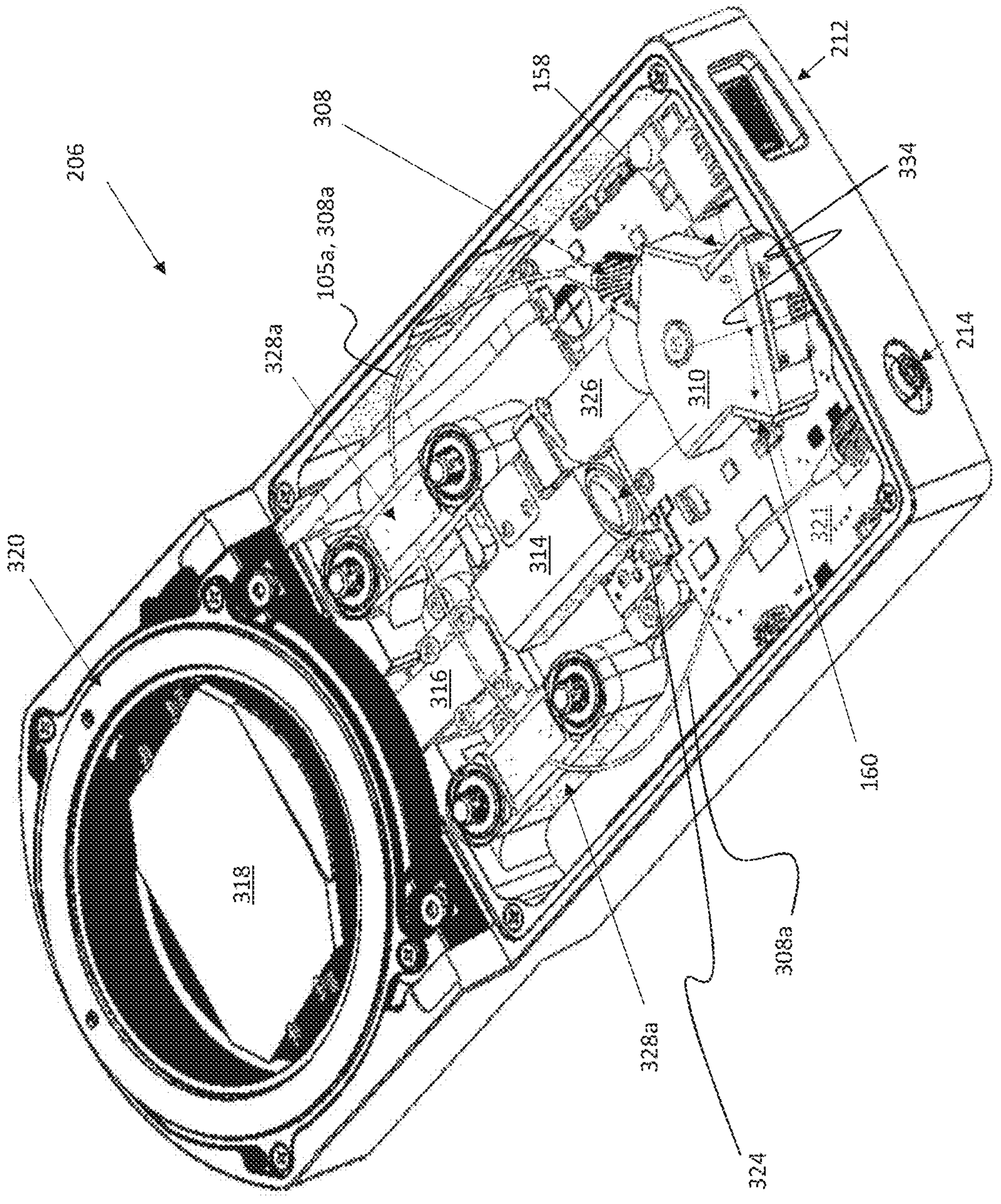
Figure 4:
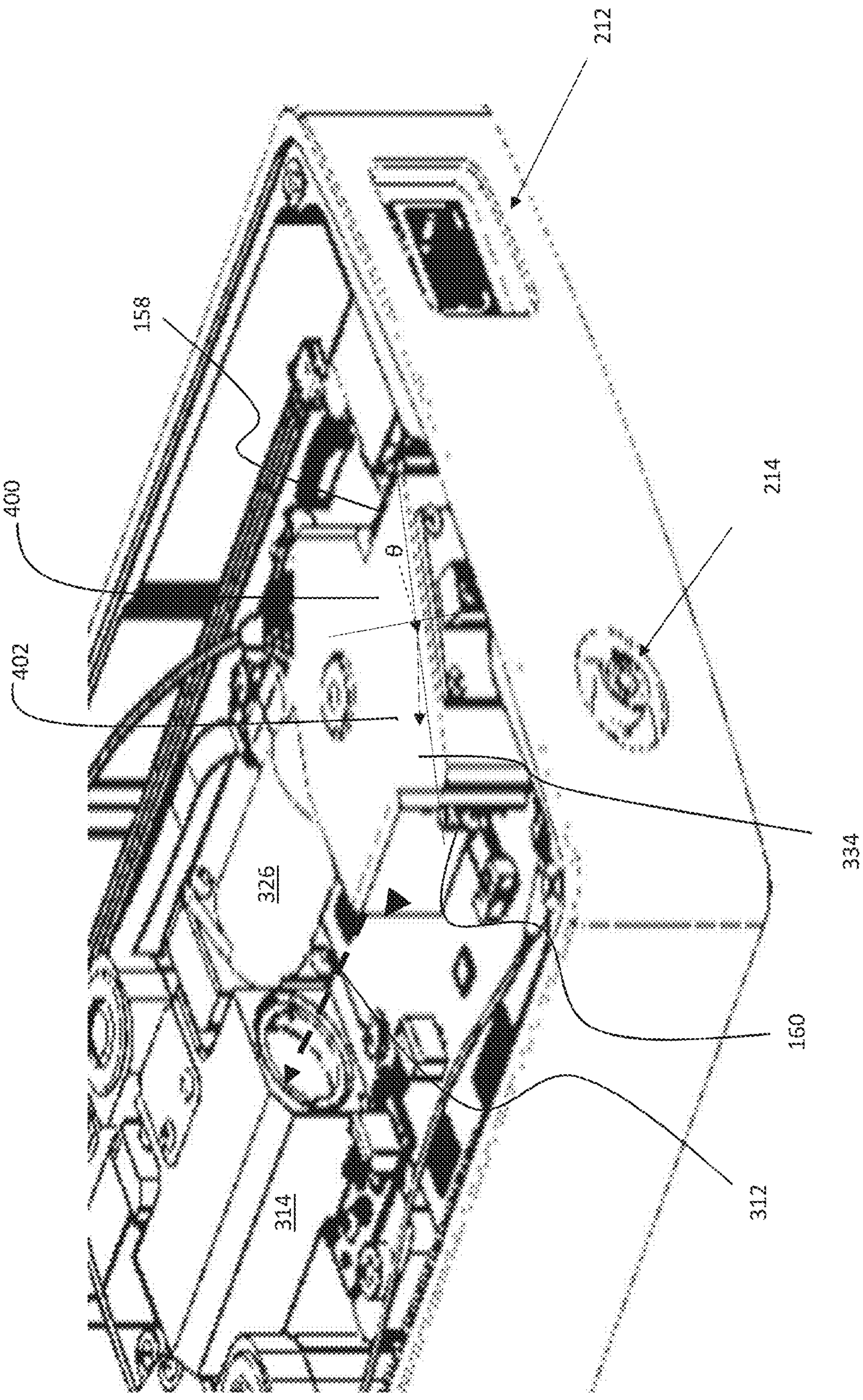
FIG. 4 shows an enlarged view of the OCT scanner adapter shown in FIGS. 3A and 3B.

FIGS. 2A and 2B show how the OCT scanner adapter 206 of FIGS. 3A, 3B and 4 may be fitted to the undercarriage of microscope 200. The OCT scanner adapter 206 microscope accessory may be retrofitted to a microscope 200, for example, by removing any existing microscope accessories from the attachment points located on the undercarriage of the microscope and using their microscope attachment points to instead attach the OCT adapter 206 to the undercarriage of the microscope 200. Once suitably fixed in place, the form factor of the OCT scanner adapter aligns the objective lens 210 with at least one of the optical channels of the microscope optics, for example, a rear channel or a channel used by a microscope camera. In some embodiments, the undercarriage of the OCT adapter may also provide attachment points for accessories to be added.

In some embodiments, the OCT scanner adapter 206 has a form factor which is vertically compact so that it does not add too much height h2 to the microscope height h1 that it is attached to in use. By reducing the additional vertical height h1 of the OCT scanner adapter 206, the ease of access to the scanned area during use of the scanner when generating cross-sectional images of the scanned area 116 whilst the microscope is concurrently used is improved. The OCT scanner adapter 206 is also laterally compact. This means that when attached to the microscope 200 it does not unduly hinder surgical access to the area of tissue being scanned which allows a surgical procedure to be performed at the same time.

In the description below, reference is made to height in the context that an OCT scanner adapter 206 will be used to scan a tissue sample 116 from a location above the tissue sample, such as may result when the OCT scanner adapter 206 is mounted to the undercarriage of the surgical microscope 200.

Some embodiments of the OCT scanner 206 described herein may retain a similarly compact form factor and be used in other contexts. Moreover, the OCT scanner 206 may be provided in some embodiments integrated into another apparatus such as microscope 200. In some embodiments, OCT scanner 206 may be distributed as an optional accessory for such apparatus such that it may be distributed and sold independently of the microscope it is later attached to when in use. Accordingly, unless the context clearly prohibits it, references to height may apply equally to other dimensional directions of the OCT scanner which are substantially or approximately orthogonal to the plane of the OCT objective lens and any apparatus to which the OCT scanner is attached and the orientation of the OCT scanner and microscope stack may differ also depending one or more of a patient orientation and configuration of microscope optics and eyepiece location.

In other words, reference to height in the context of overall "height" is merely based on the assumed orientation of the OCT scanner and microscope relative to a supine patient that when surgery is being performed on the patient. Whilst a patient is supine, a surgeon may access the area being operated on below an embodiment of an OCT scanner adapter 206 according to the present invention whilst at the same time having physical access to the eyepiece of the microscope 200 to which the OCT scanner 206 is attached. This geometric configuration may be varied in some embodiments depending on the configuration of the microscope optics and/or orientation of the patient and/or location of the area being operated on. Accordingly, in the description below references to the height and/or combined stack height of the microscope and OCT scanner adapter 206 may also refer to other dimensions of the microscope and OCT scanner adapter 206 which act as a constraint on the form factor of the OCT scanner where this would be apparent to someone of ordinary skill in the art.

Returning now to FIGS. 2A and 2B, microscope optics housed in a microscope housing 202 form an optical channel providing a view of an area below an objective lens 210 of an OCT scanner adapter 206. In some embodiments, the objective lens 210 provided by the OCT scanner adapter 206 for the microscope 200 comprises objective lens 114 of the OCT scanner system 100 shown schematically in FIG. 1. References to objective lens 210 in the description may accordingly refer to the objective lens 114 of an OCT system 100 which includes a different type of OCT scanner 164 unless the context clearly limits the reference to use of the OCT scanner as an adapter or accessory for a microscope.

In the example embodiment of the OCT scanner adapter 206 shown in FIG. 2A, the OCT scanning optical design has a compact form factor that adds the least possible additional height h2 to the height h1 of the microscope optics housing 202.

Also shown in FIGS. 2A and 2B are microscope handles 204*a, b*, which help position the microscope 200 above the area to be scanned (and viewed). The OCT scanner adapter 206 comprises a housing 208 which is fixed to the under carriage of the microscope 200 as shown. However, as mentioned above, in some embodiments, the OCT scanner adapter 206 may have a different configuration and/or orientation in use. Such different configurations and/or orientations of the OCT scanner adapter 206 in use may also implement the compact principles of the OCT scanner design disclosed herein.

FIG. 2B shows a different, rear elevation, view of the OCT scanner adapter 206 shown in FIG. 2A. The rear elevation view shows a data and/or power port 212, for example, an RSJ45 Ethernet port or USB port, and an optical port 214. Port 212 supplies power to the OCT scanner adapter 206 and in some embodiments may comprise a Power over Ethernet port.

OCT scanning light is returned from the OCT scanner adapter 206 via the optical port 214 in some embodiments to the interferometry components of a OCT scanning system 100 such as that shown in FIG. 1.

For example, in the embodiment of FIG. 1, the returned OCT light from sample 116 passes back via objective lens 210, 114 and is output along the optical fibre 308*a* via the optical port 214. The optical fibre 308*a* and the optical path through the mirror lens assembly and other optical components of the OCT scanner adapter 306 which lie along the optical path followed by the OCT scanning beam towards the sample being scanned accordingly form part of the probe arm 105 of the FD-OCT system 100.

After emerging and illuminating the sample tissue 116 being scanned, OCT light is reflected, back-scattered or otherwise returned. The returned OCT light then passes back through the coupler 104 where it interferes with light returned from reference arm 103. The returned OCT and reference beams then propagate along output arm 107 to spectrometer 136 which outputs the OCT and reference beam light interference signal 136 for image processing in order to generate the OCT imaging data 146 which is presented on display 152.

In some embodiments of the present invention, such as, for example, that shown in FIGS. 1, 2A and 2B, the returned OCT light is exported from the OCT scanner adapter 206 via the optical port 214 to the coupler 104 via which it passes on to spectrometer 136 of the spectral OCT system 100.

The OCT scanner housing 208 including the objective lens 210 adds height h2 to the height h1 of the microscope 200 in the embodiment shown in FIGS. 2A and 2B. The additional stack height introduced by attaching the OCT scanner adapter 206 to the microscope housing 202 H2 is minimised by using an optical design for the OCT scanner optical components inside the OCT scanner adapter 206 according to embodiments of the present invention.

For example, some embodiments of the optical component design of an OCT scanner adapter 206 may have the optical design which is shown schematically in FIGS. 3A, 3B, 4 and 5A and 5B. This optical design lifts the OCT beam emerging from the scanning mirror assembly 310 by a minimal amount up out of the plane of the objective lens 114, 210 before the OCT emerges via the objective lens 114, 120. This allows the additional stack height h2 of the OCT scanner adapter to be less than 40 mm and in some embodiments the additional stack height h2 is 36 mm or less.

It will be appreciated that FIGS. 2A and 2B are not to scale, and that the x-y-z axis shown in the Figures is schematic and illustrative only of the general front and rear perspective views. As shown in FIGS. 2A and 2B, the microscope housing body stack height is h1, and is aligned with the Z axis, whereas the microscope housing base and the OCT scanner adapter 206 is predominantly aligned with the X-Y horizontal plane. The under-carriage mounted OCT scanner system stack height h2 is also aligned with the Z-axis. This results in the full stack height h3 of the body of microscope which houses the microscope optics combined with the under-carriage mounted OCT scanner being determined by h1 and h2. Preferably the combined height h3 of h1+h2=h3 is sufficiently short so that the microscope can be positioned to allow its operation by a user who is also performing surgery on or through an area including the focal plane of the microscope objective lens 210 via which the OCT beam which emerges from the microscope. The OCT optical design allows h2 to be minimised to 36 mm whilst still maintaining a suitable exit beam diameter of, for example, 10.6 mm in some embodiments and still having a stack height of 36 mm or less.

Accordingly, by using an optical design for the scanning mirror assembly optics according to embodiments of the present invention, the combined stack height h3=h1+h2 can be made much shorter than was possible with previous optical design configurations.

By reducing the stack height as much as possible, the microscope can be better positioned for surgery. For example, it may be positioned far enough from an in-focus tissue sample to allow access to the tissue sample being operated on by a user yet close enough to conform with typical human physical form factors. In other words, the OCT adapter height h2 is preferably reduced as much as possible to allow conventional operation of the microscope by the user who is also performing the surgical operation, whilst the microscope is optically focused on a focal plane over the tissue sample using the microscope objective lens 210 of the OCT scanner adapter 206 via which the OCT probe beam is emitted onto the tissue sample.

Some embodiments of the OCT scanner adapter 206 microscope accessory shown in FIGS. 2A and 2B include a scanning mirror assembly 310 (described in more detail below) having a compact optical design which allows h2 to be minimised to 36 mm or less.

For example, in some embodiments, and as describer later below referring to FIGS. 3A, 3B and 4, the OCT scanner adapter 206 comprises an ultra-compact large numerical aperture micro-electro-mechanical system, MEMS, based two-dimensional, 2D, scanning mirror assembly 310 which uses a point source 158 for determining a position of the reflective mirror surface 334 in its optical design using a position sensitive detector 160.

Some embodiments of the OCT scanner assembly using the PSD 160 are able to support very high-speed scan rates, for example, 36000 A-scans per second or higher, where an A-scan is a depth scan at a point in the tissue. Each B-scan is formed from multiple adjacent A-scans of which can be used to generate an image with depth information for the area being scanned in the form of a slice through the sample being scanned to show structures at different depths along the slice. In other words, a B-scan provides information about structures in the z-direction or depth direction along a single linear traversal of the tissue sample, for example, a linear scan along a line definable in x-y coordinates such as those shown schematically in FIG. 1. Some embodiments of the OCT assembly allow very high-resolution images, for example, 400 B-scans per second, to be generated in real-time across the full field of view (FoV) being scanned, which may be for example, a 20 mm×20 mm area or larger. By performing a series of B-scan sufficiently quickly and close to each other across the sample, a three-dimensional volumetric or composite scan can then be formed of the area being scanned and presented on a display 152.

Figure 5A:
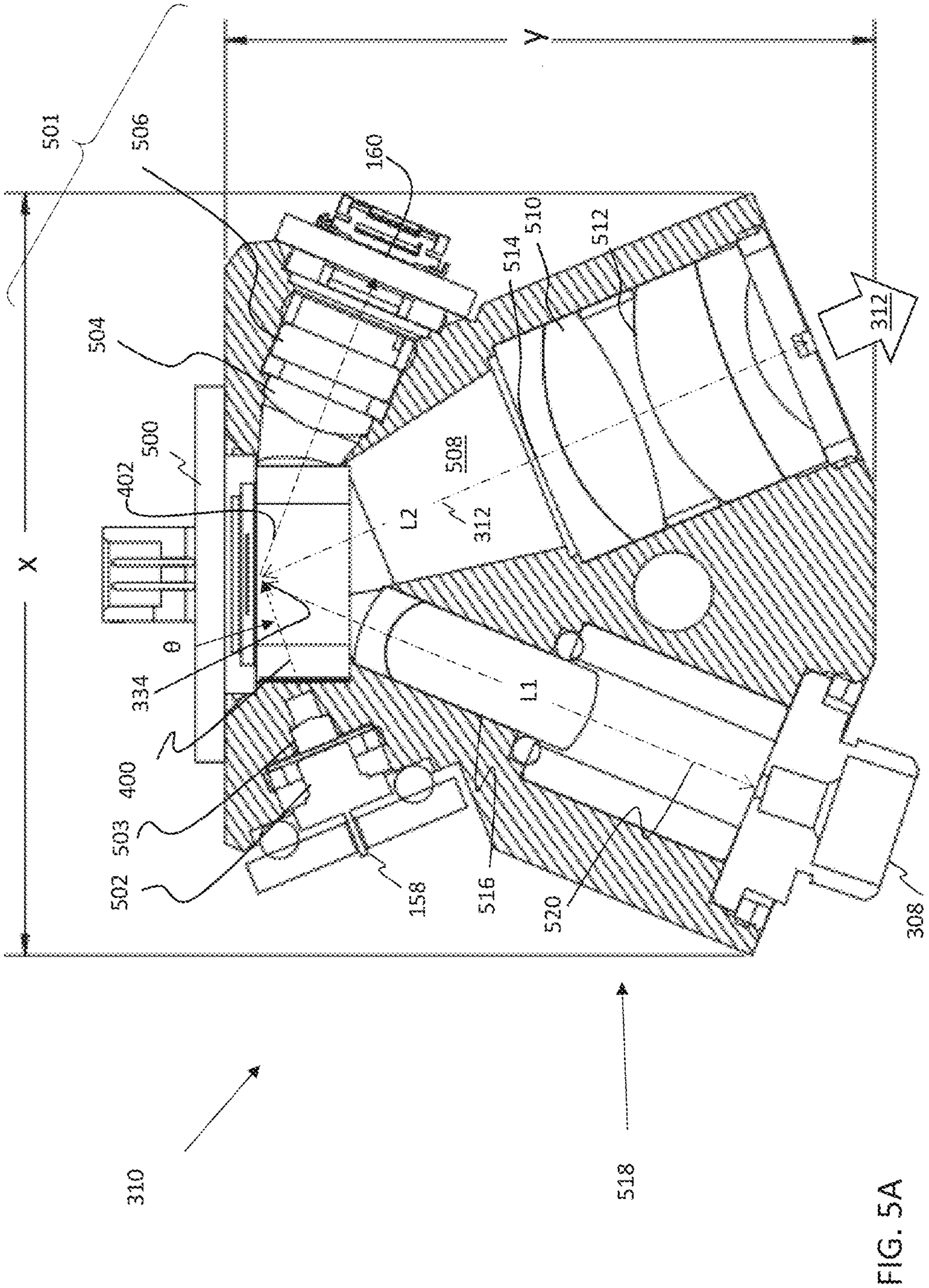
FIG. 5A shows schematically an example of a MEMS scanning mirror assembly optical design according to some embodiments of the present invention.
Figure 5B:
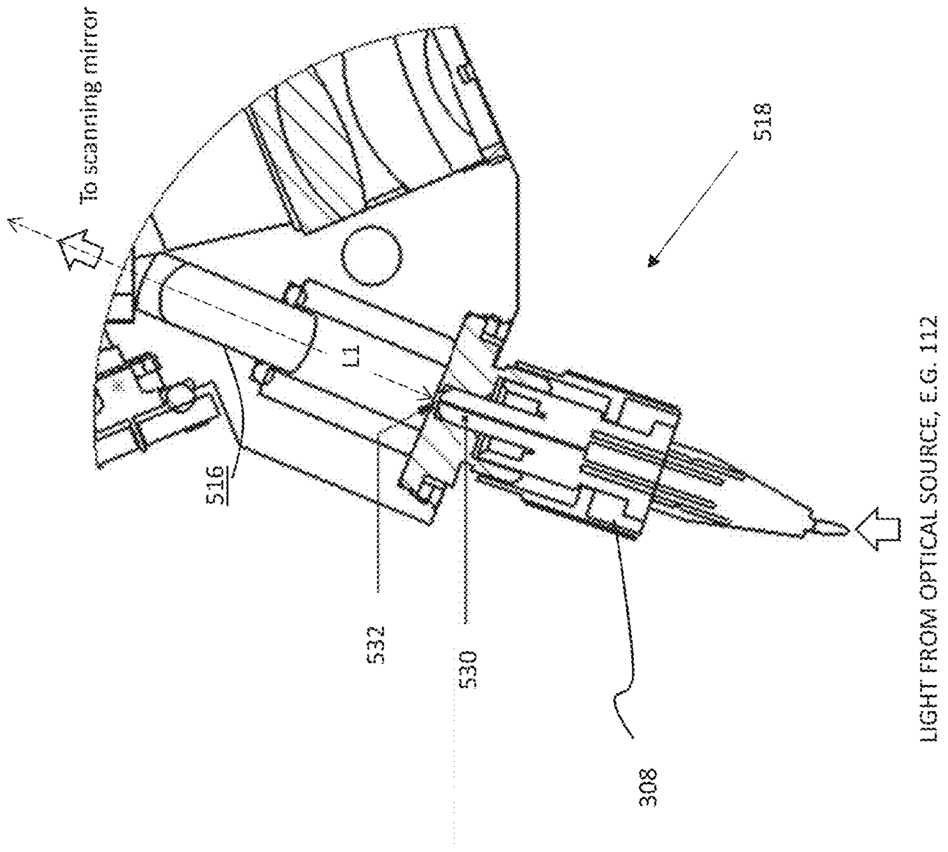
FIG. 5B shows schematically more detail of the input arm of the scanning mirror assembly of FIG. 5A.

The embodiment of the scanning mirror assembly shown as an optical block 310 in FIGS. 3A to 3B, 4, and in more detail in FIGS. 5A and 5B comprises various optical components which are arranged in an optical design configured to reduce the height h2 and lateral footprint of the OCT scanner adapter 206.

Figure 6:
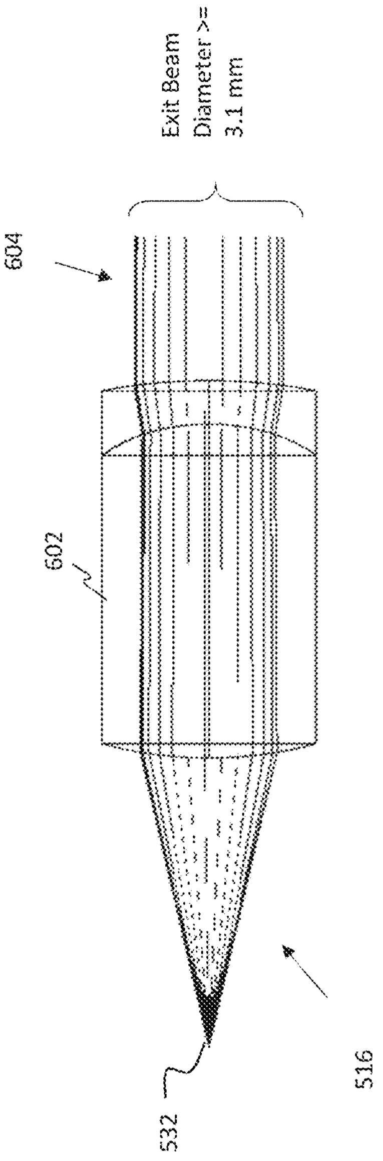
FIG. 6 shows schematically an example of a collimating lens assembly of the input arm of the scanning mirror assembly of FIG. 5A.

Some embodiments of the optical design of the scanning mirror assembly specify one or both of a minimum and a maximum exit beam diameters for one or more optical components. For example, the beam diameter of the OCT beam input via the optical fibre 308A when it exits the collimating lens assembly 516, shown as collimating lens 602 in FIG. 6, is preferably above a threshold diameter of 3.1 mm, and the beam diameter from the collimating lens may have a 3.3 mm exit pupil diameter in some embodiments. Other design constraints may be dependent on the exit pupil diameter of the OCT beam from the collimating lens. For example, in some embodiments, the collimated OCT beam exits the collimating lens assembly with an exit pupil diameter of at least 3.1 mm, possibly as large as 3.3 mm, and have less than (about) a ½ wave (rms) wave front error.

Another exit beam diameter which is selected for is the beam diameter of the OCT beam 312 that exits from the focusing lens assembly 314 of the OCT scanner adapter 206 which then is incident on the fold mirror 316. The focusing lens 314 expands the OCT scanning or probe beam diameter to 10.6 mm to set the OCT system numerical aperture and ultimately the resolution for the OCT scanner system based on the focal length of the OCT microscope objective lens 210. For the case of the 175 mm working distance (not focal length) objective lens 210, the lateral resolution is 30 μm, in other words, the resolution is better than 33 line pairs per millimetre. This can be contrasted with the 6 micron, 166 line pairs per mm, resolution at the intermediate image plane located at the exit of the OCT objective lens assembly 510, 512.

In some embodiments, the maximum FoV which a user can set for a scan is a 20 mm by 20 mm area using a suitable user interface, for example, a user interface of an apparatus implementing the image processing system 148 shown in FIG. 1 of the figures which includes or is connected to display 152. In some embodiments, the user interface is configured so that a user can adjust a location of an OCT scan FoV within a 25 mm box although a full FOV of an OCT scan image remains a 20 mm×20 mm area.

Examples of the embodiments of the present invention which are used for surgical procedures and other use contexts requiring real-time image processing may use a high-dispersion configuration of the OCT system 100 with the OCT scan adapter 206.

The term real-time as used herein, refers to processing delays which are imperceptible, for example, 60 ms or less, and delays of around 30 ms or less are also achievable in some embodiments. The design incorporates a high angle of incidence at the scanning mirror to reduce the compound angle coupling when performing a 2D scan of a sample with both high lateral optical resolution and a telecentric image plane.

The following description of the optical design of the scanning mirror assembly 310 shown in FIGS. 3A, 3B, 4 and 5A incorporates a high angle of incidence at the scanning mirror reflective surface 334 to reduce the compound angle coupling when performing a 2D scan of a sample to enable the OCT scans to be performed with both a high lateral optical resolution and a telecentric image plane. Each OCT-scan comprises a large number of one-dimensional scans, A-scans, which provide depth information at a point in the area (e.g. of the sample) being scanned. Several A-scans are stacked together to create a two-dimensional image, referred to herein as a B-scan. A B-scan provides a slice through the scanned area showing depth information along the path of the A-scans. A plurality of B-scans traversing the scanned area may provide a volumetric scan in three-dimensions of the scanned area.

The scanning mirror assembly 310 includes a moveable reflective surface 334 comprising a micro-electro-mechanical system having a suitably large numerical aperture. The term "large numerical aperture" here refers to a clear aperture of the reflective surface 334 which is preferably greater than about 4 mm in diameter. The term "clear aperture" means the range of angles which can be imaged via the aperture without any supports or clips or other forms of retaining elements getting in the way. The larger the diameter of the clear aperture of the scanning mirror reflective surface 334, the slower the scan rate as the probe beam then covers a larger diameter. Whilst a MEMS mirror with a clear aperture of around 7 mm is already known in the art, even with optical feedback, such known MEMS mirrors with large clear apertures are not capable of scanning at an acceptable rate for real-time imaging applications such as are required for OCT when performing optical surgery. In some embodiments, the scanning mirror has a 5 mm clear aperture. In some embodiments, a 4.2 mm clear aperture diameter scanning mirror assembly is used which enables scans to be performed at a sufficiently high rates for the SD-OCT system shown in FIG. 1 to be used for real-time surgical applications.

In OCT, the axial and lateral properties are decoupled. Lateral resolution is defined by the objective and focusing media in front of the sample. Axial properties of the interferometry are defined by the coherence properties of the OCT scanning light source and also how, after being returned from the sample, the returned OCT signal is sampled at the detector. The OCT axial resolution is dependent on the spectral bandwidth of the OCT scanning light source and the centre wavelength. Axial imaging depth defines the axial range which is covered in a B-scan. It is also defined by the maximum fringe frequency that can be detected as the maximum frequency of an interference spectrum is what decodes the maximum depth scanned.

An A-scan, is an amplitude depth scan along one-dimension, usually referred to as the z-axis, through a sample, a B-scan is a lateral scan in two-dimensions across a sample formed by a series of A-scans. In other words, for each sample point, the spectrally dependant interferometric fringe pattern created by the back reflection from the reference mirror of the OCT interferometer and the back reflection from the sample is recorded as an A-scan. Multiple A-scans are made to generate other scans such as B-scans which allow a complete depth profile of the sample reflectivity at the beam position to be generated.

In some embodiments, the open aperture diameter is 4.2 mm or above.

In some embodiments, the OCT scanner adapter 206 includes a high speed OCT MEMS based mirror scanning assembly 310 which uses a position sensitive detector system 160 to provide a control loop feedback for controlling the positioning of the OCT beam during the scan. The control loop feedback has a technical benefit in that it allows the OCT scanner to generate more B-scans per second of the object of interest being scanned. In other words, the control feedback loop provided in some embodiments of the present invention allows suppression of ringing behaviour and resonant behaviour caused by a step change in driving voltage at the end of a scan line.

Example(s) of OCT Microscope Adapter Design

FIG. 3A shows schematically an example embodiment of a MEMS microscope OCT scanner adapter 206 according to the present invention which is suitable for mounting to the under-carriage of the microscope 200 shown in FIGS. 2A an 2B as it has been configured with optical components which seek to optimally reduce the lateral and vertical footprints whilst maintaining suitable optical quality characteristics for OCT applications.

In FIG. 3A, the illustrated example embodiment of the OCT scanner adapter 206 comprises several components contained within or mounted on an adapter housing 208. The adapter housing 208 comprises the data/power port, 212 for example an Ethernet power over Ethernet port or high-speed USB port or the like.

An optical port 214 is also provided for OCT scanning light to be input and output from the OCT scanner adapter 206. An optical fibre 308*a* connected to the optical port 214 feeds in OCT light from the coupler 104 shown in the OCT scanning system 100 of FIG. 1 to the scanning mirror assembly optical block 310 shown in FIG. 3A via optical fibre connector 308. The returned OCT light travels back along via optical fibre 308*a* to the coupler 104 shown in FIG. 1. The optical fibre 308*a* is accordingly part of the optical path 105*a* shown in the OCT scanning system 100 of FIG. 1 via which OCT probe light illuminates the sample to be scanned and via which OCT light returned from the sample is output towards the coupler 104 of the OCT scanning system 100 shown in FIG. 1. The optical fibre 308*a* has a suitable numerical aperture, preferably 0.14, to allow OCT light in the near-infra red region to propagate along it in a single mode.

OCT Light from the OCT light source 102 follows an optical path 101*a* along the illumination arm 101 to the coupler 104 and then takes optical path 105*a* along the probe arm 105 in FIG. 1 of which the optical fibre 308*a* forms part. The OCT light following the optical fibre 308*a* is injected into the scanning mirror assembly optical block 310 via OCT data connection fibre connector 308 and then follows the OCT arm 518 (see FIG. 5A) of the MEMS scanning mirror assembly 310.

In some embodiments, the optical fibre connector 308 via which OCT light is input to the MEMS mirror block 310 is a fibre connector to angle polished connector.

The optical block housing the MEMS scanning mirror assembly 310 also houses the optical components of the optical angular displacement mirror position measurement system 156 for the scanning mirror assembly, shown in FIG. 1 as mirror position measurement system 156. The controller 162 (see FIG. 1) is used for adjusting the reflective surface 334 of the scanning mirror 112 shown in FIG. 1 using a mirror mover mechanism of the MEMS scanning mirror assembly 310. The controller 164 may be implemented within the OCT scanner adapter 206 or provided remotely, in which case control signals may pass to the mirror mover in the MEMS scanning mirror assembly 310 via the data port 212 of the OCT scanner adapter 206.

The same mirror reflective surface 334 in the scanning mirror assembly housed in optical block 310 reflects both the input OCT beam and a mirror positioning reference beam from a different source (see FIG. 5A described below for more detail) in some embodiments. As would be apparent to anyone of ordinary skill in the art, however, it is possible for separate mirrors mounted on the same tilt-axis to be used in other embodiments, providing this is done in a manner that does not adversely affect the stack height h2 of the OCT scanner adapter 206.

The OCT light following the optical path 105*a* received via OCT data connection fibre 308 is reflected in a different optical plane at the reflective surface 334 to the optical plane at which light from the light source of the angular displacement mirror measurement system 156 is reflected.

The reflected OCT beam then follows an optical path through the OCT scanner adapter 206 from which it emerges via the microscope objective lens 210 to probe the object of interest, for example, a tissue sample such as the in-vivo eye tissue shown schematically in FIG. 1. Other types of objects of interest may range from tissue samples for ophthalmology and areas such as dermatology, dentistry, angiography, cardiology, as well as other tissue samples for diagnostics of diseases including cancer.

The OCT light which is reflected, back-scattered or otherwise returned from structures within the tissue sample then follows a return path 105*a* back through the scanning mirror assembly of the optical block 310 and along optical fibre 308*a*. The returned OCT light then exits the OCT scanner adapter 206 via optical port 214 and is fed into the OCT system 100 where it is combined and interferes with light returned from reference arm 103 at coupler 104. The resulting interference pattern is detected in the OCT system 100 of FIG. 1 by a spectrometer 136 which generates image data which can then be image processed in order to obtain a tomogram image indicating the scanned structures in the tissue located within the scan FoV.

In the example embodiment of the OCT adapter 206 shown in FIG. 3A, the OCT probe beam 312 is output from the optical block which houses the MEMS OCT scanning mirror assembly 310 and travels towards a fold mirror 316 which lifts the OCT beam by a minimal amount out of its optical plane towards beam splitter 318. The beam splitter 318 reflects the incident OCT beam towards the objective lens assembly 210 of the OCT scanner adapter 206 which also acts as an objective lens for the microscope optics housed in microscope 200 when the OCT scanner adapter 206 is attached the microscope 200. The OCT probe beam emerges from the objective lens 210 as a telecentric beam focused on focal plane 154 in the tissue being scanned, which as shown lies in the x-y plane shown schematically in FIG. 1. The resulting returned OCT light may be used to generate an OCT A-scan which provides depth information orthogonal to the focal plane 154, in other words, in the z-direction as shown in FIG. 1. Movement of the reflective mirror surface 334 moves the location of the telecentric beam across the focal plane 154 in the area being scanned 116 and allows OCT B-scan images to be generated.

In FIG. 3A, the OCT scanner adapter 206 is configured so that the objective lens 210 can be used as an objective lens by microscope optics as well as by the OCT scanner system 100. A light-proof gasket 320 is provided around the aperture formed in the OCT scanner adapter 206 via which the OCT objective lens 210 is aligned with and extends the optical channel formed by the microscope optics of microscope 200.

The configuration of the fold mirror 316, the beam splitter 318, and the objective lens assembly 210 of the OCT scanner adapter 206 are collectively designed so that OCT beam is lifted out of the plane it follows through the scanning mirror assembly by only a small amount, in order to be able to exit via objective lens 210. The amount of lift required is affected by the tilt-angles for the beam splitter and the fold mirror and beam entry geometry. The additional height h2 that the OCT scanner adapter 206 adds to the height of the microscope is accordingly also minimised by using this optical design. For example, in some embodiments the OCT scanner adapter housing 302 adds 40 mm or less to the overall height h1 of the microscope housing 202. In some embodiments, the additional height h2 is 36 mm or less. This can be achieved with a lift of, or around, 27 mm in some embodiments using suitable tilt-angles for the beam-splitter and fold mirror.

In some embodiments, and as shown in the example embodiment of FIG. 3A, the OCT probe beam 312 exits the optical block housing the scanning mirror assembly and travels through free space first to a focusing lens assembly 314 which allows the focal plane of the image being scanned to be adjusted. This adjusts the focus of the scan at different depths. The focusing lens assembly 314 is driven by a motor 326 and also comprises a travel limiter or stop 324. In some embodiments, the focusing mechanism provided by the focusing lens assembly 314 of the adapter can be adjusted to control the OCT focal plane with a ±30 mm range which allowing a range of depths in the sample to be focused on for a scan. The OCT focal plane can be adjusted over the +/−30 mm range and may be optimized for the best SNR during initial image acquisition. This is different and should not to be confused with the technique of shifting the focus at the A-scan rate which is used to extend the depth of focus within the sample. The focusing lens assembly 314 moves more slowly than is required for the A-scan sampling and unless the system detects a large motion in the sample it will not be adjusted without user intervention.

In some embodiments, and as shown in FIG. 3A, the OCT scanner adapter 206 is attached to the microscope 200, using fixations, for example, screws, which are provided in recesses of mounts 328*a* and 328*b* and which can be extended out of the mounts 328*a*, 328*b* into the undercarriage of the microscope 200 into corresponding receiving apertures or holes, preferably threaded holes in the undercarriage of the microscope 200 so as to fixedly engage the OCT scanner adapter 206 with the microscope. In some embodiments where the OCT scanner adapter 206 functions as a microscope accessory the OCT scanner adapter 206 may also comprise receiving apertures or holes at corresponding locations in its base to the locations of receiving holes or apertures in the undercarriage of the microscope 200. By having the same or similar fixation locations in the base of the OCT scanner adapter microscope accessory 206 as the fixation locations in the microscope undercarriage, different types of microscope accessories which would otherwise be attached to the undercarriage of the microscope 200 can instead be attached to the undercarriage of the OCT adapter. In other words, in some embodiments the OCT scanner adapter 206 is configured to attach to the undercarriage of the microscope as a microscope optics accessory. Some embodiments of the OCT scanner adapter microscope accessory 206 allow the OCT scanner adapter accessory 206 to have another microscope accessory attached to the base of the OCT scanner adapter.

FIG. 3B shows an alternative view of the OCT scanner adapter 206 of FIG. 3A. In FIG. 3B, however, the location of the optical source or emitter 158 of the mirror positioning light beam 400, shown in FIG. 4, which illuminates the scanning mirror is more visible along with as is the location of a position sensitive detector, PSD, 160 of the optical angular displacement measurement system 156 in the optical block 310.

Also shown schematically in FIG. 3B is an example angle of incidence θ of the mirror positioning illumination beam 400, shown in FIG. 4, at the reflective surface 334 the MEMS scanning mirror which after reflection forms the mirror positioning reference beam which travels towards the PSD 160.

It will be appreciated that the angle of incidence and the locations of the beam paths shown in the drawings are for illustrative purposes only and not to scale.

The design of the MEMS scanning mirror assembly is configured so that the illuminating mirror positioning light beam 400, shown in FIG. 4, is reflected in a different optical plane by a reflective surface 334 of the scanning mirror to form a reference beam 402 which passes along a positioning reference arm of the OCT scanning mirror assembly 310 from the optical plane in which the same reflective surface 334 reflects the incident OCT scanning or probe beam 312, shown in FIGS. 4 & 5A. The scanning mirror assembly is also configured so that returned positioning light is reflected by the mirror in another optical plane different from the optical plane of reflection of the OCT outwards and returned beams and different from the optical plane in which the incident mirror positioning beam is reflected so that it causes minimal interference with either OCT beams or the incident mirror positioning beam or the optical source for the mirror positioning beam.

FIG. 4 of the accompanying drawings, this shows schematically an enlarged view of the OCT scanner adapter 206 of FIGS. 3A and 3B. In FIG. 4, the mirror position illuminating beam 400 (shown as a dash dash line) from the point light source 158 is incident at the reflective surface 334 of the OCT scanning mirror 500, shown in FIG. 5A, with an angle of incidence, AOI, shown as 0. The mirror position reflected beam 402 (shown as a dash dot dash line in FIG. 4) is reflected towards the PSD 160 where it is detected. For the sake of clarity, returned light from the incident beam at PSD 160 is disclosed, but not shown in FIG. 4.

The OCT scanner optical components shown in FIGS. 3A to 4 are arranged so that OCT light emerging from the optical plane of the scanning mirror assembly is lifted by only a small amount out of that optical plane by folding mirror 316 towards the beam splitter 318. Beam splitter 318 allows light via the microscope optics to be transmitted and returned to the microscope optics whilst also reflecting the OCT probe beam to the same focal plane 154 as the microscope light. By optimally positioning the beam-splitter and the fold mirror relative to the objective lens 210, it is possible to reduce the height the OCT probe beam must be lifted by the fold mirror before it is reflected by the beam splitter 318 out through the objective lens 210.

In some embodiments, the fold mirror lifts the OCT beam by 27 mm out of the optical plane of the scanning mirror assembly.

Example(s) of Scanning Mirror Assembly Optical Design

FIG. 5A of the accompanying drawings shows schematically an example of an optical design for a two-dimensional, 2D, scanning mirror assembly such as, for example, the 2D scanning mirror assembly housed in the optical block 310 shown in FIGS. 3A, 3B and 4.

The optical design of the 2D scanning mirror assembly is suitable for use in other types of OCT scanners such as OCT scanner 164 in FIG. 1 as well as the OCT scanner adapter 206. The scanning mirror assembly 310 shown in FIG. 5A has an optical design which may be used for other applications than OCT which use scanning light requiring mirror positioning.

In other words, the 2D scanning mirror assembly optical design of FIG. 5A does not need to be limited to OCT applications or apparatus such as those shown in FIGS. 1-4 of the accompanying drawings in all of its embodiments. It may be beneficially implemented in any other types of light scanning apparatus where a compact lateral optical plane is beneficial.

Some example embodiments of the micro-electro-mechanical system, MEMS, two-dimensional scanning mirror assembly 310 shown in FIG. 5A have an optical design comprising a moveable MEMS scanning mirror having a reflective surface 334, a connector 308 to a point light source for a scanning light beam, for example, as shown an optical fibre 308*a* connected via an optical fibre connector 308 and the end of the optical fibre 308*a* (see FIG. 5*b*) then acts as the point light source for the light beam.

The scanning mirror assembly optics also comprises a collimating lens assembly 516 for the light introduced via the connector 308. Collimating lens assembly 516 is configured to output light from the point light source with an exit beam diameter above a threshold exit beam diameter towards the reflective surface suitable for a desired scanning application. After reflection at the reflective surface 334 of the scanning mirror 112, the scanning light beam passes via an objective lens assembly 510, 512 to exit the scanning mirror assembly.

The reflective surface 334 is configured to reflect an incident collimated light beam to form a scanning beam, for example, an OCT probe beam if the point light source provides OCT light, which exits the mirror assembly via an objective lens 510 and field lens 512 (collectively also referred to as the objective lens assembly 510, 512) as a telecentric beam 312 towards a telecentric image plane 154. The optical design of the components in the scanning mirror assembly is configured to ensure the scanning beam is able to perform a scan with a resolution better than a resolution threshold.

The optics of the scanning mirror assembly are configured to provide a total track length, L, for the path from the point light source, for example, from the end-face of the optical fibre or fibre ferrule (see also FIG. 5B), to the telecentric image plane (700) of less than about 40 mm to help keep the lateral dimensions X of the scanning mirror assembly small enough to allow the OCT scanner housing 308 to be below a desired lateral footprint in its design. For example, as shown in FIG. 5, the width X of the scanning mirror assembly is preferably below 41 m, for example, it may be 40.6 mm or less in some embodiments. The optical design is also configured to keep the depth Y as shown in FIG. 5A also as small as possible, for example, Y may be 35 mm or less, and may be as short as 34.5 mm or less in some optical designs.

The total track length, L, is accordingly kept as short as the optical design layout permits to reduce the lateral and depth footprints X and Y to the smallest possible in some embodiments so that the housing of a scanner comprising the scanning mirror assembly 310 can be similarly provided with a small footprint.

By keeping the lateral footprint X as small as possible, side access to the area being scanned is improved which is particularly beneficial when the scanning mirror assembly 310 is a scanning mirror assembly for an OCT scanner adapter 206 which is a surgical microscope accessory as this may improve access to the area being surgically operated on whilst the microscope it is attached to is in use.

In some embodiments of the scanning mirror assembly, the threshold for the exit beam diameter from the collimating lens 516 is at least 3 mm, and preferably at least 3.1 mm. By having an exit beam diameter of at least 3.1 mm, the scanner benefits from a better lateral resolution than a small exit beam diameter allow In some embodiments of the scanning mirror assembly, the threshold for the telecentric beam resolution at the telecentric image plane 700 is better than 6 microns. In other words, the scan image can resolve features in the sample being scanned which are smaller than 6 microns.

In some embodiments, the scanning mirror 112 may be moved, for example by a controller 162, The scanning mirror assembly may be configured in some embodiments to move about its optical axis and scan over +/−5 degrees in some embodiments.

In some embodiments of the scanning mirror assembly, the numerical aperture of the optical fibre and the focal length of the collimating lens together determine the a suitable threshold for the exit beam diameter of the collimated beam from the collimating lens to at least 3.1 mm into achieve the designed resolution at the focal plane. The combination of focal lengths of a scanning mirror objective lens and a scanning mirror field lens via which the probe beam exits the mirror assembly determines the total track length, L, which is preferably less than 40 mm or thereabouts.

In some embodiments, for example, where the scanning mirror assembly is being used for OCT purposes, the optical fibre has a numerical aperture of 0.14. The optical fibre which feeds in light to the scanning mirror assembly by acting as a point light source may have another suitable numerical aperture value in other embodiments of the scanning mirror assembly providing the numerical aperture allows sufficient light to be fed into the scanning mirror assembly for another context of use along a single mode optical fibre 308*a*.

In some embodiments of the scanning mirror assembly, the objective lens 510 comprises a F2.7 Biconvex doublet lens and the field lens 512 comprises a F19 positive/negative meniscus doublet field lens.

In some embodiments of the scanning mirror assembly, the optical path difference, OPD, of the telecentric probe beam output by the scanning mirror assembly has a radius of curvature is greater than 100 mm.

In some embodiments of the scanning mirror assembly, the telecentric beam is telecentric to better than an incident angle of 0.03 degrees at the telecentric image plane.

In some embodiments of the MEMS scanning mirror assembly, the reflective surface 334 of the MEMS scanning mirror comprises a large-aperture gold-coated silicon mirror bonded to an underlying mechanical structure.

The embodiment of the scanning mirror assembly 310 design illustrated schematically in FIG. 5A may be implemented as an optical block in an OCT scanning system such as the OCT scanning system 100 shown in FIG. 1. For example, in some embodiments, the scanning mirror assembly is implemented as an optical block having the X, Y footprint shown in FIG. 5A in a compact OCT scanner adapter 206 for a microscope, such as the optical block which houses the scanning mirror assembly 310 shown in FIGS. 3A, 3B and 4.

As mentioned above, however, the scanning mirror assembly 310 shown in FIGS. 5A and 5B has an optical design which can be used in a range of different use contexts in other types of scanner systems. In some embodiments, the mirror assembly shown in FIGS. 5A and 5B is provided as scanning mirror assembly for an OCT apparatus such as that shown in FIGS. 3A to 3B and receives light injected by optical fibre 308*a*. In other embodiments a different point light source may be used instead of the optical fibre 308*a* which acts a point light source for an OCT light beam as shown in FIGS. 3A, 3B, 4, 5A and 5B.

In some embodiments, the mirror assembly 310 may be provided in an OCT scanner adapter 206 which is used as an OCT scanning accessory for a microscope. 200 The microscope may comprise a surgical microscope in some embodiments and the scanning mirror assembly 310 may be used to generate OCT scans of a sample tissue area being surgically operated on at a sufficiently high rate to allow live OCT tomographs to be generated of the sample tissue area whilst the surgical operation is on-going.

In some embodiments, the SD-OCT scanning system shown in FIG. 1 includes a OCT scanner adapter 206 comprising a scanning mirror assembly 112, 310 having the optical design shown in FIGS. 5A and 5B and as described herein.

In some embodiments, the scanning mirror assembly 310 is configured so that OCT light returned from the sample along the OCT probe arm 105 has a lateral optical resolution equal or higher than 6 μm, in other words, the resolution is better than 166 line pairs per mm.

In some embodiments, the scanning mirror assembly 310 comprises a MEMS 2-D scanning mirror assembly which includes at least: a moveable MEMS scanning mirror having a reflective surface 334, an optical fibre 308*a* connected via an optical fibre connector 308 and configured to act as a point light source for an OCT beam illuminating the reflective surface 334, a collimating lens assembly 516 configured to output OCT light from the point light source with an exit beam diameter of at least 3.1 mm towards the reflective surface 334. The reflective surface 334 is configured to reflect both an incident collimated OCT light beam to form an OCT probe beam and a mirror positioning reference beam. The OCT probe exits the mirror assembly as a telecentric beam towards a telecentric image plane with a resolution of at most 6 microns. The optics of the scanning mirror assembly 310 are configured to provide a total track length, L, from a) an end-face of a fibre ferrule providing the point light source inserted in the optical fibre connector to b) the telecentric image plane of less than 40 mm and preferably less than 36 mm in some embodiments. An objective lens assembly 510, 512 is provided in a probe arm of the scanning mirror assembly to focus the telecentric OCT beam via the OCT scanner (microscope) lens 114, 210 in some embodiments.

The scanning mirror assembly 310 has an optical design which includes the reflective surface 334 of the MEMS mirror being configured so that an incident mirror positioning beam is reflected in a separate optical plane to the optical plane in which an incident OCT scanning beam is reflected. In this manner, the scanning mirror assembly may be also used with a mirror positioning system such as an angular tilt mirror positioning system shown schematically in FIG. 1 of the drawings.

As mentioned above, some embodiments of the MEMS based scanning mirror assembly shown in FIGS. 5A and 5B and described herein are implemented in an OCT scanner 206 such as that shown in FIGS. 3A,3B and 4, as part of the SD-OCT scanning system shown in FIG. 1. Some embodiments of the present invention accordingly comprise a OCT scanner system 100 comprising the OCT scanner 206 including a micro-electro-mechanical system, MEMS, two-dimensional scanning mirror assembly 310 having a compact optical design according to the present invention.

In some embodiments of the MEMS scanning mirror assembly 310, the scanning mirror 112 is mounted on an underlying mechanical structure or support 500 as shown in FIG. 5A which provides a mirror moving mechanism to allow the mirror surface 334 to pivot about its optical axis under the control of controller 162.

In some embodiments, the reflective surface 334 of the MEMS scanning mirror assembly comprises a large-aperture gold-coated silicon mirror bonded to the underlying mechanical structure 500.

The angular displacement measurement system 156 shown in FIG. 1 is implemented in the embodiment of the MEMS mirror assembly of FIG. 5A, by a light source 158 which comprises a suitable optical point source, for example, a laser diode 502. The optical point source generates a light beam, referred to herein as a mirror positioning light beam 400 (shown by the dashed line in FIG. 5A) which passes through a collimating lens 503 such that a collimated mirror positioning beam 400 is incident on the scanning mirror surface 334 with an angle of incidence θ.

The angular displacement measurement system 156 is used to determine the angular position of the MEMS, scanning mirror assembly 310 relative to the incident mirror positioning beam 400 as this allows the mirror position for an incident light beam to be determined when performing a scan and adjusted as the scan progresses. The OCT scan (e.g. a B-scan or volumetric scan) is performed by moving the mirror using the controller 164 in accordance with any scan parameters for a particular scan configuration (these can be input by a user and/or automatically determined for a particular type of scan in some embodiments).

The position of the moveable MEMS mirror surface 334 may be controlled in some embodiments using a suitable angular position controller using closed loop control based on the feedback from a position sensitive detector 160 which detects the reflected mirror positioning beam 402.

In some embodiments, the scanning mirror assembly 310 described above with reference to FIGS. 3A, 3B, 4, 5A and 5B includes the position sensitive detector 160 which is configured to send feedback mirror position data to a controller 162 configured control the position of the MEMS scanning mirror surface when a scan is performed. However, in some embodiments of the compact OCT scanning mirror assembly 310 of the drawings, the controller is housed remotely. For example, it may be housed elsewhere within the OCT scanner adapter 206 in some embodiments. Alternatively it may be housed with other system components of the OCT scanner system 100 or hosted on a different platform having a user interface to allow the input of scan parameters in some embodiments. Control signals may be sent from a remote controller 162 via a suitable data connection such as data port such as 212 in some embodiments.

In some embodiments, the mirror positioning light source illuminates the reflective surface of the mirror assembly for the optical mirror position feedback channel with an angle of incidence, θ, above 62 degrees, preferably 67.5 degrees, from the normal to the plane of the reflective mirror surface 334.

In some embodiments, the OCT light source illuminates the reflective surface of the mirror assembly for the OCT light channel with an angle of incidence, θ, below 28 degrees, preferably 22.5 degrees, from the normal to the plane of the reflective mirror surface 334.

In some embodiments, the minimum usable aperture at the reflective mirror surface is at least 4 mm, which is particularly useful when the mirror assembly is incorporated in OCT scanner apparatus, such as the compact OCT scanner 206 microscope accessory used for surgical applications.

In some embodiments of the present invention, the OCT apparatus may use closed loop feedback for controlling the scanning mirror position in some embodiments. The use of closed loop feedback may be useful in embodiments where a high scan rate is required such as where a live video or other form of image sequence of OCT scans is required. The use of closed loop feedback supports OCT scans being generated at a high-rate with low lag for time-sensitive applications, such as when OCT scans are provided to guide surgical procedures as it allows the mirror to be moved fast enough and precisely enough to achieve high scan rates and/or high scan resolutions (in other words, high OCT image B-scan or volumetric scan resolutions). In some embodiments, however, an open loop control may be provided.

Embodiments of the present invention can address at least some of the design constraints which are present when designing OCT systems for surgical microscopes. For example, one design constraint is that smaller diameter scanning mirror surfaces are better suited to achieving higher scan rates. The numerical aperture relates to resolution. A clear aperture, i.e., mirror diameter, relates to scan size in that the underlying mechanical structure of the MEMS is the same so a small diameter mirror can such as 2 mm diameter can tilt farther before hitting the MEMS base (up to +/−7 degrees) where as large diameter mirrors such as 7.5 mm diameter can only tilt +/−1.5 degrees before hitting the base. This means that whilst a smaller diameter mirrors could be used and scan a larger area, this would be at the cost of resolution.

In some embodiments, the threshold for the exit beam diameter of the OCT light beam is based on a numerical aperture of the optical fibre and the focal length of the collimating lens assembly.

In some embodiments, the two-dimensional scanning mirror assembly is configured to reflect a mirror positioning beam of light (400) incident at the reflective surface (334) in a first optical plane towards a position sensitive detector (160) configured to generate information on an angle of tilt of the scanning mirror reflective surface (334

In some embodiments of the optical angular displacement measurement system 156 of the scanning mirror assembly 310 shown in FIG. 5, the mirror positioning light from light source, 158 is collimated first by a suitable collimating lens assemble 503 to form a collimated illuminating light beam 400 which is incident at the reflective mirror surface 334. The collimated illuminating light beam 400 (represented schematically by the short dash dash line in FIGS. 3B, 4 and 5A) is then incident on the reflective MEMS mirror surface 334 with an AOI=θ and is reflected to form a mirror position reference beam 402 (shown by the longer dash dot dash line in FIGS. 3B, 4 and 5A) which travels along a mirror positioning reference arm 501 of the scanning mirror assembly towards PSD 160 via a PSD lens assembly 504 and, in some embodiments, via an optional neutral density filter 506.

The mirror positioning beam 400 may, however, be reflected back or otherwise returned by the PSD 160 towards the reflective surface 334 of the MEMS mirror. This is unwanted as such returned light can contaminate the illuminating positioning beam and/or the input OCT light beam. Other issues with stray light reflectance in the mirror position detector system include the detected spot position being wrong if there is any stray light on the PSD 160, the diode behaviour may change if reflected light enters the diode cavity, and this can cause intensity fluctuations in the position detector beam which the PSD will detect as changes in position.

To prevent returned reflective elements of the positioning beam being reflected by the MEMS mirror assembly 310, some embodiments of the present invention include additional components such as a light trap. The light trap is suitably configured and located suitably to reduce any reflected mirror positioning reference beam light from re-entering the emitter for the mirror positioning beam and/or contaminating the returned probe beam 312 before it reaches the interferometer.

As mentioned above, some embodiments of the MEMS based scanning mirror assembly shown in FIGS. 5A and 5B have reflective surface(s) is (are) is designed so that OCT light input via the OCT light coupler 308 is reflected from another region of the MEMS mirror surface 334 that the mirror positioning reference beam 402 and the OCT scanning or probe beam are reflected in different optical planes.

The OCT scanning or probe beam reflected by the MEMS mirror surface 334 of the scanning mirror assembly 310 after reflection passes along an optical path through an OCT objective lens 510 and an OCT field lens assembly 512 which outputs the OCT beam as a telecentric beam into free space towards fold mirror 316. As shown in the embodiments of FIGS. 3A and 3B, and 4, before the beam is incident on fold mirror 318 which lifts the beam out of the optical plane of the scanning mirror assembly it passes via focusing lens assembly 314. In some embodiments this allows the OCT focal plane to be focused with a +/−30 mm range, in other words, a range of different depths can be focused on in the scan area. However the focusing lens optics may be omitted in some embodiments of the OCT scanner.

The fold mirror 316 lifts the OCT scanning (or probe) beam out of the plane of its optical path through the scanning mirror assembly by reflecting the incident OCT scanning or probe beam towards a beam-splitter 318. The beam-splitter reflects the OCT scanning or probe beam out of the OCT scanner adapter 206 microscope objective lens 210 towards a focal plane 154 for scanning a tissue or similar object of interest, which may be an in-vivo tissue sample or in-vitro sample. The beam-splitter 318 also allows the OCT illuminated area being scanned to be viewed via microscope optics housed in the microscope 200.

In some embodiments, and as shown in FIGS. 3A and 3B, the OCT probe beam 312 is input to the optical block by traveling along optical path 105*a* within optical fibre 308*a* and enters the scanning mirror optical block 310 via OCT data connection fibre input 308. The OCT scanning or probe beam 520 then passes via collimating lens 516 towards the scanning mirror reflective surface 334. The mirror surface 334 reflects the OCT beam via a probe arm 508 out of the optical block containing the scanning mirror assembly 310 at which point it travels in free space towards the fold mirror 316.

As shown in the embodiment of the OCT adapter shown in FIGS. 3A and 3B and 4, the OCT scanning or probe beam 312 is focused before it reaches the fold mirror 316 by passing through a focusing lens assembly 314. The focusing lens assembly is driven by a motor 336 which adjusts the position of the focusing optics to allows a range of focal depths to be achieved when performing a scan. In some embodiments, the focal range can vary from +/−30 mm.

The returned OCT light is reflected via the MEMS scanning mirror surface 334 back along the OCT arm 518 of the scanning mirror assembly 310 back towards the coupler of the OCT system 100 shown in FIG. 1.

In the scanning mirror assembly 310, the input OCT light beam is input via the optical fibre connector 308 from the end face 532 of optical fibre 308*a* passes at the optical fibre ferrule 530 (see also FIG. 5B) through an OCT collimating lens 516 towards the scanning mirror assembly. The track length, in other words the measurable physical distance of the path taken from the end-face 532 to the surface of the scanning mirror is shown in FIGS. 5A and 5B as L1.

FIG. 5A also shows the track length L2 from the scanning mirror surface to the telecentric image plane 700. The total track length L=L1 and L2 is preferably less than or equal to a track length design threshold of 40 mm.

FIG. 5B is an enlarged view of FIG. 5A showing more clearly the location of the optical fibre ferrule 532 and optical fibre end-face 530 at which the optical fibre 308*a* acting as a point light source injects OCT light into the mirror scanning system 310. The OCT light passes from the end face 532 of the fibre to collimating lens 516 and the collimated illuminating OCT beam is then incident at the reflective surface 334 of the MEMS scanning mirror which reflects it towards the OCT probe arm 105 (as shown in FIG. 1) or 508 as shown in FIG. 5A.

In the return direction, which is disclosed but not shown in FIG. 5A or 5B for clarity, returned OCT light passes along the OCT arm 518 (see also the description of FIG. 6) and through the collimating lens 516 in the other direction before travelling out via the OCT data connection fibre 308 along optical fibre 308*a* before leaving the OCT scanner adapter 206 via optical port 214.

In some embodiments, the OCT scanner is implemented using an OTS (off the shelf) MEMS (microelectromechanical system) in which the MEMS scanning mirror reflective surface 334 is provided by large aperture protected gold coated silicon mirror bonded to the underlying mechanical structure 500 of the optical block 310. The OCT scanner 206 formed by such a design provides a simplified and miniaturized optical system which has the same optical performance as much larger galvanometer scanning mirror type systems known in the art for use in intraoperative OCT systems.

In some embodiments, the optical block design of the OCT MEMS mirror assembly 310 includes a 2D scanning mirror assembly and a complimentary optical angular displacement measurement system 156 for measuring the position of the MEMS mirror system.

The mirror positioning system which measures the angular displacement of the scanning mirror reflective surface 334 comprises a mirror positioning light source 158 and a position sensitive detector, PSD, 160. The PSD may comprises a PSD lens assembly 504 and a neutral density filter 506 as well as the PSD 160. An example of a suitable PSD detector is a Hamamastu S5991 4 mm×4 mm active area position sensitive detector.

In some embodiments, the angular optical displacement measurement system 156 is provided in the same optical block as the MEMS scanning mirror assembly 310. The optical angular displacement measurement system 156 is used in some embodiments to provide closed loop control of the MEMS scanning mirror position. The closed loop control can be provided by measuring the angle of incidence θ using the PSD 160 and providing information indicating the mirror position derived from this to a controller which allows the controller to more accurately control the tilt angle of the scanning mirror reflective surface 334 as a scan is performed.

This closed loop feedback can allow much high B scan rates to be performed. For example, at least 400 B-scans per second can be achieved as a maximum scan rate at full angular deflection in relation to the maximum field of view, FoV using closed loop control for a 4.2 mm diameter clear aperture mirror 112.

In embodiments without closed loop control i.e., open loop scanning, a low pass filter may be used to prevent the MEMS scanning mirror moving device from reaching its natural frequency excitation state where the MEMS scanning mirror moving device may become resonate by uncontrolled oscillation (which in turn can damage the MEMS scanning mirror moving device). In embodiments where open loop scanning is implemented, the maximum scan rate may be approximately 50 B-scans per second which can be contrasted with the rates achievable by closed loop control. With closed loop control in some embodiments, the scan rates which can be achieved using an example embodiment of the MEMs scanning mirror assembly 310 according to the present invention is approximately 400 Hz or higher.

In some embodiments, the optical components of the MEMS scanning mirror assembly 310 are configured collectively provide a predetermined system numerical aperture for a desired system optical resolution through the microscope objective lens 210. In other words, in some embodiments, the MEMS scanning mirror system components are suitably configured to enable the diameter of the collimated OCT beam 312 output along OCT data connection fibre 308 to match a desired minimum system optical resolution after it has passed out through the microscope objective lens 210.

In some embodiments, all air to glass interfaces within the OCT scanner adapter 206 are designed with convex surfaces to minimize any back reflections from the OCT beam as it propagates through the optical system.

FIG. 6 shows an example embodiment of an OCT collimator lens, also referred to herein as an OCT collimator lens assembly, 516 such as the collimator lens 516 shown in the OCT arm 518 of the optical block including the scanning mirror assembly 310 shown in FIG. 5 of the drawings. The OCT collimator lens 516 is provided along the OCT arm 518 of the scanning mirror assembly optical block 310. In FIG. 6, the OCT light fed into the collimating lens assembly 602 via the optical fibre ferrule end 532 emerges as a collimated OCT output beam 604 having a collimated beam diameter of at least 3.1 mm. The collimated OCT beam then travels towards and is reflected from the scanning mirror reflective surface 334. Returned OCT light follows the reverse path through the scanning mirror assembly and is focused via the collimating beam towards the end of the optical fibre **308*a* which gathers the returned light and the returned OCT light can then propagates back towards a coupler 104 of an interferometer system such as OCT system 100 shown in FIG. 1**.

A suitable example of an OCT collimator lens 516 which may be used in some embodiments of the present invention is a F3.2 Biconvex doublet lens. Such a lens has a thick crown glass section which reduces the curvature radii of the lens surfaces and consequently improves colour performance. In some example embodiments, the collimator lens has 10 mm focal length with 100 micron depth of focus which allows for good mechanical focal stability. In some embodiments the OCT collimator lens provides an exit beam which has a 3.1 mm diameter collimated beam (exit pupil diameter) with <¼ wave (root mean square, rms) wave front error.

Figure 7:
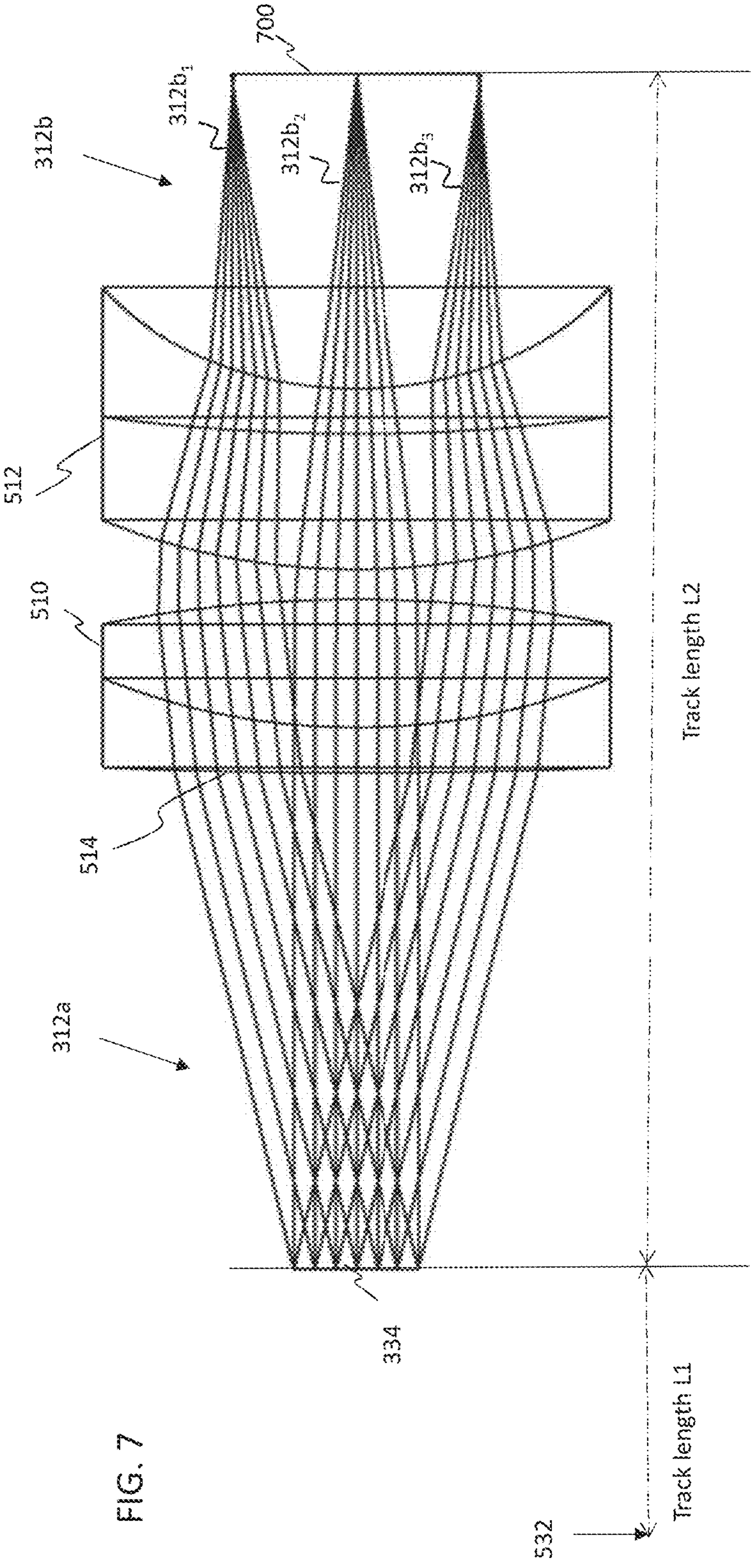
FIG. 7 shows schematically an example of an objective lens assembly for a scanning mirror assembly of FIG. 5*a;*

FIG. 7 shows an example of an OCT objective lens assembly 510, 512 in which an OCT beam 312 comprises light **312*a*** at a range of wavelengths, for example, a range of wavelengths over a near-infrared part of the optical spectrum.

The OCT light is reflected from the reflective surface 334 of the scanning mirror assembly is focused first by the OCT objective lens 510, and then by field lens 512 before emerging as a telecentric beam **312*b*. A plurality of angle dependant telecentric beams $\mathbf{312}b_{1,2,3}$ are shown in FIG. 7 focused on telecentric image plane 700, where each beam $\mathbf{312}b_{1,2,3}$ represents where OCT beam 312*b*** emerges at a particular scan angle, in other words, the telecentric exit beams $\mathbf{312}b_1$, $\mathbf{312}b_2$, $\mathbf{312}b_3$ are sequential beams generated as a B-scan progresses.

The OCT beam 312 deflected from the mirror surface passes, in other words, through an OCT objective lens assembly 510 (which also comprises field lens 512 in some embodiments) designed so that all scan angles of the light **312*b* which forms the OCT beam 312, which are shown schematically as OCT exit beams $\mathbf{312}b_1$, $\mathbf{312}b_2$, and $\mathbf{312}b_3$ in FIG. 7**, exit normal to the intermediate image plane and are therefore telecentric.

In some embodiments, all air to glass interface surfaces such as 514 are convex to eliminate back reflection artefacts in the OCT image. The OCT objective lens assembly illustrated in FIG. 7 accordingly converts an angular input OCT scanning or probe beam **312*a* reflected from the MEMS scanning mirror surface 334 to a telecentric OCT scanning or probe beam 312*b* (or rather one of beams $\mathbf{312}b_{1,2,3}$), which is then output into free-space in some embodiments. The telecentric OCT scanning or probe beam 312*b* is in some embodiments first focused using a focusing lens assembly 314 before it is lifted by folding mirror 316 towards beam splitter 318 as shown in FIGS. 3A and 3B. Alternatively, for example, the telecentric OCT scanning or probe beam 312***b* may pass in free-space directly to fold mirror 316 where it is reflected towards beam splitter 318.

The focusing lens assembly 314 acts as an optical interface for the telecentric OCT beam 312*b* to the microscope objective lens 210. The scanning mirror assembly could in some embodiments be used without a focusing lens assembly 314 but this would require the sample to be placed at the intermediate image plane 700 at which the telecentric OCT beam 312*b* is focused on when it emerges from the scanning mirror assembly. So in order to use the OCT scanner 206 without the focusing lens assembly the sample would need to be somehow placed at the intermediate image plane 700. As shown in the OCT scanner example embodiment of FIGS. 3A, 3B and 4 for example, a lens is required in order to optically couple to the microscope objective lens 210 or alternatively, the objective lens 210 would need a much shorter focal length. Such a short focal length would not be conducive to surgical applications. However, in some embodiments of the present invention, the OCT scanner may omit a focusing lens assembly 314 if it is used for another type of application. For example, an OCT scanner 206 used for eye imaging, especially animal eye imaging, may not require a focusing lens 314.

In some example embodiments of the OCT scanner adapter 206 used in a microscope for surgery, the focusing lens assembly 314 is fixed and set at the proper back focal length to collimate and expand an incident telecentric OCT beam 312*b* to have a 10.6 mm collimated beam diameter at exit. As the OCT beam 312 is collimated on exiting the focusing assembly, it will focus at the focal plane of the microscope objective lens 210 as do the microscope optics.

Alternatively, by adjusting the location of the focusing lens assembly 314 relative to the intermediate image plane, the object distance is effectively being adjusted. This results in the focus location of the microscope objective lens 210 being changed accordingly for the OCT scan whereas the focus location remains fixed for the microscope optics.

A benefit of having a focusing lens assembly 314 in some embodiments of the OCT scanner, such as that of the example embodiments illustrated in FIGS. 3A, 3B and 4, is that if the surgeon moves an eyeball around during a surgical procedure, the OCT scanning system can keep the OCT focused at a designated anatomical feature using an appropriate autofocusing technique known in the art.

Another benefit of embodiments of the OCT scanner 206 which include a focusing lens assembly 314 is that it may be used in some situations even if the microscope optics are setup improperly by a user of the microscope 200, for example, by a surgeon or assistant. For example, if the microscope is non-parfocal, in other words if the oculars of the microscope are set to infinity for users with corrected eyesight via contacts or glasses, the microscope optics focus at the focal plane of the microscope objective lens. If, the microscope oculars are not set to accommodate the refractive error of a microscope user's eyesight, then some users may move the whole microscope, for example using handles 204*a,b* as shown in FIGS. 2A, 2B, to adjust or accommodate the refractive error in their eyesight. However, this movement of the microscope optics results in a scanned tissue sample or other scanned object of interest (for example, the eye under surgery) no longer being positioned at the actual focal plane of the microscope objective lens 210 provided by the OCT scanner system 206. In other words, if the microscope is improperly used then the focus of the OCT beam 312 may need to be adjusted accordingly to compensate using a focusing lens assembly such as focusing lens assembly 314.

In some embodiments, the OCT objective lens 510 shown in FIG. 7 is a F2.7 Biconvex doublet lens. The objective lens 510 is coupled with a F19 Positive/Negative Meniscus doublet field lens 512 to turn the scanned collimated OCT beam 312 reflected from the surface 334 of the MEMS scanning mirror into an intermediate telecentric image plane shown in FIG. 7. The OCT returned light beam passes via the OCT field lens, then the OCT objective lens, and is then reflected again via the reflective surface 334 of the MEMS mirror along the OCT output arm 518 via the OCT collimating lens 516 (see also FIG. 5A) into an interferometer assembly (see the SD-OCT system 100 of FIG. 1).

In some embodiments, and as shown in the example embodiments of FIGS. 5A and 7, all air to glass interface surfaces such as surface 514 of the objective lens assembly 510 and the collimating lens 516 for the outward OCT beam 312 and returned OCT beam are convex to eliminate back reflection artefacts in the OCT image.

In some embodiments, the total track length L within the scanning mirror assembly optical block is the sum of the length L1 from the end face 530 of the optical fibre 308*a* at the optical fibre ferrule 532 to the reflective surface 334 of the scanning mirror and L2, the track length on from the surface 334 to the telecentric image plane 700 as shown in FIG. 5A. The total track length L=L1 plus L2 is preferably less than 40 mm.

In some embodiments, the optical path difference OPD at the sample being scanned has an OPD curvature greater than 100 mm.

In some embodiments, the OCT scanning or probe beam is telecentric to better than 0.03 degrees incident angle.

In some embodiments, focusing system 314 provides a mechanism for the OCT beam 312 to be adjusted so that the OCT focal plane can be controlled within a ±30 mm range to align with the microscope optical channel focal plane.

In some embodiments, the MEMS OCT scanner has a lateral X-Y profile where X is less than 42 mm and Y is less than 35 mm as FIG. 5A shows schematically which allows the OCT scanner system housing to laterally fit within the lateral housing profile of the microscope optics carrier footprint. This is advantageous as it reduces obstructions in the sterile field for surgical applications. In some embodiments of the optical block implementing the scanning mirror assembly 310, the optical block dimensions are laterally a width, X, of around or equal to 40.6 mm and a depth, Y, of around or equal to 34.5 mm with a track length L of about 40 mm or less.

In some embodiments, the scanning mirror assembly further comprises an optical angular displacement measurement system 156 for determining the angle of tilt of the reflective surface relative to incident light comprising at least: a point light source, a collimator lens assembly for collimating light from the point light source to form a collimated mirror position measuring light beam which is incident at the reflective surface; and a position sensitive detector, wherein the reflective surface is configured to reflect the incident collimated light beam in the first optical plane to form a reflected position measuring light beam which travels towards the position sensitive detector.

In some embodiments of the scanning mirror assembly 310 described hereinabove and with reference to FIGS. 5A and 5B of the drawings, a closed loop control of the position of the reflective surface of the MEMS mirror is provided by the position sensitive detector being configured to provide angular displacement measurement information to a controller configured to control an angle of tilt of the reflective mirror surface relative to an illuminating light beam. In some embodiments, the closed loop control uses a PID feedback loop to adjust the drive voltages to the MEMS based on position and also dampens the ringing artefacts caused by fast directional changes.

Advantageously, in some embodiments, where the scanning mirror assembly comprises a scanning mirror assembly 310 in OCT scanning apparatus 206, an input beam comprises an OCT probe beam 312 which is reflected through optical components along an OCT probe beam arm of the scanning mirror assembly towards a sample or similar object of interest 116. The scanning mirror assembly 310 is configured to output the OCT probe beam 312 as a telecentric OCT probe beam towards a focal plane 154 at the sample and the optical path length from the optical source 102 of the OCT probe beam to the sample focal image plane 154 is configured to be equivalent to that followed by a reference OCT beam from the same OCT optical source 112 along a reference arm 103 of a connected interferometer OCT system 100 for 2D scanning of the sample area 116.

In some embodiments, the MEMS scanning mirror assembly 310 disclosed herein is provided as an optical block 310 in an OCT scanner adapter 206 for a surgical microscope 200 which forms part of a connected OCT system 100. Such an OCT scanner adapter 206 preferably has at least a lateral footprint X within or equal to the footprint of the surgical microscope housing and preferably has a length or depth footprint also within the footprint of the microscope. The OCT system 100 outputs an interference signal comprising the OCT scan data 146 to the image processor 148 of the OCT system 100. The image processor 148 then processes the interference signal 146, for example, it may perform a signal transform such as a Fourier transform which allows an OCT image showing internal scanned structures within the scanned area to be displayed in an image on a display 152.1 This image can be generated in real-time in some embodiments so as to guide to a surgeon and/or guide other parties on one or more suitable displays 152 in some embodiments.

In some embodiments of the OCT scanner adapter 206, the OCT scanner adapter 206 is configured to be fixed to the undercarriage of a housing of microscope optics of a surgical microscope, wherein the OCT scanner adapter 206 adds less than 40 mm, preferably less than 36 mm, to the stack height of the surgical microscope.

In some embodiments of the OCT scanner adapter 206, the OCT scanner adapter 206 is configured to be fixed to an undercarriage of the microscope optics housing and aligns an objective lens 114, 210 of the OCT scanner adapter 206 with an optical channel of the microscope optics when the lateral footprint of the housing 208 of the OCT scanner adapter 206 sits within the lateral footprint of the housing 202 of the surgical microscope 200.

In this manner, a surgical microscope, for example, a surgical microscope 200 such as that shown in FIGS. 2A and 2B comprising microscope optics, a housing 202 containing the microscope optics, and an OCT scanner adapter 206 can be provided according to an embodiment of the present invention where the OCT scanner adapter 206 includes a scanning mirror assembly according to an embodiment of the present invention, for example, such as that shown by way of example in FIGS. 5A and 3B. The OCT scanner adapter 206 may be configured to output image data which is later input into an image processor of an OCT system such as the OCT system shown in FIG. 1.

Some embodiments of the above disclosed micro-electro-mechanical system, MEMS, two-dimensional scanning mirror assembly (310) accordingly comprise a scanning mirror assembly having an optical design comprising a moveable MEMS scanning mirror having a reflective surface 334, a point light source 308*a* for a light beam, a collimating lens assembly 516 configured to receive light from the light source and output a collimated light beam with an exit beam diameter above a threshold towards the reflective surface 334, and an objective lens assembly 510, 512 via which a collimated light beam reflected from the reflective surface exists the scanning mirror assembly. The reflective surface 334 is configured to reflect an incident collimated light beam to form a probe beam 312 which exits the mirror assembly as a telecentric beam (312) towards a telecentric image plane with a resolution better than a threshold for the telecentric beam resolution. The optics of the scanning mirror assembly are configured to provide a total track length, L, from the point light source to the telecentric image plane (700) less than 40 mm and the scanning mirror assembly may be provided in an optical block which is less than or equal to 41 mm wide, preferably 40.6 mm wide and less than or equal to 35 mm, preferably 34.5 mm long, excluding the optical fibre connector 308 and MEMS support 500 (see X and Y for the block dimensions shown in FIG. 5A).

Examples of Beam Steering and Feedback Control

The scanning mirror assembly is provided in some embodiments with a system for controlling beam steering which uses a closed loop feedback mechanism to enable high scan rates. In some embodiments, the embodiments of the closed loop feedback system for a scanning mirror are used in a scanning mirror assembly 310 of an OCT system 100. For example, in some embodiments, it may be used in for an OCT scanning mirror assembly provided in an OCT adapter 206 for a microscope such surgical microscope 200 shown in FIGS. 2A and 2B.

Some embodiments of the disclosed feedback system comprise a mirror positioning detection system 156 and a controller 162 and form part of the OCT scanner 164 shown in FIG. 1.

Figure 11A:
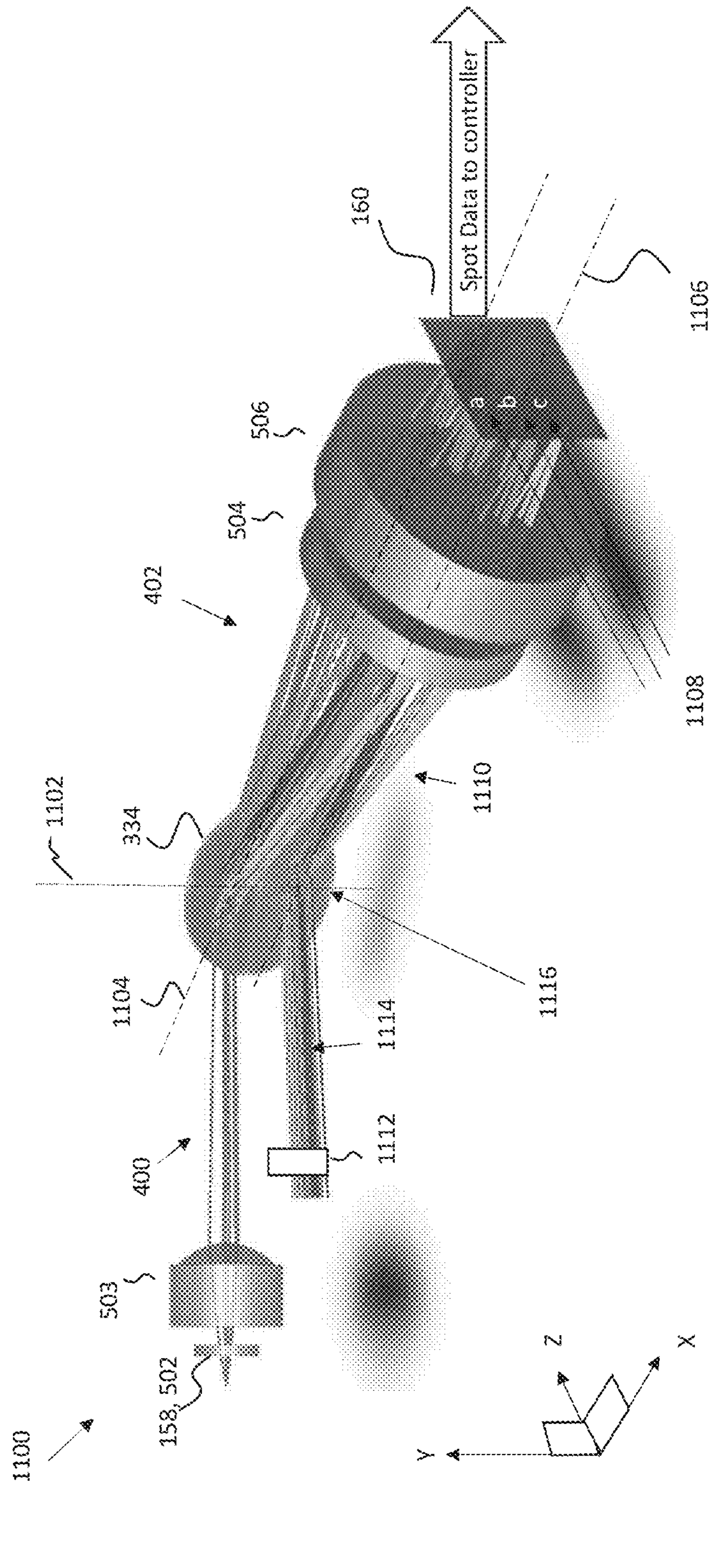
FIG. 11A shows schematically an example of a non-sequential ray trace for an optical feedback channel of a MEMS based scanning mirror assembly according to some embodiments of the present invention.
Figure 11B:
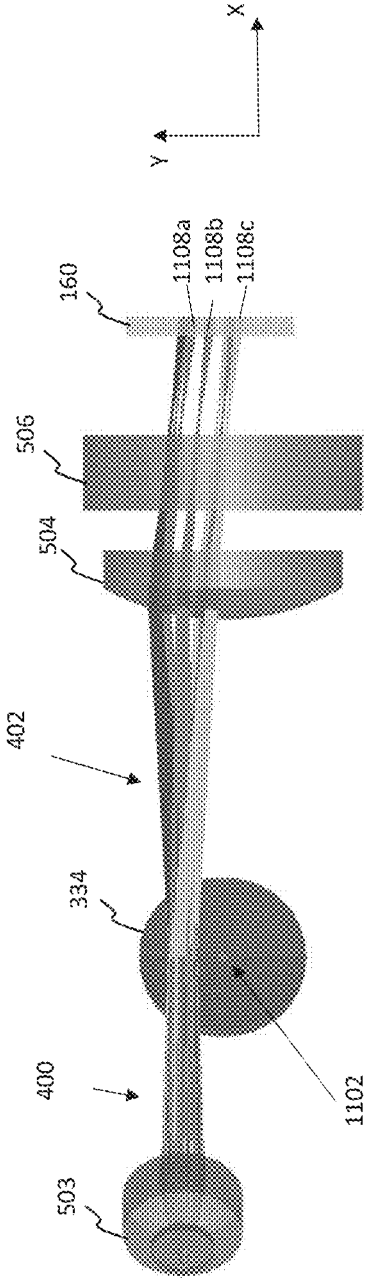
FIG. 11B shows schematically an example of a Zemax ray trace of Laser Diode Illumination reference beam reflected from an example of a MEMS scanning mirror and imaged on to an example Position Sensitive Detector according to some embodiments of the present invention.

FIGS. 11A to 11B show an optical arrangement for determining the position of a scanning mirror which is used in an optical feedback system 1100. In the example embodiment shown in FIGS. 11A to 11C, the scanning mirror reflective surface 334 is configured to reflect a primary light beam, for example, comprising OCT probe beam light (for example, light from an OCT light source 102) in one optical plane and also reflect light from another light source, for example, referred to as a secondary light source 158, 502 in a different optical plane, which is used to determine the tilt angle of the mirror reflective surface 334. The separation of the light beams into two different optical planes advantageously may help provide a suitably high signal to noise ratio at a position sensitive detector 160 for a tilt angle position of the scanning mirror reflective surface 334 of the scanning mirror assembly 310 to be more accurately and quickly determined. This may support real-time image processing at a level of resolution suitable for providing OCT images of a sample or tissue as the sample or tissue is being operated on by a surgeon or similar user.

Achieving such high scan rates can be challenging given the design constraints that OCT adapters for surgical microscopes are subject to.

Figure 8:
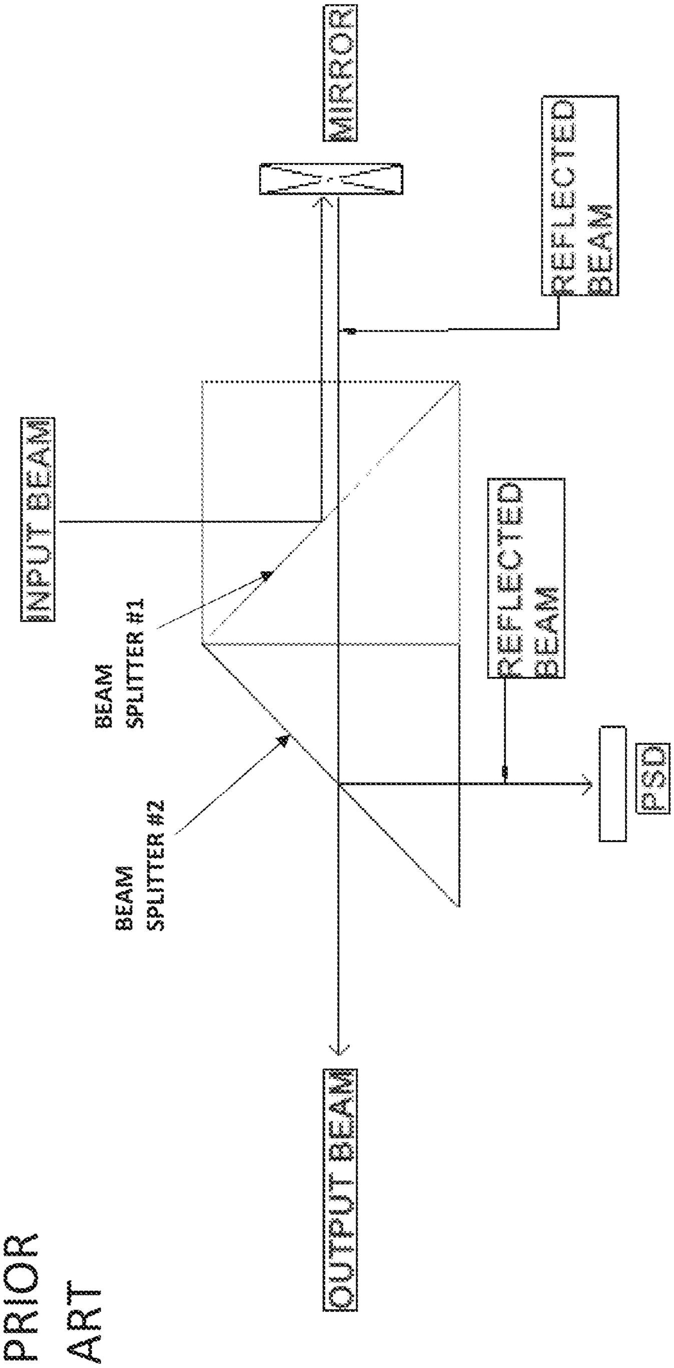
PRIOR ART FIG. 8
FIG. 8 shows schematically an example of a MEMS scanning mirror optical beam-splitter arrangement having a different optical design to that of the embodiments of the present invention.

In FIG. 8, an example of a known beam steering arrangement is shown schematically which uses using a 2D mirror such as a MEMS device which has a different optical arrangement to that of the disclosed embodiments. In the example shown in FIG. 8, a series of one or more optical beam splitting devices are used to enforce orthogonality of input and output light beams reflected beams from the MEMS mirror surface. As shown in FIG. 8, the input beam is incident at beam splitter #1 which reflects the input beam so that it is incident normal to the steering or scanning mirror surface. The reflected beam passes through the beam splitter #1 and is then partially reflected from another beam splitter #2 as a mirror position reference beam which can be detected by a position sensitive detector and is partially transmitted through the beam splitter #2 to form an output beam. In this way, the input beam does not suffer from compound angle distortion and therefore scan distortions are limited to the mechanical limits of the MEMS mirror device itself. This type of known beam steering arrangement has a PSD but does not use the PSD for closed loop control and as a result MEMS mirrors are driven at relatively slow scanning rates. Other disadvantages of such known systems when used for interferometric imaging applications such as OCT include, as the parallel faces of the optical beam splitter act as a secondary reference surface, artifacts in the OCT scan image. Another disadvantage is that beam splitting results an unacceptable signal to noise degradation.

Some embodiments of the present invention accordingly seek to mitigate or obviate some of the above technical problems by providing a beam steering system which uses a MEMS scanning mirror assembly which is illuminated by a scanning mirror position reference beam which is incident in an optical plane off the optical axis of the reflective surface of the mirror with a non-normal angle of incidence. The use of a reference illumination beam which is off-axis and/or which is incident with a non-normal Angle of Incidence (AOI) reduces or eliminates reflections from any secondary reference surfaces and so helps maintain a much better signal to noise ratio than known systems are able to provide.

Some embodiments of a beam steering assembly according to the present invention can be used to provide beam steering for a scanning mirror assembly such as the scanning mirror assembly 310 shown in FIG. 5A described herein above, where the optical feedback mechanism comprises a laser diode source 158 directing a reference beam of light 400 towards the MEMS scanning mirror. The reference beam of light is incident with angle θ at the scanning mirror reflective surface 334. The reflected reference beam 402 then passes via the PSD imaging lens assembly 504 and optionally via a neutral density filter 506 onto the PSD 160.

The beam steering assembly disclosed herein maintains a very high signal to noise ratio at the PSD 160 of the scanning mirror assembly 310 so as to optimize the performance of an optical feedback scan control system which controls the position of the reflective surface 334 of the MEMS mirror assembly in a way that supports a high A-scan rate.

In order to maintain a very high signal to noise ratio on the PSD 160 scattered or stray light is reduced as much as possible within the optical feedback channel.

Some embodiments of the scanning mirror assembly 310 achieve this by setting the geometric distortion ratio at the reflective surface 334 to roughly 2:1. This allows the optical feedback channel to then be physically offset from the central optical axis, for example, see FIGS. 13, 14A and 14B described later below. This allows any unwanted reflected elements of the mirror positioning beam 402 which were reflected from the surface of the PSD 160 to be equally but oppositely offset from the optical axis allowing for back reflection suppression via a light trap (see FIG. 14B for example) as opposed to being reflecting directly back via the reflective surface 334 into the laser diode illumination source 158 of the optical feedback channel.

Figure 9:
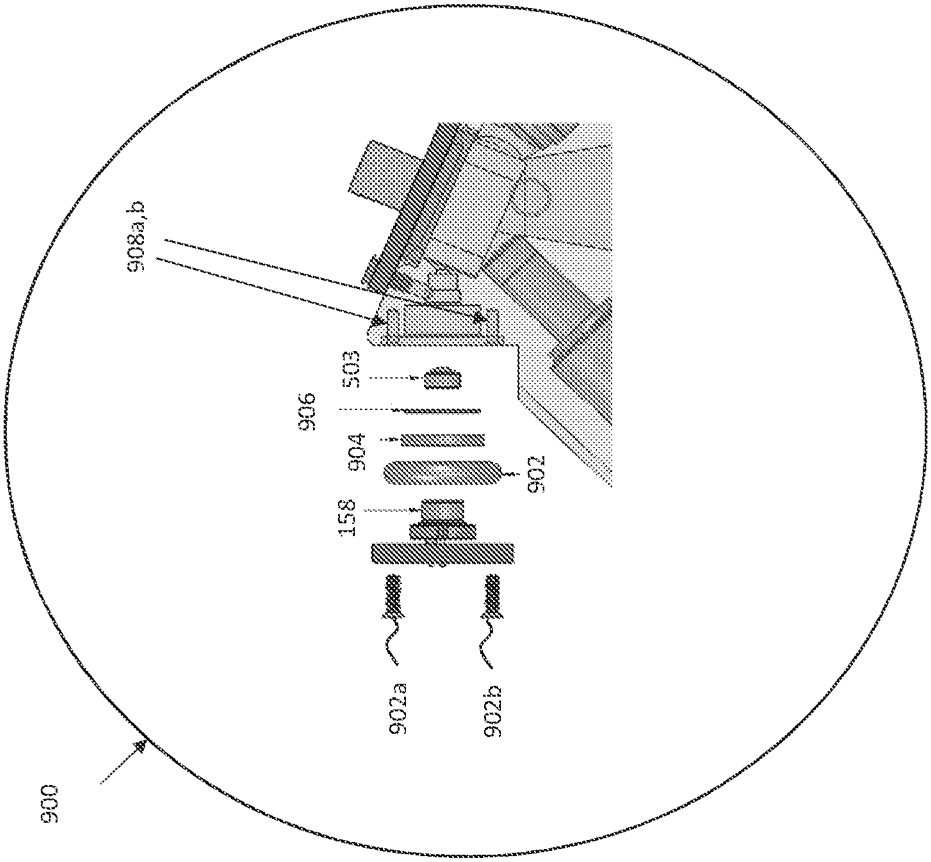
FIG. 9 shows schematically an example of an optical source assembly for providing a reference beam for mirror position feedback for a MEMS based scanning mirror assembly according to some embodiments of the present invention.

FIG. 9 shows schematically an example of an optical source assembly for providing a reference beam for mirror position feedback for a MEMS based scanning mirror assembly according to some embodiments of the present invention, for example a MEMS based scanning mirror assembly 310 such as FIG. 5A shows. The optical source may be used in some embodiments in an OCT scanner 206 such as that shown in FIGS. 2A, 2B, 3A, 3B and 4.

In FIG. 9, an example of an embodiment of a light emitter assembly 900 of a scanning mirror assembly 310 is shown in more detail. As shown in FIG. 9, the light emitter assembly comprises a point optical source for example, a laser diode, such as the optical point source 158 shown in FIG. 5A, and a collimating lens 503 of FIG. 5A in more detail, for the angular displacement measurement optical feedback mechanism 156. The laser 158 which is configured to direct a beam of light 400 (see FIG. 5A) towards the reflective surface 334 of the MEMS scanning mirror assembly 310.

The collimating lens 503 (see FIG. 5A) is used to reduce the divergence of the laser diode emitted light beam 400. The collimating lens is held in place via a lens spacer 906. In some embodiments, the lens spacer 906 comprises a 250 μm thick polycarbonate film which is retained by a suitable retainer 904, such as an O-ring, or for example, a square profile acrylonitrile butadiene O-ring. In other embodiments, however, a spring steel retainer ring 904 may instead or in addition be used to retain lens spacer. In the embodiment of the light emitter assembly 600 illustrated in FIG. 6, the point optical source 158 is a laser diode. This is suitably mounted on a support, for example, on a printed circuit board in some embodiments.

The light source 158 for the reference beam 400 may be aligned and focused via a plurality, for example, four, fine pitch screws such as those shown in FIG. 9 as 902*a*, 902*b* (just two pitch screws are visible in FIG. 9). These screws 902*a-d*, are driven into receiving apertures 908*a,b*, as shown in FIG. 9. The apertures 908 are preferably threaded and allow screw receiving apertures. In some embodiments, a 2 mm thick fluoropolymer elastomer provides spring force tension to stabilize the light emitter assembly when the pitch screws 902*a,b* are engaged with corresponding receiving apertures 908*a,b*.

Figure 10:
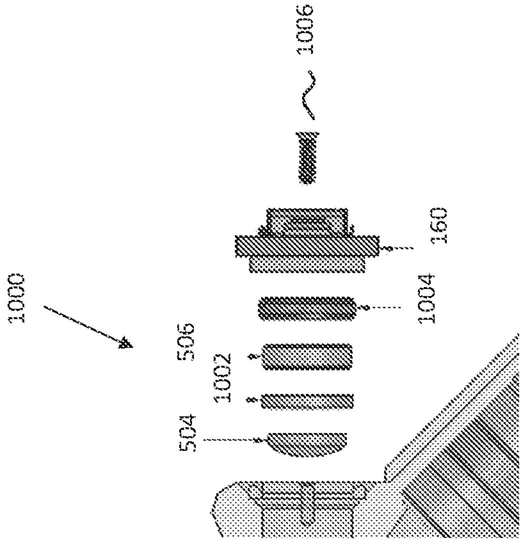
FIG. 10 shows schematically an example of a position sensitive detector assembly for detecting a mirror reference beam position in a MEMS based scanning mirror assembly according to some embodiments of the present invention.

FIG. 10 shows schematically an example of a position sensitive detector, PSD, assembly 1000 for detecting a mirror reference beam position in a MEMS based scanning mirror assembly according to some embodiments of the present invention, for example a MEMS based scanning mirror assembly 310 such as FIG. 5A shows. The PSD assembly 1000 may be used in some embodiments in an OCT scanner 206 such as that shown in FIGS. 2A, 2B, 3A, 3B and 4 such as the scanning mirror assembly shown in FIG. 5A.

In FIG. 10 an example embodiment of the PSD assembly 1000 is shown comprising an imaging or focusing lens assembly, for example, the imaging lens 504 shown also in FIG. 5A. In FIG. 10, light from the MEMS mirror reflective surface 334 passes first through the focusing lens 504 which is retained by a suitable lens retainer 1002, before passing, in some embodiments, through an optional neutral density filter 506 which is separated from PSD 160 by a retainer ring 1004.

The PSD imaging lens 504 (also referred to herein as the PSD focusing lens 504) sets the spot size for the reference beam at the PSD 160 to above a minimum threshold required for detection at the PSD. The PSD 160 may comprise any suitable type of PSD, for example it may comprise a silicon photodiode PSD in some embodiments. Also shown in FIG. 10 is a threaded screw 1006 for allowing adjustments of the PSD position although other suitably adjustment mechanisms may be used in other embodiments.

The PSD imaging lens 504 shown in FIG. 10 along with the other optical components 506, 1002, 1004, and 1006 configure the PDS 160 so it can be used to capture a range of tilt angle MEMS mirror positions, for example, ±5° of MEMS motion about its rotation axis. The PSD lens reflects the incident reference beam 402 onto a suitably sized, for example, 4 mm×4 mm, photo sensitive area of the PDS 160. This configuration has been found to allow far more accurate closed loop control of MEMS scanning mirror than systems than is known in the art.

The neutral density, ND, filter 506 shown positioned adjacent to the PSD retainer ring 1004 in FIG. 10 is optional in some embodiments. When used in an embodiment, the ND filter 506 reduces the magnitude of stray light significantly based on the attenuation value of the ND filter 1008 acting on that beam in both directions. This is achieved due to the double pass through the ND filter 506 required by stray light from back reflections off the PSD 160 which reduces the sensitivity of the PSD 160 to any spurious stray light from the emitter source 158.

FIG. 11A shows schematically an example non-sequential ray trace of the optical feedback channel, where RGB colored rays have been rendered using a grey-scale color scheme. The color scheme is an artefact used to differentiate spatial separation of the beams, i.e. each color, rendered as a shade of grey, represents a beam from a different mirror angle and does not represent a chromacity reference as the mirror positioning light source 158, in other words the laser diode 502, is a single wavelength emitter.

FIG. 11A illustrates schematically an embodiment of an optical feedback system 1100 for a MEMS scanning mirror assembly 319 comprising a light emitter such as light emitter 158, 502 shown in FIGS. 1 and 5A of the drawings of the OCT system 100 and scanning mirror assembly described herein above. The light emitter 158, 502 emits a light beam which passes through a collimating lens 503. The illuminating collimated laser light beam, 400, is directed towards a reflective surface 334 of the two-dimensional MEMS scanning mirror assembly which has a vertical optical axis 1102 about which the mirror is tilted to perform scans. The mirror reflective surface is two-dimensional in the sense that it reflects incident light beam 400 in a separate optical plane to the optical plane of any OCT incident light by tilting both vertically and horizontally. The reflected light beam forms a mirror position reference beam 402.

The collimated reference light beam 400 from the laser diode light source 158, 502 forms a reference beam 402 for determining the scanning mirror tilt position about its optical axis using PSD assembly 160. The reference beam 400 is incident at the reflective surface 334 of the MEMS mirror assembly at an angle which reduces geometric distortion in an upper vertical plane above the optical centre 1116 of the reflective mirror surface 334.

The optical feedback system 1100 illustrated in FIG. 11A demonstrates how the 2:1 geometric distortion ratio along the a y-axis scan length of the MEMS mirror assembly 310 may be used to offset the incident optical path 1104 (the dash dot line in FIG. 11A).

In embodiments where the optical feedback system 1100 is used in a scanning mirror assembly for OCT scanning, such as scanning mirror assembly 310 in an OCT adapter 206, the optical center of the mirror along optical axis 1116 is where the OCT scanning or probe beam 312 is incident.

The reflected PSD reference beam 402 follows the optical path 1104 from the reflective mirror surface 334 towards the PSD device 160 via the PSD focusing lens 504 and ND filter 506 in the embodiment illustrated in FIG. 11A. At the PSD detector 160 the reference beam is detected as a spot on its detection surface. In FIG. 11A, multiple spot locations represent different mirror positions. This is shown as the beam being deflected into different spots 1108*a,b,c*. The position of each of the spots indicates a different tilt angle of the reflective surface about its vertical axis. The reference beam reflected from the PSD 160 returns as beam 1110 along optical path 1106 back towards the MEMS scanning mirror where the beam is now incident in an optical plane lying below the optical center 1116 of the reflective surface 334. The reflective surface 334 then reflects the incident beam 1110 to form beam 1114 which travels into light trap 1112. Light trap 1112 is positioned in a location which does not interfere with the emitter 158 or the emitted reference beam 400. Light trap 1112 is described in more detail later below.

FIG. 11B shows schematically another view of the non-sequential ray trace shown in FIG. 11A. In FIG. 11B an example of a Zemax ray trace of the laser diode Illumination reference beam 400 reflected from a reflective surface 334 of a MEMS scanning mirror assembly is shown from the side where it is clearer how the reference beam 400 is imaged on to the PSD 160 according to some embodiments of the present invention.

Figure 11C:
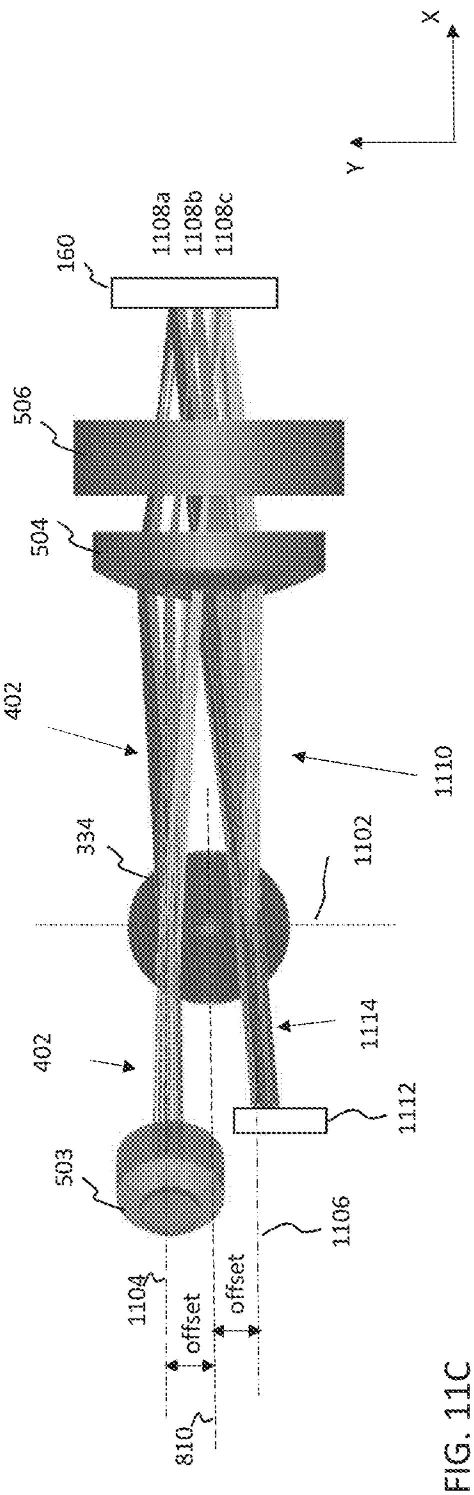
FIG. 11C shows schematically an example of a Zemax ray trace of a Laser Diode Illumination reference beam reflected from the Position Sensitive Detector, reflected off the MEMS mirror and propagating to the light trap location according to some embodiments of the present invention.

In FIG. 11B, the laser diode source 502 is the emitter 158 of the illumination reference beam 400 which is incident on a reflective surface 334 of the MEMS scanning mirror assembly 310 via collimating lens 503. The reflected reference beam 402 is centred on the optical path 1102 in an optical plane above the central optical plane of the reflective surface 334. The reference beam 402 passes through focusing lens 504 and a ND filter 506 to the PSD 160 where it is reflected (see FIGS. 11A and 11C) back as a reflected reference beam 1110 along an optical path 1106 back towards the MEMS mirror. FIG. 11B shows by way of example how the reference beam forms spots 1108*a,b,c* on the surface of PDS 160 as a scan progresses. FIGS. 11A and 11C show non-sequential ray traces, in other words, ray traces in both the forward and reverse direction.

The configuration of the optical components shown in FIGS. 11A, 11B and 11C in some embodiments results in equal offsets about the optical centre of the MEMS mirror as shown in FIG. 11C of the illumination reference beam 400 and reflected reference beam 402. In some embodiments, the laser diode source illumination beam 400 is offset from the optical centre 1116 of the reflective surface 334 of the MEMS mirror by approximately 1 millimetre. As mentioned above, the optical centre of the MEMS mirror coincides with the optical axis of the OCT channel. In FIGS. 11A, B, and C the same numbering scheme is used as was used in the other drawings.

FIG. 11C shows schematically another view of an example Zemax ray trace of the laser diode illumination reference beam 400 reflected from the PSD 160 in the embodiment of FIGS. 11A and 11B.

Figure 12:
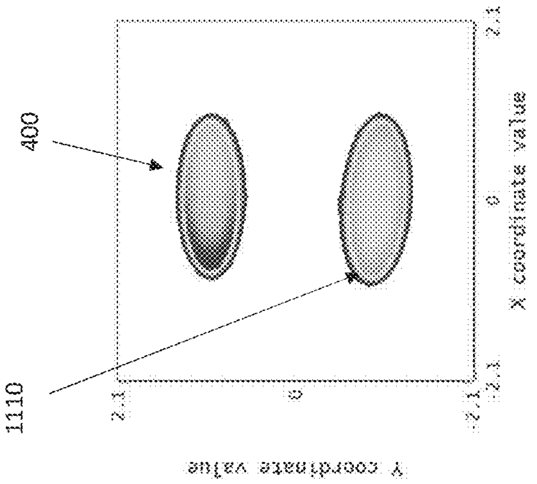
FIG. 12 shows an example of beam spot locations on a reflective surface of the MEMS scanning mirror according to some example embodiments of the present invention.

In FIG. 11C, the ray trace of shown in FIG. 11B now includes the reflected beam 1110 from the PSD 160 as it propagates back through the ND filter 1118 and focusing lens 1116, to the reflective surface 334 which reflects the reflected reference light beam 1110 as beam 1114 to light trap 1112. As shown in FIG. 11C, the light trap 1112 is located below the emitter 158, in other words below laser diode 502. In the embodiment of FIG. 11C, the reflected beam 1110 from the PSD 160 is reflected at the reflective surface 334 in an optical plane which is equally but oppositely offset from the central MEMS mirror optical axis shown as 1116. In some embodiments, the illumination beam 400 and returned reference beam 1110 are separated by approximately 2 millimetres in the vertical (y-axis) direction at the laser diode source and the light trap locations as FIG. 12 shows.

The reference beam 400 has a sufficiently high angle of incidence relative to the reflective mirror surface to allow separation of the emitted and reflected reference beam 400, 402 from the returned or reflected beam from the PSD, beam 1110. By allowing the reference beam to pass through a focusing PSD lens before it is incident on the detecting surface of the PSD 160, the beam 402 is focused toward the MEMS mirror optical axis 1116 and the resulting reflected beam 1110 has an equal but opposite offset relative to the MEMS mirror optical axis 1116. If the angle of the reference beam light is less than 62 degrees in some embodiments of the feedback system shown in FIGS. 11A-11C when it is incident at the scanning mirror, the spread of the beam as it is incident off-axis is so large that the outgoing reference beam may not be distinguished from returned reference beam light and/or in some embodiments the OCT beam light.

In other words, the high AOI of beam 400 relative to the MEMS surface 334 creates an increased distortion in the Y direction. As the mirror tilts +/−5 degrees in the horizontal (X) direction the scan length remains unchanged for all AOI values. However, as the AOI increases from the normal position relative to the MEMS mirror surface 334 the resulting scan length in the Y direction from a +/−5 degrees tilt in the vertical direction begins to shorten such that by the time you get to 67.5 degrees AOI the Y scan length is roughly ½ the value of the X scan length. So the higher the AOI the more distortion(shrinkage) in the Y direction, if there is too much shrinkage distortion in the Y direction the input beam 400 can be offset from the optical centre 810 by 1 mm and the 402 beam from the +/−5 degrees tilt will still make it through the PSD lens which is the limiting aperture.

The embodiments of the present invention can use a PSD lens 504 which refracts (focuses) the 402 beam to the PSD surface 1108. The refraction results in the 402 beams hitting the PSD surface at a given AOI and the PSD surface reflects those 402 beams at an equal but opposite angle of exit, AOE. This creates a vertical separation between the mirror positioning reference beam 402 and the reflected beam 1110. If there was no PSD lens 504 provided, a mirror positioning reference beam 402 would, when there is no tilt, in other words a zero degree tilt of the MEMS mirror, be incident at 90 degrees to the detection surface of the PSD. This would result in a direct back reflection from the PSD into the light source, in other words, a back reflection into the laser diode 502.

The data from the position sensitive detector 160 is communicated to a mirror position controller 162, 1700 of a control system described later below with reference to FIG. 17.

FIG. 12 shows an example of beam spot locations on a reflective surface of the MEMS scanning mirror according to some example embodiments of the present invention. In FIG. 12, the relative positions of both the laser diode illumination beam 400 and the subsequent reflected beam 1110 from the PSD 160 on the surface 334 of the MEMS scanning mirror are shown in x-y coordinates corresponding to those shown in FIGS. 11A-11C.

Figure 13:
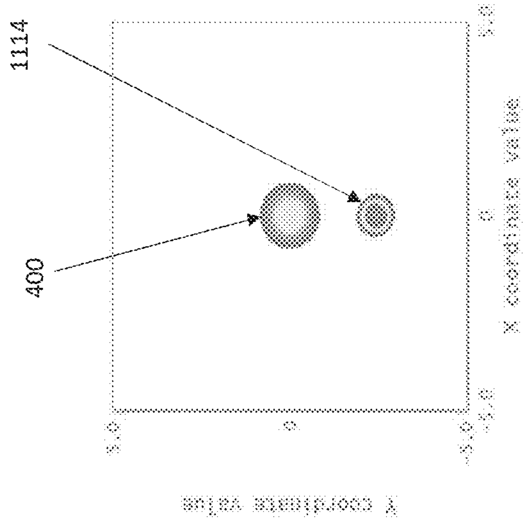
FIG. 13 shows examples of relative beam spot locations for a laser diode illumination reference beam and a returned reference beam reflected from the PSD at the light trap location.
Figure 15:
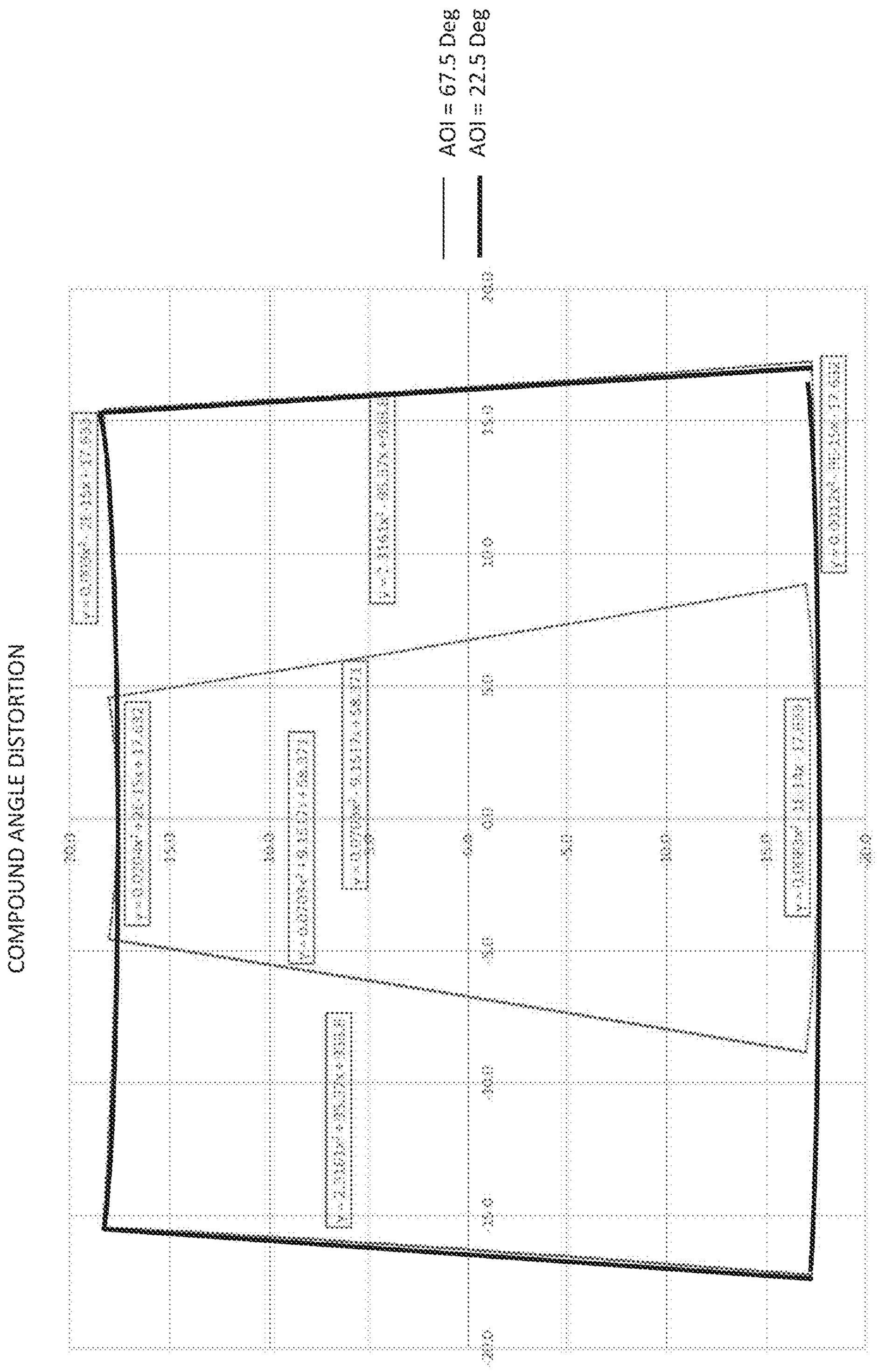
FIG. 15 shows examples of geometric compound angle scan distortion as a result of non-normal angle of incidence on a MEMS based 2D scanning mirror according to some embodiments of the present invention.
Figure 16:
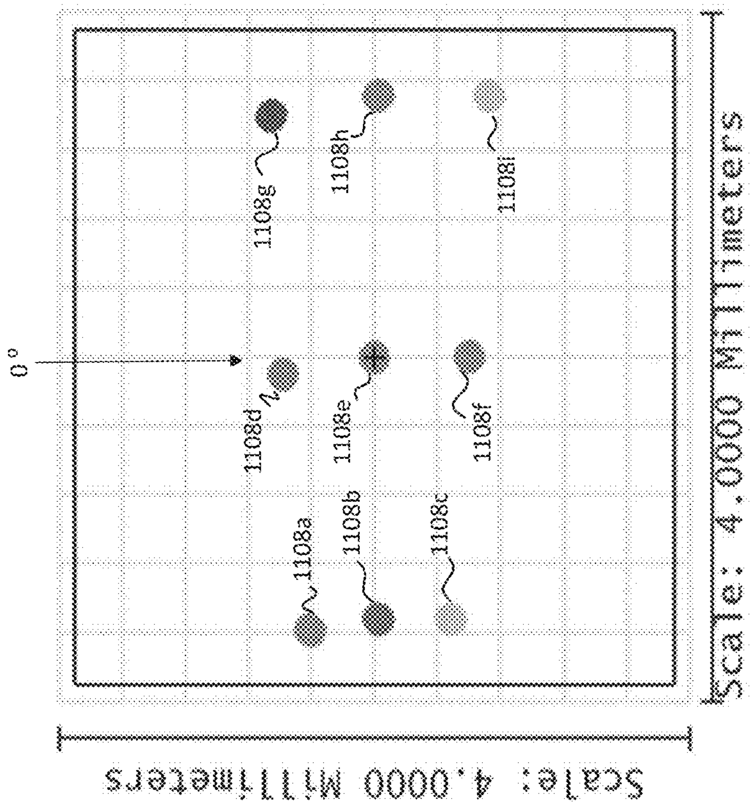
FIG. 16 shows an example of a Zemax spot diagram for a PSD surface according to some embodiments of the present invention.

FIG. 13 shows, for the location of the light trap 1112, examples of relative beam spot locations for the reference beam 400 and the returned beam 1114 reflected from the PSD 160. The relative positions of both the laser diode source beam exit 1402 (see FIG. 14) and the subsequent reflected beam 1114 from the PSD device traced back to the light trap location are shown. The scales shown in FIGS. 12 and 13 and also in FIGS. 15 and 16 are by way of example only as would be appreciated by anyone of ordinary skill in the art.

Figure 14:
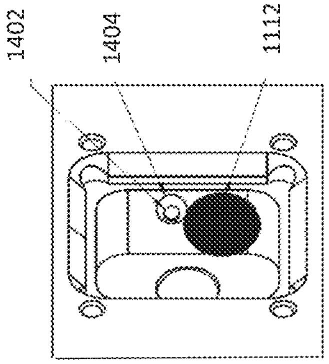
FIG. 14 shows schematically an example of a light trap location in the MEMS scanning mirror assembly according to some embodiments of the present invention.

As shown in the embodiment of FIG. 14, the light trap location is positioned directly below the laser diode source beam exit 1402. The offset of the laser diode source optical axis relative to the light trap 1112 allows the returned reference beam 1110 from the PSD 160 to be equally offset in an optical plane to the optical plane where the illumination beam 400 was incident at the reflective surface 334 of the MEMS mirror assembly. This provides a clear separation between the illumination beam 400 and reflected beam 402. Without such an offset, the reflected beam 1114 could impinge directly on to the laser diode source beam as it emerges from exit 1402, which could cause instability in the laser cavity amongst other problems FIG. 15 comprises a graph showing examples of geometric compound angle scan distortion (y-axis) as a result of non-normal angle of incidence (x-axis) for a MEMS based 2D scanning mirror assembly 310 including an optical feedback system 1100 according to some embodiments of the present invention.

Some embodiments of the scanning mirror assembly 310 which use an optical feedback system comprising the optical components shown in FIGS. 11A to 11C are shown in FIGS. 3A, 3B and 3C. The scanning mirror assembly 310 uses an off-axis or non-normal angle of incidence, AOI, so that the emitter beam 400 avoids secondary reference surfaces and maintains a better, preferably the highest possible, signal to noise ratio.

In some embodiments, the rotational axes of the two dimensional, 2D, scanning mirror assembly 310 are not decoupled. This can be contrasted with prior art galvanometric based scanning mirror constructions which are coupled. As a result, however, a geometric distortion may be introduced due to the resulting compound angle defining a non-linear reflection angle. Such a non-linear reflection angle arises as a result of a linear angle deflection from a 2D mirror for any given angle of incidence. In other words, scanning mirror systems which use a linear mirror tilt result in a parabolic scan trace being generated. The magnitude of the distortion relative to the angle of incidence as is shown in FIG. 15.

This geometric distortion shown in FIG. 15 is most significant in the deflection angle orthogonal to the AOI of the emitter beam 400 when incident on the 2D reflective mirror surface 334. In other words, if the AOI defines deflection in the X-axis, then y-axis deflection will suffer more from geometric distortion. A symmetrically square mirror angle tilt thus results in a series of parabolic curves symmetric about the optical axis plane.

As indicated in FIG. 15, the resultant geometric scan distortion due to the compound angle of the incident and reflected beam consists of parabolic functions which can be derived as a function of AOI and mirror tilt angle. FIG. 15 illustrates a series of tilt angles of half degree increments in both the orthogonal x and y direction over ±5 degrees centered around an AOI of 22.5 degrees and 67.5 degrees at a focal distance of approximately 100 mm. This can be contrasted with the normal, orthogonal, in otherwords, 90 degree, AOI of the input and reflected beams at the mirror shown in the example prior art system of FIG. 8.

The parabolic function in the y-direction for a tilt angle of −5 degrees at a 67.5 degree angle of incidence can be represented by $y=0.02x^2+2E-15x+17.6$ whereas the parabolic function in the y direction for a tilt angle of +5 degrees can be represented by $y=0.008x^2+1E-14x-17.6$ with vertices symmetric about the origin but of opposite sign and in common with the 22.5 degree angle of incidence as represented by: $y=0.003x^2+2E-15x+17.6$ and $y=0.001x^{2+1}E-14x-17.6$.

The parabolic function in the x direction for a tilt angle of −5 degrees at a 67.5 degree angle of incidence can be represented by $y=0.07x^2+9.2x+58.4$ whereas the parabolic function in the y direction for a tilt angle of +5 degrees can be represented by $y=0.07x^2-9.2x+58.4$ with vertices symmetric about the origin but of opposite sign but not in common with the 22.5 degree angle of incidence as represented by $y=2.3x^2+95.4x+940$ and $y=2.3x^2-95.4x+940$.

FIG. 15 shows schematically how selection of a particular angle of incidence for the optical feedback channel allows the beam travel in the y-axis to be reduced in magnitude. In the example shown schematically in FIG. 15, the magnitude of y-axis travel can be reduced by roughly a factor of two between the 22.5 AOI (the thicker darker outline in FIG. 15) vs the 67.5 AOI (shown with a thinner lighter outline in FIG. 15). The curvatures can also be seen in the Zemax optical ray trace spot diagram at the surface of the PSD as shown schematically in FIG. 16. If the AOI is not sufficient to collapse the rectangle, in other words, shorten the Y axis scan length, in FIG. 15, it may not be possible to spatially separate the input reference beam 400 and output beams 1116.

FIG. 16 shows an example of a Zemax spot diagram for the reference beam 402 when incident at a detection surface of PSD 160 according to some embodiments of the present invention.

As shown in FIG. 16, different spot locations **1108*a*-1108*i* of reference beam light 402 are detected during a scan. The detected spot location data is then suitably communicated or transmitted by PSD 160 to a remote controller of a control system for the MEMS mirror position so that closed loop control can be implemented automatically. The remote controller and control system are configured to implement a closed loop feedback system. The spot 1108*a* for example may represent a tilt of −5 degrees in the x direction and +5 degrees in the y direction of the mirror about the optical axis z in some embodiments where the spot 1108*g* may represent +5 degrees of tilt in the x direction, and +5 degrees of mirror tilt in the y direction, the spot 1108*c* may represent the mirror being tilted −5 degrees in the x direction and −5 degrees in the y direction, and the spot 1108*i* may represent the scanning mirror surface 334** being tilted +5 degrees in the x direction and −5 degrees in the y direction about its z direction optical axis in some embodiments.

By configuring the scanning mirror assembly 310 to have a closed loop feedback system which uses an optical feedback system having the design shown in FIGS. 11A, 11B, and 11C with a suitable AOI for a collimated illumination reference beam from a laser diode source 502, a very high signal to noise ratio can be maintained on the PSD 160. This allows the scanning mirror assembly 310 to be used in OCT systems for surgical microscope and similar applications which require a very high signal to noise ratio to be maintained on the PSD to support high scan rates.

Advantageously, embodiments of the present invention have an optical mirror positioning design which reduces any source of scattered or stray light within the optical feedback channel and so may provide improvements over prior art systems.

Some embodiments of the present invention set the geometric distortion ratio, GDR, of the scanning mirror, for example the GDR as shown in FIG. 6, to roughly 2:1. Such a GDR allows the optical feedback channel to be physically offset from the central optical axis of the scanning mirror which allows unwanted beam reflections from the surface of the PSD 160 to be equally but oppositely offset from the optical axis as FIG. 11A for example illustrates schematically. This enables back reflection suppression to be implemented, for example, via a light trap, instead of reflecting directly into the emitter light source for the optical feedback channel.

Some embodiments of the micro-electrical mechanical system, MEMS, two-dimensional scanning mirror feedback system 1100 shown in FIGS. 11A-11C comprise a plurality of optical components, for example, an emitter or light source 158 for an illumination reference beam 400, such as laser diode 502, a position sensitive detector, PSD 160, a light trap 1112 and a scanning mirror assembly 310 having a reflective surface 334 configured to reflect an incident light beam 400 from the light source 158 as a reference beam 402 towards the position sensitive detector 160. The light source 158, the reflective surface 334, and the PSD detector 160 are configured such that the illumination light beam 400 is incident at the reflective surface (808) in a light plane offset from the optical centre 1116 of the reflective surface 334 of the MEMS mirror assembly 310. The illumination reference beam 400 incident at the reflective surface 334 of the MEMS mirror assembly 310 is in a light plane separate from a light plane in which a reflected, back-scattered or otherwise returned beam 1110 returned from the PSD detector 160 is incident at the reflective surface 334 of the MEMS mirror assembly 310. The light trap 1112 is configured to trap returned light 1114 from the PSD 160 which is reflected off the surface 334 of the scanning mirror assembly.

Embodiments of the feedback system 1100 the angle of incidence, AOI, of the illumination beam 400 incident at the MEMS mirror reflective surface 334 results in the angular geometric distortion of the scanning beam profile being reduced by a factor of 2:1 allowing the illumination beam 400 and any illumination light 1110 returned from the PSD 160 to be spatially separated in different planes at the MEMS mirror.

This allows the reference beam to be detected as a plurality of beams which are detectable as separate beam spots **1108*a-i* at the PSD 160. The PSD 160** is configured to generate beam spot data for a plurality of different incident beam locations which is then communicated to a controller of the scanning mirror tilt position.

In some embodiments, the beam spot data is used by the controller to implement closed loop control of the scanning mirror position, which allows higher scan rates to be achieved than if open loop control is implemented instead.

In some embodiments, the scanning mirror system is an OCT scanning mirror system.

In some embodiments, the OCT scanning mirror feedback system 1100 is part of a scanning mirror assembly for OCT which includes an optical source for an OCT scanning beam which is incident at the optical centre 1116 of the reflective surface 334 of the scanning mirror assembly 310.

In some embodiments of the feedback system 1100, the illumination beam 400 incident at the reflective surface of the MEMS mirror is in a light plane which is offset by an amount which is equal to the offset of a light plane in which the reflected reference beam 1110 returned from the PSD detector 160 is incident at the reflective surface 334 of the reflective surface 334.

In some embodiments of the feedback system 1100, wherein the geometric distortion ratio of the reflective surface 334 of the scanning mirror assembly 310 is approximately 2:1.

In some embodiments of the feedback system 1100, the reflective surface 334 of an OCT scanning mirror assembly 310 is configured so that an incident OCT scanning beam is incident closer to the optical centre or at the optical centre of the reflective surface 334 whereas the illuminating reference beam 400 used to provide optical feedback on the scanning mirror tilt position is incident at a reflective surface 334 in an optical plane vertically offset from its optical centre. In some embodiments, the reference light beam 400 is also offset from the vertical optical axis 1102 of the reflective surface about which the mirror rotates.

In some embodiments of the feedback system 1100, a neutral density filter 506 is located between the PSD 160 and a focusing lens 504 of the PSD lens assembly.

In some embodiments of the feedback system 1100, low specular reflective optical absorption material is provided along the optical path 1106 followed by light beam 1110 which returns from the PSD 160 back towards the reflective surface 334 of the scanning mirror assembly.

In some embodiments of the feedback system 1100, the system further comprises a spatial filter in the emitter optical path.

In some embodiments, the emitter light source 158 of the feedback system 1100 is a laser diode emitter 502.

In some embodiments, the emitter light source 158 is located vertically above the light trap 1112.

In some embodiments, the feedback system 1100 is included in an optical block of a MEMS scanning mirror assembly 310 of an OCT adapter 206 for a microscope 200, for example, an OCT adapter 310 such as is shown in FIGS. 3A, 3B and 4 comprising the optical block MEMS scanning mirror assembly of FIGS. 5A and 5B, or any of the embodiments disclosed herein.

In some embodiments, the scanning mirror is a high-speed scanning rate scanning mirror, for example, capable of generating B scans at 400 Hz.

Figure 17:
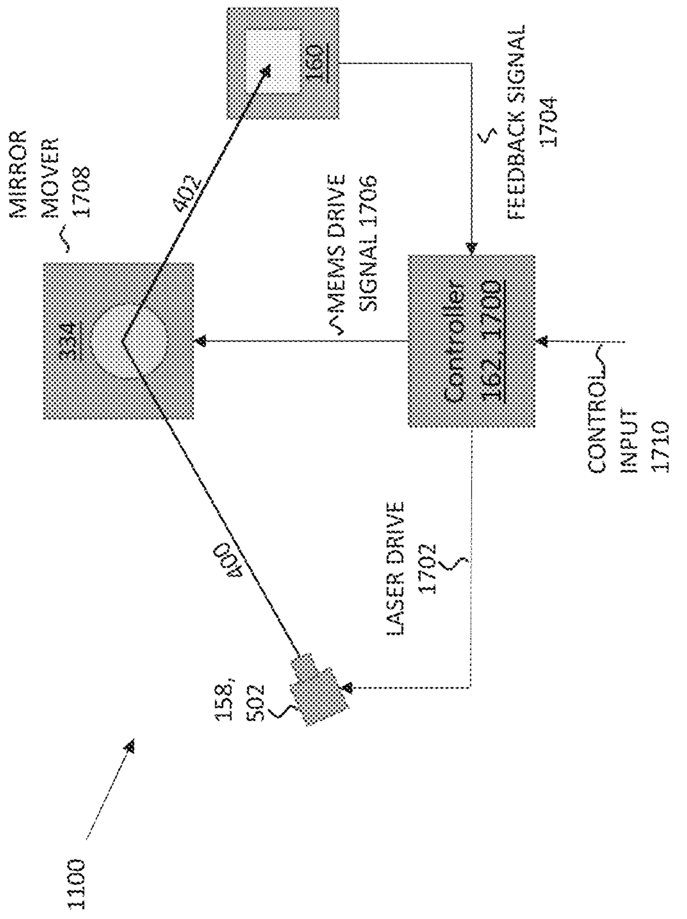
FIG. 17 shows schematically a closed loop optical feedback system according to some embodiments of the present invention.

FIG. 17 shows schematically a MEMs based scanning mirror optical feedback system such as the system 1100 shown schematically in FIGS. 11A to 11C.

In the embodiment of the scanning mirror position optical feedback system 1100 shown schematically in FIG. 17 for the micro-electrical mechanical system, MEMS, two-dimensional, 2D, scanning mirror assembly 310, the optical feedback system comprises at least the following components: a MEMS 2D scanning mirror assembly 310 including a reflective surface 334 such as that described above with reference to FIGS. 3A, 3B, 4, 5A and 5B of the drawings. The reflective surface 334 is configured to reflect light from two different light sources in two different optical planes. A first light source 308*a* is a source for a primary beam 312 which when it emerges from the scanning mirror assembly will be used as a scanning beam and which is steered by the tilt of the mirror surface. The other light source 158, 502 is a light source for a secondary light beam 400 which is used to determine the position of the reflective mirror surface with the position sensitive detector, PSD, 160 shown in FIG. 17. The PSD 160 provides feedback to a controller 162 on the mirror position, which allows the controller to update the mirror position more accurately as a scan using the primary light source progresses.

The feedback system can be used in variety of different use cases to determine a current position of mirror surface 334 and control how the mirror position changes during scans. Accordingly, in embodiments where the scanning mirror assembly 310 is used in an OCT adapter such as the OCT scanner adapter 206 shown in FIGS. 2A to 4, the primary beam 312 reflected by the scanning mirror reflective surface 334 comprises the OCT beam 312 generated by source 112 and input via optical fibre 308*a* into the scanning mirror assembly 310.

As shown in FIG. 17, after the secondary light beam 400 has been reflected by the reflective surface 334 it forms a mirror position reference beam 402. This reference beam 402 propagates towards the position sensitive detector, PSD 160 either directly or via one or more optical focusing elements, for example via a suitable PSD focusing system comprising the PSD lens 504 and/or neutral density filter 506 shown in FIG. 5A.

The PSD 160 shown in FIG. 17 is configured to detect incident light of the mirror position reference beam 402. The PDS 160 comprises a suitable light detecting 2D surface for detecting light at a variety of wavelengths which is configured to generate an optical feedback signal 1704 indicative of where the mirror position reference beam 402 is incident on the light detecting 2D surface. The PSD 160 is configured to send an optical mirror position feedback signal 1704 to the controller 1700 using a suitable data connection.

In some embodiments, the mirror position feedback signal is an optical, analog, signal which is transmitted to the controller along an optical fibre link. The signal may then be digitised at the controller 1700. Alternatively, as would be apparent to anyone of ordinary skill in the art, the analog optical feedback signal may be suitably digitised before it reaches the controller 1700, either at an intermediate analog-to-digital converter system apparatus or before it leaves the detector.

In some embodiments where an analog signal is generated by the PSD, this will be sent to the controller circuitry, for example, to a printed circuit board, pcb, assembly of the controller. This circuitry may include an OP Amp and one or more other signal conditioning components such as a dedicated low noise Analog to Digital converter. This allows a better quality of signal to be passed on to the microcontroller chip for a mirror mover mechanism used to control the movement of the scanning mirror reflective surface 334. Such controller circuitry may not fit inside the optical block but it may in some embodiments be housed within the OCT adapter housing 208, for example, it may be provided as a printed circuit board 321 as shown in FIG. 3B in some embodiments.

In some embodiments the microcontroller chip used to implement the closed loop feedback mechanism receives a signal from PSD and sends this with position request signal, for example, as may be determined by scan configuration parameters, and based on this sends a control signal to a mirror mover mechanism 1708.

For example, a user may select a scan pattern using a user interface for an application which configures OCT scans using the OCT system 100 shown in FIG. 1 in conjunction with the OCT scanner adapter 206 of the above FIGS. 2A to 5A in some embodiments. The OCT system application may generate a location table for each data point to be scanned in a voltage space and transmit the location table to the scanner 206, for example, via data port 212 to a microcontroller chip.

The user interface may be used to configure A-scan characteristics in some embodiments. in some embodiments the UI may also in some embodiments, instead or in addition, allow a user to simply request a “B-scan” etc. or other higher level input for a scan. The OCT system application reads out from the voltage table stored in memory and sends control signals to the microcontroller 321 which command the mirror to direct the OCT probe beam to go to each individual point in the voltage table.

By providing a closed loop feedback such as FIG. 17 describes in more detail below, it is possible to more accurately and more quickly position the scanning mirror reflective surface so that the OCT probe beam is correctly centred on each scan location indicated in voltage table using the mirror mover mechanism 1708.

FIG. 17 shows schematically how an example mirror mover mechanism 1708 is configured to be controlled by a drive signal 1706 by a controller 162, 1700 in an embodiment of the present invention. The drive signal 1706 is generated by the controller 1700 responsive to information conveyed by the feedback signal 1704. The mirror mover mechanism 1708 is configured, responsive to receiving a drive signal 1706 from controller 1700 to adjust the position of the MEMS mirror reflective surface 334 in at least one dimension, and preferably two in some embodiments. The mirror mover mechanism is part of the MEMS mirror system in some embodiments.

In some embodiments of the system shown in FIG. 17, the position of the MEMS reflective mirror surface 310 is detected by bouncing a reference beam 400 from a collimated light source such as laser diode 502 on the reflective mirror surface 334 into the PSD arm 501 of the scanning mirror assembly where the reference beam 402 then travels towards the PSD 160. The analog optical signal from the PSD 160 is suitably digitized and fed into a digital controller 1700 which is configured to drive the MEMS mirror mover and so creates a closed-loop control configuration. The controller 1700 is also configured to receive a control signal 1710 comprising position command input from an external scan drive engine such as the OCT system 100 shown in FIG. 1. In some embodiments, the mirror position drive signal 1706 is determined based on received control signals from the external scan drive entity and the feedback signal 1704 from the PSD 160.

In some embodiments, the mirror mover mechanism 1708 is configured to adjust the position of the MEMS mirror reflective surface 334 in at least two dimensions, in other words a closed-loop feedback system for controlling two-dimensional tilt of a MEMS-based scanning mirror assembly 310 is provided in some embodiments.

Depending on the type of detector array that makes up the detection array of the PSD 160 detection surface, the output of the PSD 160 may be an analogue or digital signal. However, in some embodiments, the PSD generates an optical analog feedback signal 1704 and this is transmitted in analogue form and later digitized at the controller 162, 1700.

In some embodiments, the light source 158, for example, a laser diode light source 502, is configured to receive a drive signal, for example, a laser driver signal, 1702 from the controller 164, 1700. The driver signal 1702 is generated by the controller based on information derived from the received feedback signal 1704 and/or the control signal 1710 from the externa scan driver system. The driver signal may be configured to turn the laser on/off and also control the laser diode power so as to not saturate the PSD in some embodiments. In some embodiments, the controller 164, 1700 comprises an external component outside the optical block forming the scanning mirror assembly 310 but located within the scanning apparatus, for example, within the OCT adapter 206. Alternative, in some embodiments, the controller 1700 may be located in a different system for example it may be hosted on the same apparatus as the apparatus hosting the other interferometer components of the SD-OCT system 100 shown in FIG. 1 and/or be part of the apparatus hosting the image processing system 148. Data from the PSD 160 may be sent using a data connection wirelessly or over a wired connection providing these support a suitable data transmission rate to allow the controller to, based on the received information, generate and send back a control signal to move the scanning mirror 112. The received scanning mirror position data and the control signal 1710 may be sent along the same or different physical links. In some embodiments, for example the data connection is over an optical fibre or other high-speed data wired connection which is connected to the data communications port 212 shown in FIG. 2B. It may be possible to also transfer the data using one or more other type of high-speed data connection to a scan drive system.

The maximum scan rate of the mirror is based at least in part on the speed at which the controller receives data from the PSD 160. It is possible to achieve 2D scanning rates for scans comprising multiple a-scans which are stacked to form b-scans in excess of 400 Hz, in other words, more than 400 B-scans per second may be achieved using the closed-loop feedback system 1700 in some embodiments. Achieving such a high scanning rate is possible in some embodiments due to the high signal to noise ratio of the light detected at the PSD 160, which is a result of the separation of the optical plane of the outgoing reference beam 402 when it is reflected at the scanning mirror reflective surface and the optical plane in which the beam returned after detection by the PSD 160 is reflected in at the scanning mirror reflective surface 334.

In some embodiments of the feedback 1100, the system includes the controller 1700. The controller 1700, responsive to the scan position driving signal 1710 from the scan driver, generates generate drive signals (1702, 1706) for the light source (1702) and the mirror moving mechanism (1708) respectively. This allows the controller to position the scanning mirror reflective surface 334 in two dimensions using closed loop control in some embodiments of the feedback system 1100.

In some example embodiments, the scanning mirror system includes an optical feedback mechanism 1110 for a MEMS scanning mirror assembly 310 where the MEMS scanning mirror assembly comprising a reflective surface configured to reflect light from two different light sources, wherein the two different light sources comprise a primary light source comprising a light source for a primary beam which after reflection by the reflective surface forms a scanning beam, and a secondary light source comprising a light source for a secondary light beam which, after reflection by the reflective surface forms a mirror position reference beam, and a position sensitive detector, PSD, configured to detect incident light of the mirror position reference beam, wherein the PDS is configured to cause generation of a mirror position feedback signal indicative of where the mirror position reference beam is incident on the position sensitive detector, and a mirror mover mechanism configured to be controlled by a drive signal derived from the mirror position feedback signal to adjust the position of the MEMS mirror reflective surface to control the direction of the scanning beam.

The scanning mirror reflects emitted mirror positioning light in a different optical plane from any returned mirror positioning light, and reflects light from a scanning light source in another optical plane. In some embodiments, the primary light beam comprises an OCT scanning or probe beam and the primary light source may be a source at the scanning mirror assembly such as the end of an optical fibre which is configured to feed in OCT scanning light to the MEMS scanning mirror assembly from a remote light source such as light source 112 shown in FIG. 1.

In some embodiments, the scanning mirror system further comprises a controller 162, 1700 configured to generate the drive signal for controlling a position of the reflective surface 334 of the MEMS scanning mirror assembly 310 responsive to a beam direction input signal and to the mirror position feedback signal derived for a position of the reflective surface 334. The PSD 160 is configured, responsive to detecting the scanning mirror reference beam on its detection surface, to send a mirror position feedback signal to the controller 162, 1700 indicating the location of the scanning mirror reference beam on the detection surface. The controller 162, 1700 uses this feedback signal to generate a drive signal to control a mirror mover mechanism for the scanning mirror. The drive signal from the controller causes the mirror mover mechanism to adjust the position of the MEMS mirror reflective surface 334 in a way which directs the scanning beam to move in accordance with a set of scan parameters.

The beam direction input signal may be provided by a suitable application for configuring a scan which may also use user input parameters to configure an OCT scan. For example, a user may define an area to be scanned with a series of B-scans or to provide a certain resolution.

In some embodiments, the system further comprises a housing 208 having a primary beam entrance 214 for the primary beam which also acts as a primary beam exit for the returned scanning beam. The scanning mirror assembly and the mirror mover mechanism are located in the housing 208. Within the housing 208, the scanning mirror assembly and the mirror mover mechanism may be provided within an optical block such as optical block 310 shown in FIG. 3A in some embodiments.

In some embodiments, the mirror mover mechanism is configured to adjust a tilt position of the MEMS mirror reflective surface in at least two dimensions.

The mirror position feedback signal may be a digitalised signal based on an analog signal generated at the PSD. The mirror position feedback signal may be digitized at one of the PSD, the controller or at another apparatus configured to perform analogue to digital signal conversion on an analog signal received from the PSD and which outputs the resulting digitized signal as the mirror position feedback signal to the controller.

In some embodiments, the secondary light source is also configured to receive a drive signal from the controller, the drive signal is generated by the controller based on information derived from the received feedback signal. For example, the drive signal from the controller may control the power output of the secondary light source and/or turns it on and off in some embodiments.

In some embodiments, the feedback system may also include the controller 162, 1700 although the controller may be provided remotely in some embodiments. In other words in some embodiments, the scanning mirror system for providing optical feedback using a mirror position system such as the feedback system 1100 shown in FIGS. 11A to 11C may comprise a MEMS scanning mirror assembly 310, the MEMS scanning mirror assembly comprising a reflective surface 334 configured to reflect light from two different light sources, one light source 308*a* being a source for a primary beam 312 which after reflection by the reflective surface forms a scanning or probe beam, and the other light source 158, 502 comprising a light source for a secondary light beam 400 which, after reflection by the reflective surface 334 forms a mirror position reference beam 402, a position sensitive detector, PSD 160, such as an PSD assembly which includes a neutral density filter and/or a focusing lens to focus the light onto a detection surface of the PSD 160. The PSD 160 assembly is configured to detect incident light from the mirror position reference beam 402 responsive to which a feedback signal 1704 indicative of where the mirror position reference beam 402 is incident on the position sensitive detector 160 is generated and sent to the controller 162, 1700. The system also comprises a controller 164, 1700 which is configured, responsive to receiving a beam direction input signal and the feedback signal from the PSD 160, to generate a drive signal 1706. The system also comprises a mirror mover mechanism shown as 1708 in FIG. 17, but which may be part of the MEMS support 500 shown also in FIG. 5A in some embodiments. The mirror mover 1708 is controlled by the drive signal 1706 to adjust the position of the MEMS mirror reflective surface 334 to control the direction of the probe beam. In some embodiments, the controller 164, 1700 is configured, responsive to receiving a driving signal from a scan driver, to generate respective drive signals for the light source and the mirror moving mechanism to position the scanning mirror reflective surface in two dimensions using the closed loop control scheme illustrated in FIG. 17. In some embodiments, the controller is configured to control a horizontal and vertical tilt position of the reflective surface of the scanning mirror assembly. In some embodiments, the controller is configured to implement closed loop control of the position of the scanning mirror reflective surface using the mirror position feedback signal.

In some embodiments, the secondary light source point of injection into the scanning mirror assembly, the scanning mirror reflective surface, and the PSD are configured such that the secondary light beam is incident at the reflective surface in an optical plane at or slightly offset from the optical centre of the reflective surface. The optical plane of reflection of the scanning light, for example, OCT scanning light in some embodiments, is different from the optical plane in which the mirror position reference light beam 402 is incident at the reflective surface 334 either outwards and different from the optical plane in which a returned reference beam reflected from the PSD is incident at the reflective surface.

In some embodiments, an angle of incidence of the secondary beam incident at the MEMS mirror reflective surface may be less than 67.5 degrees relative to the surface plane of the mirror. This may reduce the angular geometric distortion of the scanning beam profile by a factor of 2:1.

In some embodiments, the reference beam is detected by the PSD as a plurality of beams, and the plurality of beams may be individual detectable as separate beam spots at the PSD. In some embodiments, beam spot data generated by the PSD when it detects a beam spot location of the incident mirror position reference beam is communicated by the PSD to the controller.

In some embodiments of the scanning mirror system, the beam spot data generated by the PSD when it detects a beam spot location of the incident reference beam is communicated by the PSD to the controller, wherein the controller is configured to control a horizontal and vertical tilt position of the reflective surface 334 of the scanning mirror assembly.

In some embodiments, the scanning mirror assembly is part of an OCT scanner system and the primary beam is an OCT scanning beam.

In some embodiments, the mirror position reference beam is focussed by a PSD imaging lens before being detected by the PSD.

In some embodiments, the scanning mirror system further comprises a neutral density filter located between the PSD imaging lens and the PSD.

In some embodiments, the scanning mirror system further comprises low specular reflective optical absorption material along an optical path followed by a portion of the scanning mirror reference beam which is returned back towards the scanning mirror reflective surface.

In some embodiments, the scanning mirror system further comprises a spatial filter in the optical path followed by the secondary beam towards the reflective mirror surface from the secondary light source.

In some embodiments, the light source for the secondary beam is located vertically above a light trap, the light trap being configured to trap light from a portion of the mirror position reference returned from the PSD which is reflected via the MEMS mirror surface 334 back towards the secondary light source.

In some embodiments, the scanning mirror system 1100 comprises an optical block such as optical block 310 shown in FIG. 3A and as described above.

In some embodiments, the scanning mirror system 1100 comprises a MEMS scanning mirror assembly in an OCT adapter for a surgical microscope, and the primary light source is an OCT light source, which, after reflection forms an OCT scanning mirror for scanning tissue areas or samples which are also viewable via the surgical microscope.

In some embodiments, the scanning mirror assembly comprises an optical block configured to function as a MEMS scanning mirror assembly in an OCT adapter for a surgical microscope.

Examples of Other OCT Scanner Features

OCT scanners known in the art, for example, the current EnFocus™ scanner by Leica™, are provided as accessories which are under carriage mounted for microscopes. However, such prior art OCT scanner systems have a relatively a large stack height due to the size of the required beam splitter via which OCT scanning light must exit from the scanning mirror arrangement to illuminate a scanned area.

The disclosed embodiments of an OCT scanner adapter 206 which may function as an adapter or accessory for a surgical microscope have an optical arrangement in some embodiments which uses a fold mirror 316 lifts the scanning OCT light beam 312 out of the plane it emerges in as it exits the scanning mirror assembly 310. The beam is lifted towards the beam-splitter 318 which is configured to reflect the light towards the microscope objective lens 210 of the OCT scanner adapter 206.

In some embodiments of the OCT scanner adapter 206, a focusing lens assembly is provided to allow the OCT scanning or probe beam to be focused in an optical plane 154 at a range of depths in the sample tissue being scanned.

Figure 18:
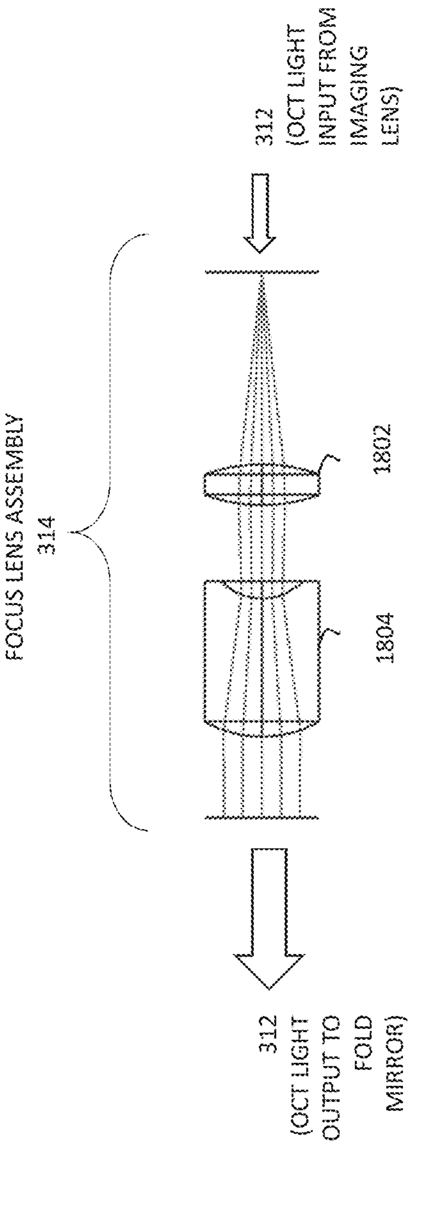
FIG. 18 shows schematically an example of focusing lens optics according to some embodiments of the present invention.
Figures 19A, 19B:
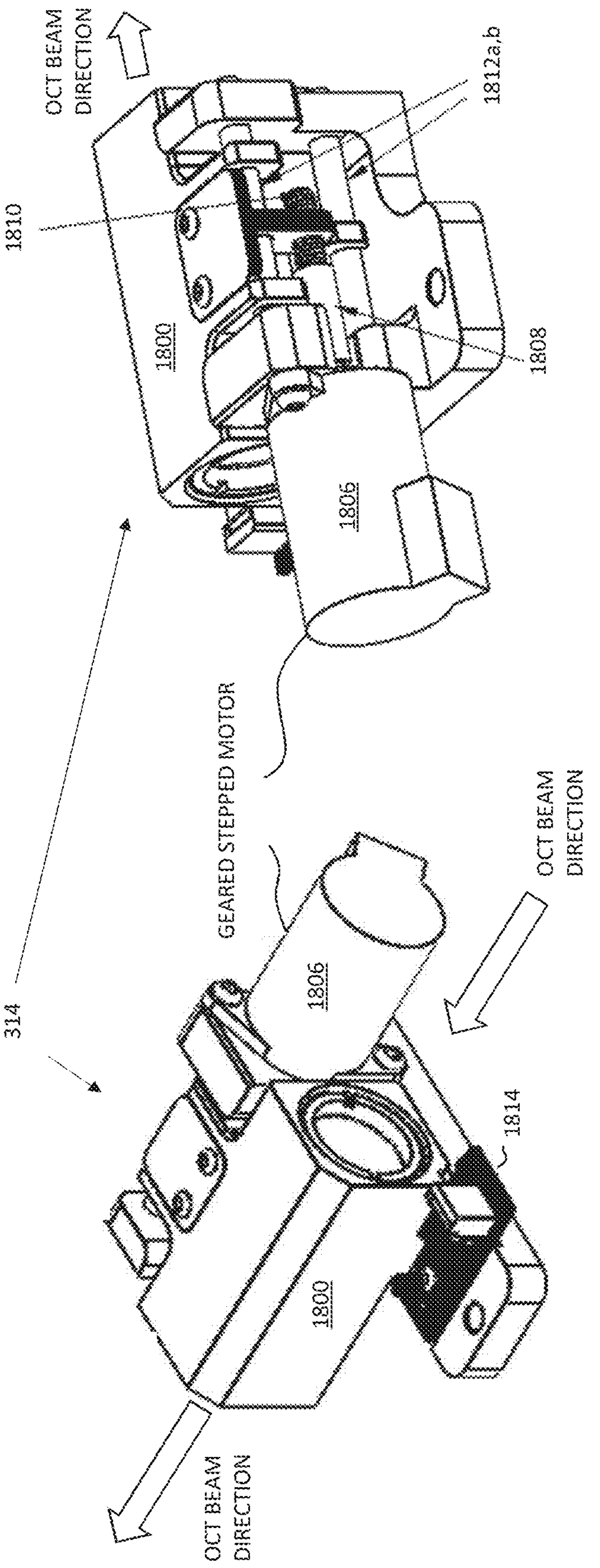
FIGS. 19A and 19B show different views of a focusing lens assembly comprising the focusing lens optics shown in FIG. 18 according to some embodiments of the present invention.

In some embodiments of the OCT scanner adapter 206, the focusing lens assembly 314 comprises a focusing lens assembly such as that shown schematically in FIGS. 18A, 18B and 18B of the accompanying drawings.

FIG. 18A shows schematically a focusing lens assembly 314 for an example embodiment of the OCT scanner adapter 206 which has a variable focus capability. The focus lens assembly 314 comprises a lens cell 1800 (see FIGS. 18B, 18C) housing two optical lens elements 1802, 1804 via which the OCT probe beam 312 passes before it is incident on fold mirror 316 in some embodiments of the present invention.

As shown in FIG. 18A, the OCT light beam 312 emitted from the objective imaging lens assembly 510, 512 of the scanning mirror assembly housed in optical block 310 (see FIG. 5A for example) passes first via the first optical element 1802 which in some embodiments comprises a symmetric biconvex positive lens. The OCT probe or scanning beam then passes through the second optical element 1804 which comprises a thickened negative meniscus lens 1804 in some embodiments. The variable focus provided by the focusing assembly 314 is achieved by moving the distance of, in other words translating, the lens cell 1800 housing the lens elements 1802, 1804 relative to the objective imaging lens assembly 510, 512. The translation is achieved via the electro-mechanical assembly shown schematically in FIGS. 18B and 18C.

FIGS. 18B and 18C shows schematically different views of an example embodiment of the electro-mechanical focus assembly 314 of the OCT scanner adapter 206 in more detail. The focus assembly 314 as shown in FIG. 18B comprises a geared stepper motor 1806 which via a motor coupler 1808 actuates a lens mover 1810 to move the lens cell 1800 housing the lens elements 1802, 1804 closer to or away from the objective lens assembly 510, 512 of the scanning mirror assembly. In the embodiment shown in FIGS. 18B and 18C, the lens mover 1810 comprises a lead screw drive mechanism which extends and retracts when a rotational torque is provided by the motor coupler 1808. As the lead screw extends, the lens cell 1800 is moved in one direction relative to (and as shown in FIGS. 18B and 18C away from) the objective lens assembly 510, 512 along guide rails 1812 (shown as upper and lower guide rails 1812*a*, 1812*b*).

In some embodiments, the leadscrew is driven via a 15-millimeter geared stepper motor 1806. The total travel of the lens cell housing 1800 is 5 millimetres (+2.5 mm). A travel limit circuit 1814 may be provided in some embodiments to limit the travel of the lens cell housing 1800. The amount of total travel range of the focusing lens elements 1802, 1804 results in a total focal shift of 60 millimetres (+30 mm). The dimensions of the focusing assembly 314 are configured to reduce its height to a level which does not increase the required stack height h2 of the compact OCT scanning adapter 206 above that required to accommodate the scanner optics and the focusing assembly 314 is configured to be small in the optical plane of the scanning mirror assembly to fit between the mounting structure which interfaces to the microscope under carriage which is shown in more detail in FIGS. 20A, 20B, 21A, 21B, 22A, and 22B described in more detail below.

Figure 20A:
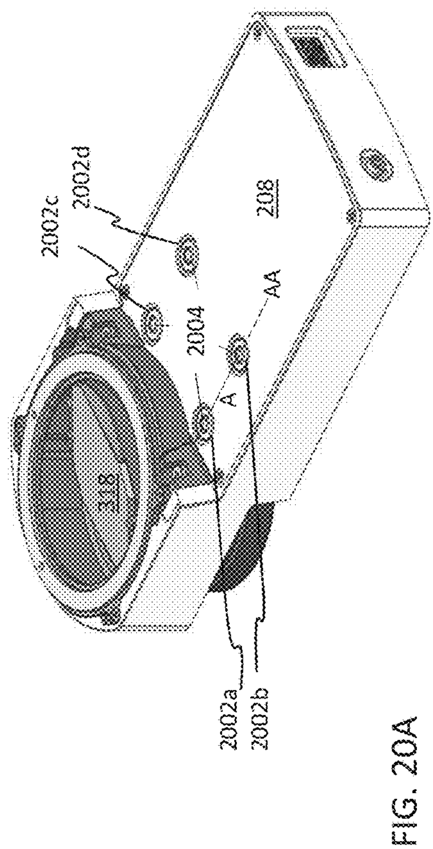
FIG. 20A shows a view of a housing for an OCT scanner adapter with recessed mounting screws according to some of the embodiments of the present invention.

FIG. 20A shows a view of a housing for an OCT scanner adapter with recessed mounting screws 2004 of an OCT scanner adapter mounting mechanism 2000 for attaching the OCT scanner adapter 206 to a microscope 200 according to some of the embodiments of the present invention. In FIG. 20A a plurality of mounting screw recesses 2002 (shown as recesses 2002*a,b,c,d* by way of example) in the OCT scanner adapter housing 208 include unextended mounting screws 2004*a,b,c,d* (see also FIG. 20B).

Figure 20B:
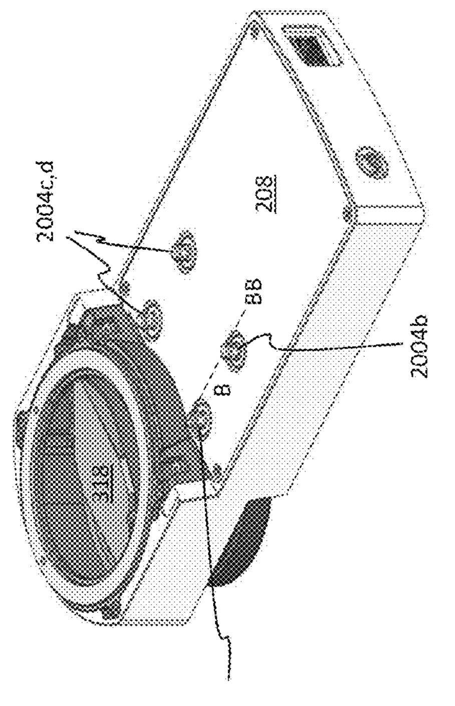
FIG. 20B shows another view of the housing of FIG. 20A with the mounting screws extended according to some of the embodiments of the present invention.

FIG. 20A shows how the captured screws 2004 sit flush with the OCT housing 208 when not extended for installation into the undercarriage of the microscope 200 shown in FIG. 2. Microscope 200 may also be referred to here as a microscope optics carrier 200. FIG. 20B shows the screws extended for being threaded into mating threaded holes into microscope 200. In FIG. 20B the four mounting screws 2004*a,b,c,d* extend from the mounting screw recesses 2002*a,b,c,d* through housing 208. By aligning the OCT scanner adapter 2006 with the undercarriage of microscope 2000, the mounting screws 2004 will align with corresponding recesses or screw holes in the undercarriage of the housing 202 of the microscope and by extending the mounting screws 2004 into the corresponding screw holes in the housing 202, the OCT scanner adapter can be attached as an accessory to the microscope 200. This allows the OCT microscope objective lens 210 to be securely aligned with the microscope optics which allows use of the microscope to view an area via the microscope at the same time it is being scanned.

Figure 21A:
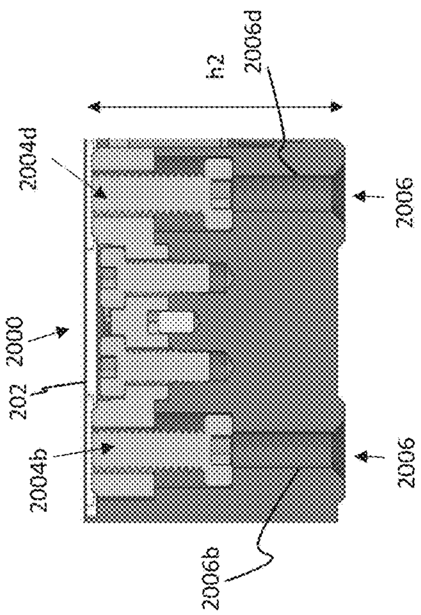
FIG. 21A shows the mounting screws are recessed along the line A-AA shown in FIG. 20A according to some embodiments of the present invention.
Figure 21B:
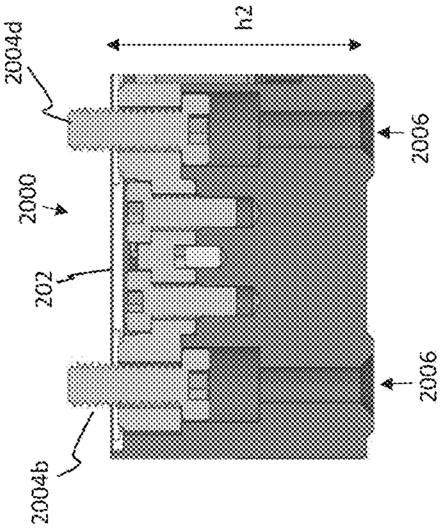
FIG. 21B shows the mounting screws are extended along the line A-AA shown in FIG. 20A according to some embodiments of the present invention.

FIGS. 21A and 21B shows cross-sectional-views along lines A-AA of FIG. 20A and B-BB of FIG. 20B respectively and show where the mounting screws 2004*a,c* are recessed into recesses 2002*a,c* along the line A-AA and extended along the line B-BB.

The cross sectional view of the OCT scanner adapter mounting mechanism 2000 shown in FIGS. 21A and 21B illustrates how the mounting arrangement 2000 comprises four captured screws 2004 which sit flush with the surface of the housing 208 of the OCT scanner adapter 206 for installation onto the under carriage of the housing 202 of the microscope optics carrier 200. The OCT scanner adapter housing is designed to key to the under carriage of the microscope optics carrier 200 so that the orientation of the OCT scanner microscope objective lens 210 relative to the microscope optics channel is unambiguous. The four captured screws 2004 each sit atop a correspondingly sized thread hole 2002 as shown. The mounting screws 2004 may be securely engaged via a hex-key tool inserted through the open base 2006 of each threaded holes which when inserted into the captured screw can be used to turn the screws to advance them and cause them to be threaded into corresponding mating threaded holes in the undercarriage of the microscope optics carrier 200 in some embodiments.

Advantageously, the open base of the recesses 2002*a,b,c,d* may also, given they will align with the threaded accessory mounting holes of the microscope optics carrier 200, allow microscope accessories to be mounted to the undercarriage of the OCT scanner in some embodiments.

Figure 22B:
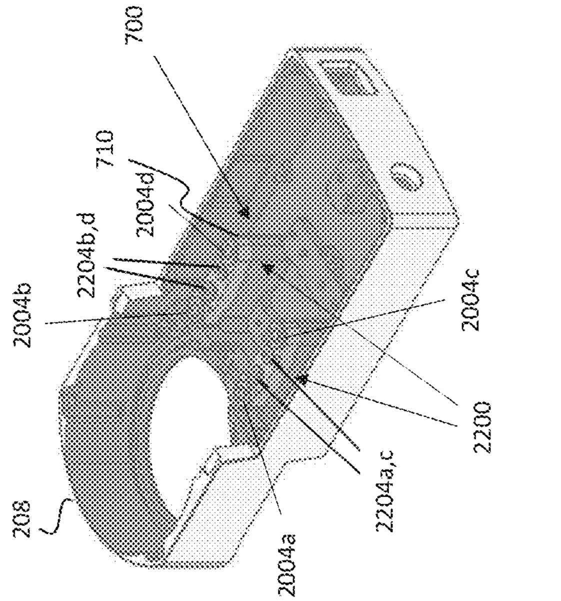
FIG. 22B shows an example exploded view the mounting assembly of FIG. 22A.
Figure 22A:
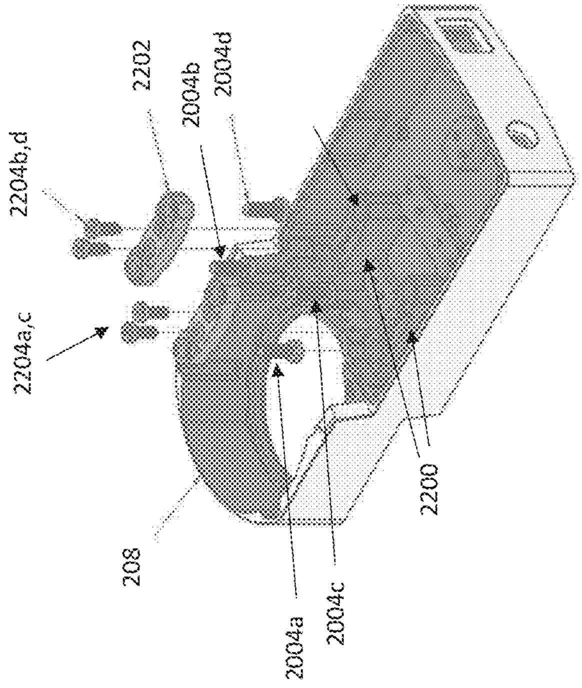
FIG. 22A shows an example view of a mounting assembly inside an OCT scanner adapter 206 according to some embodiments of the present invention.

FIGS. 22A and 22B shows examples of unexploded and exploded view of the mounting assembly 2000 of the OCT scanner adapter 206 according to some embodiments of the present invention. As shown, mounting mechanism comprises two mounting blocks 2200, each mounting block 2200 comprising a pair of threaded recesses 2002 into each of which can be secured a screw 2004. In the embodiment shown in FIGS. 22A and 22B, each the mounting block 2200 of the mounting assembly 2000 also comprises a clamp 2200 held by screws 2204 for securing the clamp to each mounting block.

Some embodiments of the present invention comprise a mounting assembly 2000 for an OCT scanner adapter 206 configured for use as a microscope accessory. The mounting assembly 200 comprises at least two mounting blocks, each block comprising a plurality of threaded recesses 2002 arranged to align with corresponding threaded recesses on a housing 202 on the undercarriage of a microscope optics carrier. The threaded recesses 2002*a,b,c,d* are open at each end and are configured at one end to hold screws 2004 which when extended attach to the microscope accessory carrier housing 202 and at the distal end of are configured to allow another microscope accessory to be attached, to allow the use of the other microscope accessory when the OCT scanner adapter 206 is attached to the microscope carrier optics 200. An example of a microscope accessory which may be attached in this manner is a retinal view lens.

Examples of Beam Splitter Optics

FIG. 23A shows schematically a view of an example of beam-splitter optics used in an example OCT adapter 206 according to some embodiments of the present invention.

Figure 23:
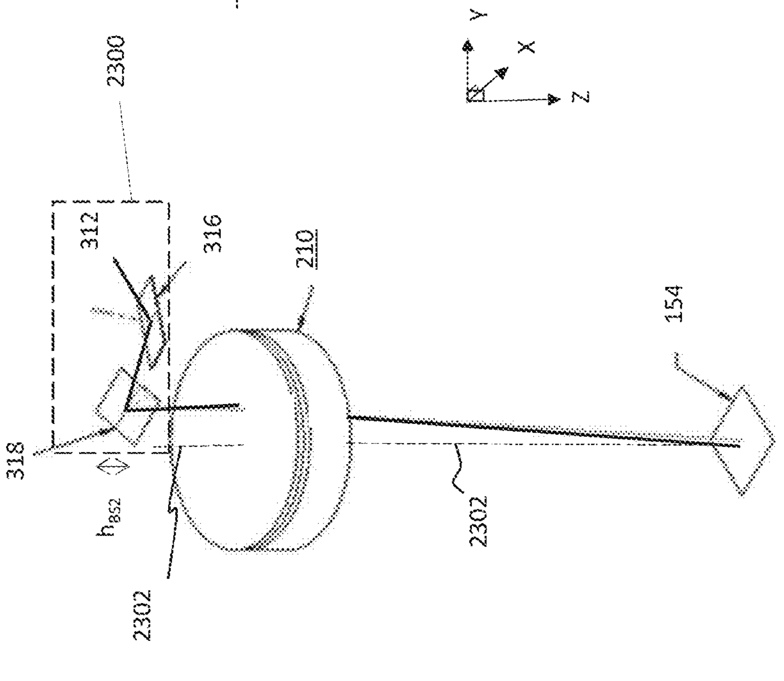
FIG. 23 shows schematically a view of an example of how an objective lens focusses a beam which is aligned off the central optical axis of a microscope objective lens in an optical arrangement according to some embodiments of the present invention.

As shown in the beam-splitter arrangement 2300 of FIG. 23, the dashed line 2300 represents the location of an optics channel from the microscope 200 which passes through the z-axis which is centred on the optical axis of the microscope objective lens 210 of the OCT scanner adapter 206. The OCT scanning beam 312 emerges from the scanning mirror assembly 310 in an optical plane which may be the same or off-set vertically with but otherwise is co-planar with the plane of the objective lens 210 to keep the optics of the OCT scanner as flat as possible so as to reduce the stack height h2 that the OCT scanner adapter 206 may add to the microscope 200 height h1. As shown in FIG. 23, the OCT scanning beam 312 is lifted out of the scanning mirror optical plane so that it can exit via the objective lens 210 using a beam splitter arrangement 2300 comprising fold mirror 316 and beam splitter 318 (see also the embodiments of the OCT scanner adapter described herein above such as with reference to FIGS. 3A, 3B, and 4 for example). The OCT beam 312 is deflected from the fold mirror 316 towards the beam splitter 318 which reflects the incident OCT scanning light beam towards the objective lens 210. The compound angle beam splitting arrangement shown in FIG. 23 reduces the height of the beam splitter 318 in the Z axis or depth direction $h_{BSZ}$ which allows the stack height of the OCT scanner adapter h2 to be significantly reduced.

The compound beam splitter arrangement 2300 used in some embodiments of the present invention results in OCT scanning light beam 312 passes through the objective lens 210 off-set from the central optical axis 2302 of the objective lens. As shown in FIG. 23, the central optical axis 2302 is aligned with a z-axis of the co-ordinate system shown also in FIG. 23.

Figure 24:
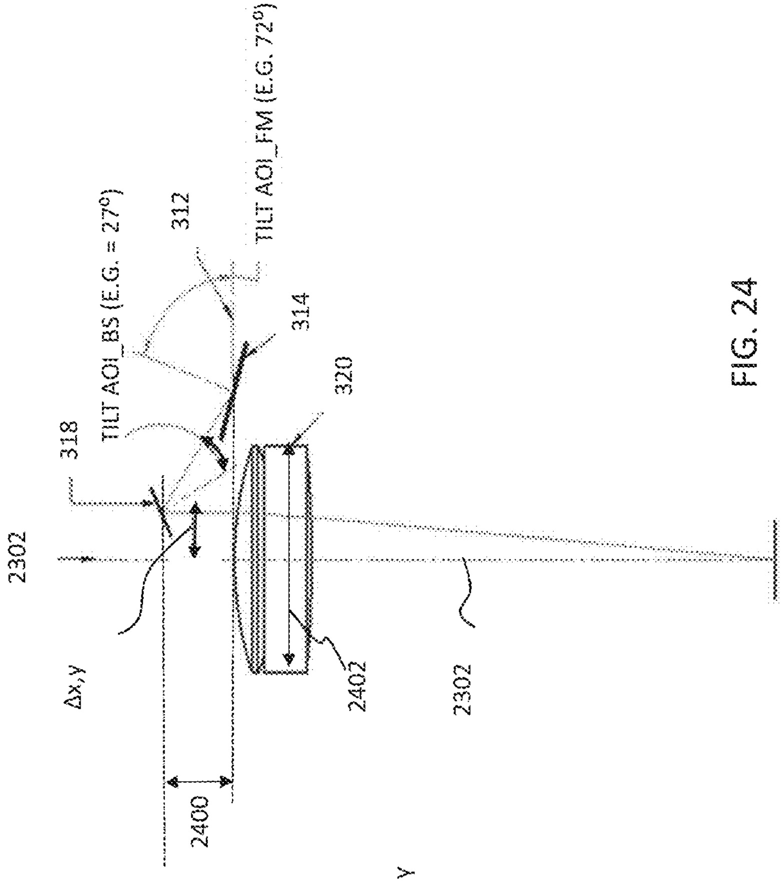
FIG. 24 shows schematically a side view of an example of how a microscope objective lens focusses a beam which is aligned off the central optical axis of the lens in an optical arrangement according to some embodiments of the present invention.

FIG. 24 shows schematically the offset Δx,y of the OCT beam from the optical axis of the objective lens 210 according to some embodiments of the disclosed OCT scanner adapter 206. The OCT scanning light 312 is shown is offset by Δx,y in FIG. 24 in the optical plane defined by the scanning mirror assembly 310 from the optical axis 2303 of the objective lens 210. The off-set Δx,y is a relatively small amount, for example, Δx,y may be about 14 or 15 millimetres or so in some embodiments. The OCT beam 312 which emerges from the scanning mirror assembly 310 is directed to the focal plane 154 of the sample to be scanned via a compound angle beam splitter arrangement.

The compound angle beam splitter arrangement comprises in some embodiments a beam-splitter 318 (see also FIG. 3A for example) which tilted at a compound angle relative to the direction of the OCT beam 312 as it emerges from the scanning mirror assembly and which is also tilted relative to the central optical axis of the objective lens 210 and a fold mirror 316 which is tilted at a complementary acute angle of incidence relative to the optical plane in which the OCT scanning light emerges and which is also tilted relative to the central optical axis of the objective lens 210. As shown in FIG. 24, for a lens diameter 24 of, for example, 71 mm, the fold mirror lifts the incident OCT scanning light by 27 mm above the optical plane in which the OCT beam emerges from the scanning mirror assembly 310 (and in some embodiments, via the focusing assembly 312). The lift is labelled 2400 in FIG. 24.

The stack height of the OCT scanner adapter 206 is accordingly dependent on the vertical lift and so also dependent on the mirror fold angles and the beam splitter angles. The vertical lift of the OCT scanner adapter 206 is configured to have a value preferably of a least 25 mm. Any further reduction in vertical height comes with a corresponding tilt angle change for both the Fold Mirror and the beamsplitter which may cause issues such as, for a fold mirror tilt angle change, an increase in the overall length of the fold mirror 316. This could encroach on the clear aperture of the microscope objective lens 210 meaning the mirror 316 could be seen by the surgical assistant and also the camera of the microscope which is not desirable. Another issue is caused by a change to the beamsplitter tilt angle. Changing the beamsplitter tilt angle relative to the optical plane of the OCT scanning beam as it emerges from the scanning mirror assembly 310 (and if used, from the focusing assembly 314) causes the angle of incidence for the microscope illumination to become closer to the microscope objective lens normal incidence. This could result in unwanted glare in the surgical view through the microscope optics/camera.

The angle of incidence AOI of the OCT beam at the beam splitter to achieve this degree of lift is 27-degrees relative to the normal of the surface of the beam splitter relative to the central optical axis of the objective lens and 1-degree relative to the OCT optical plane of the scanning mirror assembly 310. The OCT beam angle of incidence at the complementary compound angle fold mirror 316 is 72 degrees relative to the normal of the mirror surface of the fold mirror relative to the central optical axis of the scanning mirror assembly 310 (and if used, of the focusing assembly 314) and 3 degrees relative to the OCT optical plane of the scanning mirror assembly 310. Collectively the compound angle beam splitter arrangement sets the reflected OCT scanning beam 312 to be colinear with the rear optical channel of the microscope optics carrier 200 in embodiments of the OCT scanner adapter 206 which provide a rear entering optical path for the microscope camera.

In some embodiments, a surgical microscope may have as many as four optical channels which may be orthogonal to each other. A surgeon or similar user will face the microscope oculars so that two of these channels provide a surgeons view and two orthogonal channels may be provided for an assistant at 90 degrees to the channels used for the surgeon's view. At the rear of the microscope, taking the front side as the location of the oculars used by the surgeon, a channel is provided for a camera view, and this camera view will also use the microscope objective lens 210 provided by the OCT scanner adapter 206 when this is attached to the microscope 200. This back-channel used by the microscope camera is where the OCT light is folded to by the folding mirror 316 of the OCT scanner adapter offsets from the optical axis of the microscope objective lens 210. In other words, in some embodiments of the OCT scanner adapter, the OCT beam is folded into a camera view channel of the microscope optics. In some embodiments this is a back-channel of microscope. By aligning the OCT beam to the camera channel, parallax issues which might otherwise be associated with using another optical channel of the microscope or the optical axis of the objective lens, may be reduced or eliminated.

The compound angle beam splitter arrangement shown in FIGS. 23 and 24 also allows the stack height h2 of the OCT scanner adapter to be significantly reduced compared to other optical beam splitter arrangements for OCT scanners known in the art. For example, the stack height h2 may be reduced to 36 millimetres or less. This is a decrease of 22 millimetres compared to an EnFocus under carriage mounted scanner known in the art. This can be contrasted with prior art OCT scanners which are not only taller in their form factor but which also fold the OCT scanning light into the microscope objective at its optical centre.

Embodiments of the present invention where the folding mirror 316 and beam-splitter 318 fold the OCT scanning light into the camera channel of the microscope optics off the optical centre of the objective lens 210 the OCT light passes through to be focused on the focal plane, however, may require additional calibration of the OCT scan data to ensure meaningful results are obtained. The scanning light 312 which passes through offset from the optical centre of the objective lens 210 is still focused on the focal plane 154 which is flat, however, the phase plane of the OCT light is not flat at the focal plane 154. Any suitable calibration technique can be used to match the phase plane to the focal plane however so that when OCT light 312 which has illuminated sample tissue 116 is returned to the interferometer OCT system 100 shown in FIG. 1 the resulting interference pattern generated with the OCT reference light results in an OCT scan image which can be correctly interpreted. Suitable technique to calibrate the OCT system 100 include any techniques which suitably correct scan nonlinearities which can be adapted to match the phase plane to the focal plane in embodiments the OCT beam 312 enters the microscope objective lens 210.

Figure 25B:
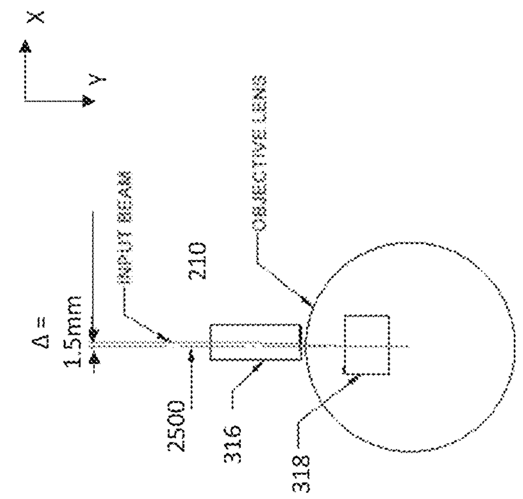
FIG. 25B shows schematically a plan view of a horizontal (x-y plane) beam offset optical arrangement according to some embodiments of the present invention.
Figure 25A:
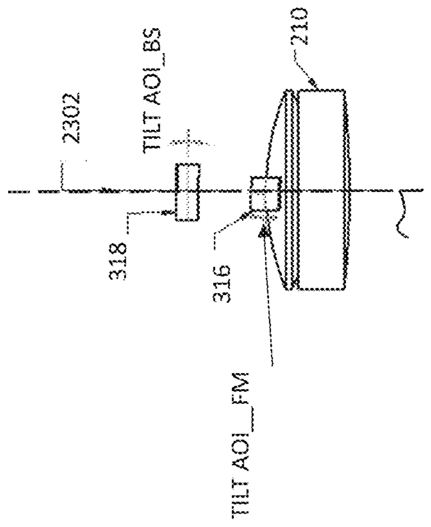
FIG. 25A shows schematically a side view in of horizontal (x-y plane) deflection of the beam aligned off the central optical axis of the lens in an optical arrangement according to some embodiments of the present invention.

FIG. 25A shows schematically by way of example a front view of the beam splitter arrangement 2300 horizontal scanning beam deflection. In FIG. 25A, the beam splitter 318 is set at an approximate 1° tilt angle for back reflection or glare reduction of the vertically oriented illumination beam, for example, a red reflex illumination beam passing along the rear channel of the microscope 200. The fold mirror in this embodiment is provided with a complimentary tilt angle of approximately 3°.

FIG. 25B shows schematically an overhead or a plan view of the beam splitter arrange 2300 comprising the beam splitter 318 and the fold mirror 316 of the OCT scanner adapter 206. Adapter input beam is offset horizontally (in other words in the optical plane x-y) by an offset $\Delta$=1.5 millimetres with respect to the optical axis of the objective lens in the embodiment shown in FIG. 25B. This lateral or horizontal off-set, in combination with the fold mirror and beam splitter tilt angles described, for example, in FIG. 25A, aligns the OCT scanner beam so that it is collinear but has an x-y offset, shown as offset $\Delta x,y$ in FIG. 24 from the objective lens optical axis in the x-y or horizontal plane direction.

Figure 26B:
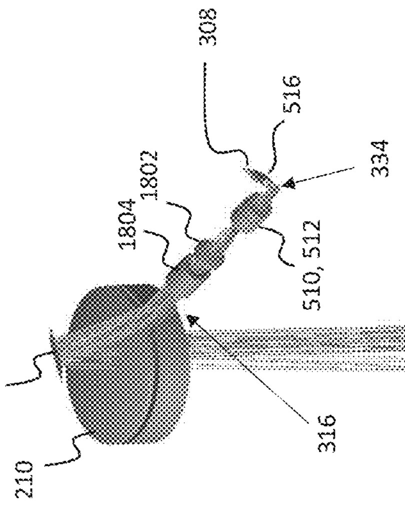
FIGS. 26A and 26B show schematically in more detail the optical path followed by a scanning beam an optical arrangement according to some embodiments of the present invention.
Figure 26A:
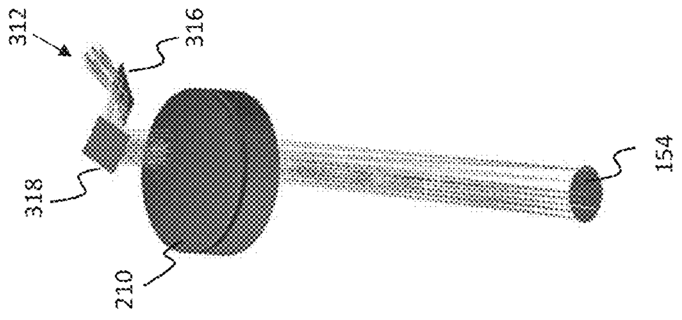

FIG. 26A shows another schematic example view illustrated of how light forming the OCT scanner beam 312 is lifted by the fold mirror 316 towards the beam splitter 318 before passing out via the objective lens 210 to scan a focal plane 154.

FIG. 26B shows schematically another view angle illustrating the optical path which the OCT light follows within the OCT scanner adapter. As shown the path extends from the optical fibre connector 308, via the scanning mirror assembly 310 and focusing assembly 1800 to the fold mirror 316 and beam splitter 318 and out via the objective lens 210 where the beam illuminates a sample tissue or other object of interest 116 (for example, for which an OCT B scan image may be generated to show structures at various depths within the scanned area using the OCT system 100 and image processor 148 shown in FIG. 1). In the example embodiment shown schematically in FIG. 26, the OCT light passes in the scanning mirror assembly 310 through collimating lens 516 towards reflective surface 334 which reflects it outwards via the objective lens assembly 510, 512 towards the lens elements 1802, 1084 of the focusing lens assembly 314

In some embodiments of the OCT Adapter 206, the adapter is an under carriage mounted scanner such as FIGS. 2A and 2B illustrate schematically. The OCT adapter is configured so that an OCT probe beam 312 is incident on a fold mirror 316 set at a compound angle so as to redirect the OCT probe beam to a beam splitter 318 which in turn reflects the beam offset from the centre of the OCT adapter's objective lens 210 which then focuses the probe light beam to scan the focal plane where the tissue or other sample is located.

In some embodiments, the OCT adapter 206 is under carriage mounted with a rear entering optical path offset from the centre of the objective lens by only 1.5 millimetres, reflected to the focal plane via a compound angle beam splitter set at an angle of incidence of 27-degrees by 1-degree, and a complementary compound angle fold mirror set at an angle of incidence of 72-degrees by 3-degrees which sets the reflected beam collinear with the rear optical channel of the microscope optics carrier. One benefit of this includes removing any parallax issues associated with the rear optical channel. Another benefit is that the stack height is reduced to a minimal stack height of 36 millimetres. This is a decrease of 22 millimetres between the EnFocus™ under carriage-mounted scanner system known in the art and the smallest height form factor of an OCT under carriage mounted scanner adapter according to some embodiments of the present invention.

Those of ordinary skill in the art will appreciate that a return light path for the OCT beam is also defined by the optical path taken by the OCT beam and that references to the optical path the OCT beam passes through via optics of the OCT scanner and OCT system to scan a sample or tissue area also relate to the return optical path the OCT light will take back to the coupler 104 shown in the OCT system 100 of FIG. 1.

It will also be apparent that whilst OCT system 100 shown in FIG. 1 is a spectral domain OCT system, in other words a frequency domain OCT system, the OCT scanner adapter 206 disclosed herein may be adapted for use in other OCT systems in some embodiments.

Example(s) of OCT Adapter Keratoscope Relay Mechanisms

Figure 27B:
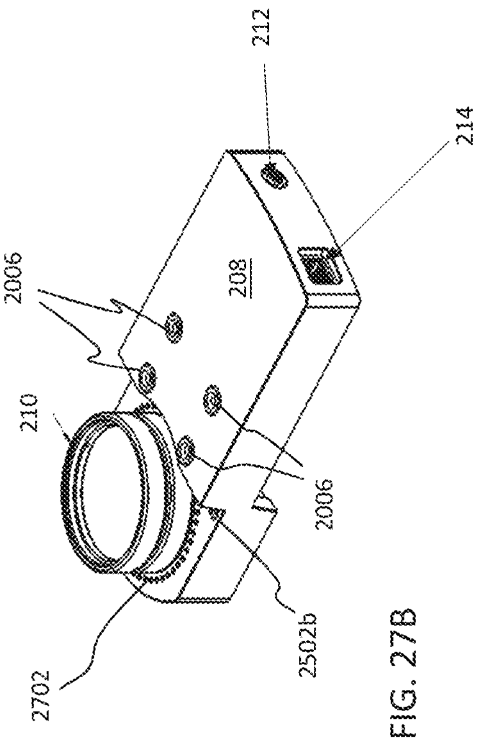
FIGS. 27A and 27B show schematically different views of a base of an example OCT scanner adapter according to some embodiments of the present invention.
Figure 27A:
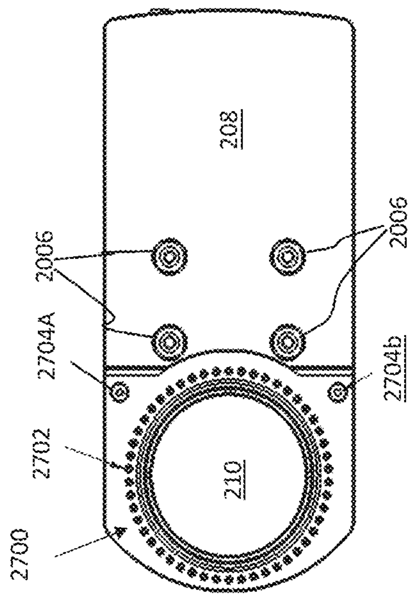

FIGS. 27A and 27B show schematically different views of a base of an example OCT scanner adapter 206 according to some embodiments of the present invention.

The example embodiment shown in FIGS. 27A and 27B of the OCT scanner adapter 206 comprises an OCT scanner adapter 206 microscope accessory which is configured to provide a keratoscope functionality. The keratoscope functionality may be provided for an OCT scanner adapter 206 microscope accessory comprising one or more or all of the features from the embodiments of the OCT scanner adapter 206 described herein above. These OCT scanner features may comprise features of one or more or all of its described components including but not limited to features of the scanning mirror assembly 310, the mirror positioning feedback system 1100, and the OCT mounting mechanism 2000, for example, features shown in one or more of FIGS. 1 to 26B. These OCT scanner features may be implemented with keratoscope functionality described in some embodiments as comprising with one or more or all of the features of the keratoscope relay mechanism illustrated in one or more or all of FIGS. 27A, 27B, 28A, 28B, 29A, 29B, 30A, 30B, 31A, B, C, D, and 32.

Some embodiments of the keratoscope relay mechanism disclosed herein comprise for an LED ring 2700 such as is shown in FIGS. 27A to 32 which may be provided on the undercarriage of the housing 208 of an OCT scanner adapter 206 comprising one or more or all of the features from the example embodiments of the OCT scanner adapter 206 described herein above and/or the scanning mirror assembly 310 and/or mirror positioning feedback mechanism with reference to FIGS. 1 to 26B.

FIG. 27A shows the base of an OCT scanner adapter 206 in other words, the patient facing side of the scanner adapter when it is fixed to a microscope such as the microscope 200 shown in FIGS. 2A and 2B.

Figure 28:
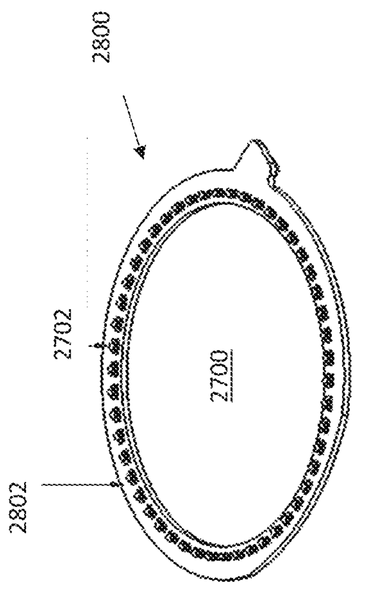
FIG. 28 shows schematically a perspective view of an example light emitting diode, LED, printed circuit board, PCBA, assembly for an OCT scanner adapter according to some embodiments of the present invention.

In FIG. 27A, ring 2700 of light-emitting diodes 2702 forms part of a keratoscope relay mechanism of the OCT scanner adapter 206 as do the light pipe adapter ring mounting holes 2704*a,b*. The keratoscope relay mechanism provides a replica keratoscope functionality in conjunction with the keratoscope optics of the microscope optics carrier, also referred to herein as microscope 200. The LEDs 2702 are mounted on a ring shaped printed circuit board 2802 in some embodiments as shown in FIG. 28 which is housed within the housing 208 of the OCT scanner adapter 206. The housing 208 may be attached to the undercarriage of the microscope 200 by causing suitable fixations 2004 such as screws to protrude from recesses 2002 so as to engage which correspondingly located threaded recesses in the base of with the microscope housing 202. In some embodiments, and as shown in FIG. 27A, the housing 208 is attached to the microscope housing 202 using a mounting mechanism 2000 which provides corresponding protrusions 2006 in its base to allow for other microscope accessories to be attached instead to the base of the OCT scanner adapter accessory 206.

The keratoscope relay mechanism of OCT scanner adapter 206 is used when the OCT scanner 206 is attached as an accessory to the undercarriage of a microscope 200 used to examine or for surgery on an eye and which has a keratoscope illumination source mounted concentric to where its microscope objective lens is located on its undercarriage. When the OCT scanner adapter is attached to such a microscope however, the original keratoscope illumination source will be obscured.

The original microscope mounted keratoscope light source comprises a series, for example 50, individual LEDs arranged in a circle of slightly larger diameter than the objective lens of the surgical microscope 200 optics. In addition to the ring of LEDs, an adapter ring consisting of a series of light pipes each of which corresponds to an LED element of the Keratoscope illumination may be attached to underside of the microscope optics carrier also concentric to the microscope optics objective lens so as to be able to, for example, illuminate a patient's eye The function of the light pipe adapter ring is to transfer the direct illumination from the series of LED arranged on the undercarriage of the microscope housing 202 to a location coincident with the objective lens housing thus producing an unobstructed ring of illumination to the surface of the cornea of the patient under surgery. By illuminating a patient's cornea in this way, an indication of the toric orientation of the cornea based on the LED ring shape as imaged through the microscope can be obtained. If the LED ring is imaged as a perfect circle, this indicates no aspheric or toric curvature of the cornea whereas if the LED ring is imaged with an elliptical shape this indicates not only the presence of toric curvature but also the alignment of the curvature axis which is indicated by observing the major axis of the ellipse.

When attached as an accessory to such a microscope 200, the OCT scanner adapter 206 provides a microscope lens 210 which replaces the objective lens of the microscope and obscures the original keratoscope LEDs on the base of the microscope.

Some embodiments of the disclosed OCT scanner adapter 206 are configured with a replica ring of light emitting diodes, LEDs, 2700 arranged about the microscope objective lens 210 such as are shown in FIGS. 27A and 27B. The replica ring of LEDs 2700 allows the functionality of the microscope optics carrier keratoscope comprising the ring of LEDs embedded into the microscope optics carrier housing under carriage to be transferred to the ring of LEDs 2700 located on the under carriage of the housing 208 of the OCT scanner adapter 206. In other words, the replica ring of LEDs 2700 allows a similar assessment of toric curvature of the cornea to be made even when a OCT scanner adapter 206 is fixed to the undercarriage of the housing 202 of a surgical microscope 200.

FIG. 27B illustrates schematically a different view of the example embodiment of the OCT scanner adapter 206 shown in FIG. 27A which indicates more clearly the location of the microscope objective lens 210 that the OCT scanner adapter 206 provides when the scanner adapter 206 is mounted on the undercarriage of the microscope 206. FIG. 27B also shows the location of an optical port for providing the OCT scanning light to the scanning mirror 310 via optical fibre 308*a* and a combined power and data port 212, for example, a power over Ethernet, PoE, port 212. The OCT scanning light may original from any suitable OCT scanning source of an OCT interferometer, such as, for example, the OCT light source 102 of the spectral domain OCT system 100 shown in FIG. 1. Returned OCT light is gathered by the objective lens 210 and returned along the optical fibre 308*a* to the OCT system 100 where it is recombined with light from a reference arm to generate an interference pattern which can be image processed and used to generate an OCT B-scan image for example.

The keratoscope relay mechanism comprises the ring of replica LEDs 2700 embedded into the underside of the OCT scanner adapter housing 208 and the light pipe adapter ring mounting holes 2704*a,b* which are used to provide keratoscope functionality equivalent to that of the original keratoscope of the microscope.

FIG. 28 shows schematically a perspective component view of an example light emitting diode, LED, printed circuit board, PCBA, assembly 2800 for an OCT scanner adapter 206 according to some embodiments of the present invention.

As shown in FIG. 28, the component structure of the OCT scanner adapter embedded keratoscope LED ring printed circuit board assembly 2800 consisting of the printed circuit board 2802 with 50 LEDs 2702 (only one is labelled in FIG. 28 for clarity) soldered to the board in a ring arrangement which is identical to the Keratoscope LED Ring PCBA located in the surgical microscope 200 to which the OCT scanner 206 is configured to be attached to as an accessory.

The set of replica LEDS 2700 may comprise the same number and configuration around the objective lens 210 as the number and configuration of the original LEDS arranged around the microscope objective lens of the microscope 200 to which the OCT scanner adapter can be attached as an accessory. In some embodiments each keratoscope LED of the replica ring 2700 on the OCT scanner adapter 206 is identical or near identical to an original microscope keratoscope LED. In other words, each LED may have a matching specification for its optical characteristics such as its luminance and its emission spectra.

Some embodiments of the OCT scanner adapter 206 comprise an LED gasket 3000 and a photodiode flexible circuit, PFC, assembly 3006 such as are shown in FIGS. 31A to 31D below. The PFC assembly 3006 described below is configured to serves three purposes. Firstly, the PFC comprises a light detector to detect at least the on/off state of the original ring of keratoscope LEDs attached to the microscope. At the same time, the PFC is mounted to a gasket support 3002 under a gasket 3000 that blocks all light from the microscope Keratoscope LEDs. Thirdly, responsive to the detected on/off state of the original keratoscope LED ring on the microscope, it actuates the on/off state of the replica keratoscope LED ring 2700 of the OCT scanner adapter 206 to be activated.

The workflow of a surgical microscope 200 is accordingly not affected by attaching the OCT scanner adapter 206 as an accessory to the surgical microscope. The functionality of the original surgical microscope keratoscope is directly duplicated in the replica keratoscope ring 2700 of the OCT scanner adapter 200. When the surgical microscope keratoscope is engaged, the LED gasket 3000 blocks its light whilst the PFC assembly 3006 activates the replica keratoscope LED ring 2700.

In some embodiments, the detector of the PFC 3006 detects an illumination state of the microscope keratoscope LEDS and exactly matches said illumination state. In this way, the OCT scanner adaptor keratoscope LEDS may be activated in a matching state. Examples of states which can be matched in some embodiments of the OCT scanner adapter 206 in this way include a full illumination state, a fixation illumination state, or an LED off state.

Figure 29B:
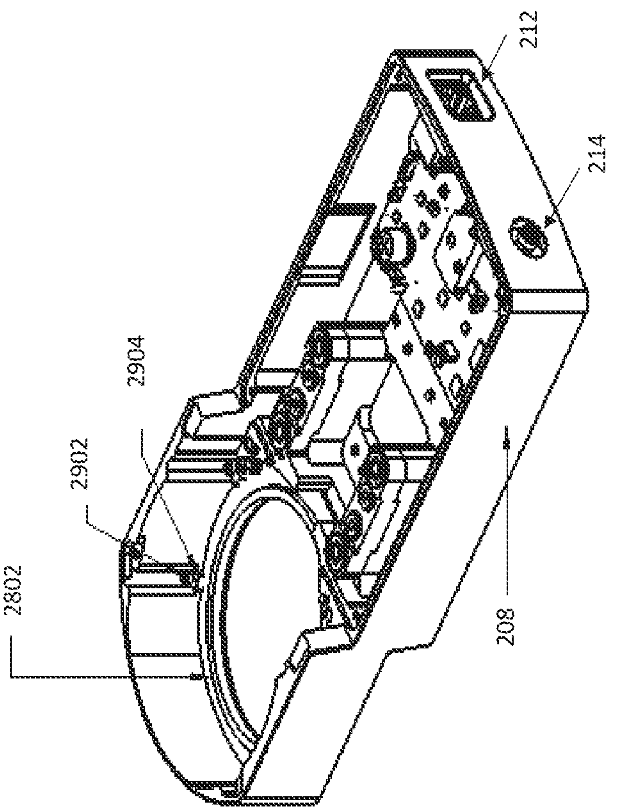
FIGS. 29A and 29B show schematically exploded and regular (unexploded) views respectively of an example keratoscope gasket arrangement for the OCT scanner adapter according to some embodiments of the present invention.
Figure 29A:
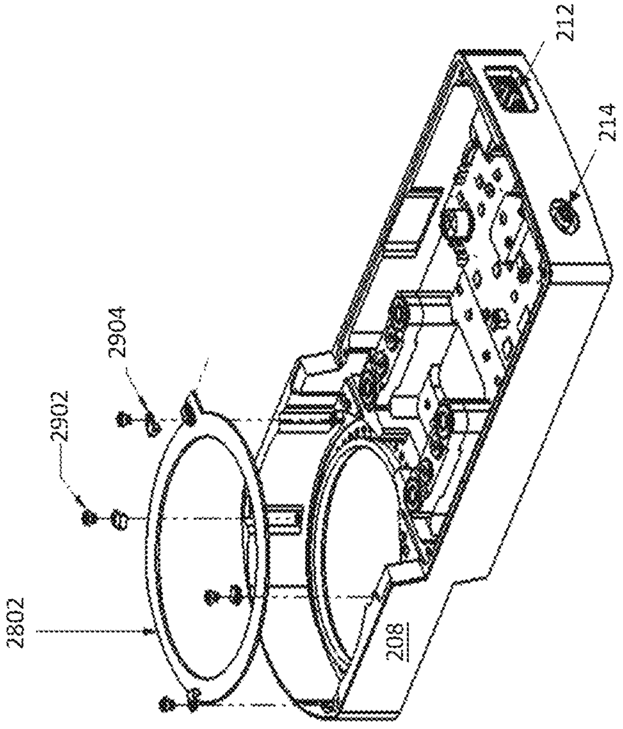

FIGS. 29A and 29B show schematically exploded and regular (unexploded) views respectively of an example keratoscope LED Ring arrangement 2700 in the interior of the housing 208 for the OCT scanner adapter according to some embodiments of the present invention. FIGS. 29A, 29A shows where the keratoscope LED ring pcb 2802 of FIG. 28 is retained in the housing 208 using retainer screws 2902 and retainers 2904, such as clips, located around the aperture in the housing 208 provided for the microscope objective lens 210 of the OCT scanner adapter 206.

Figure 30B:
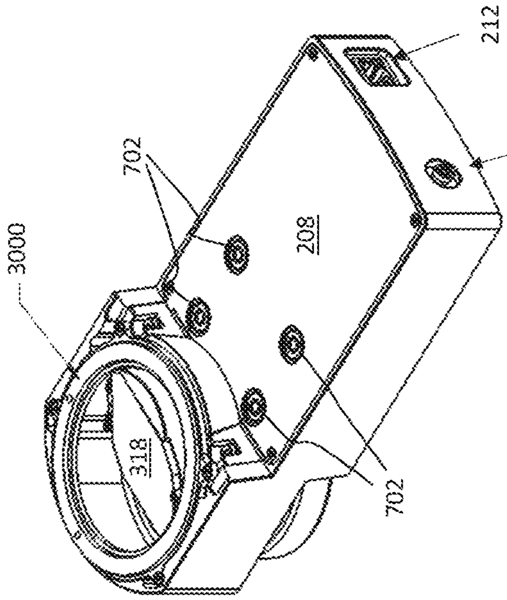
FIG. 30B shows schematically an example of a LED gasket on a gasket support for an OCT scanner adapter according to some embodiments of the present invention, including an OCT scanner adapter including the keratoscope relay of FIG. 30A with the interior concealed within a housing according to some embodiments of the present invention.
Figure 30A:
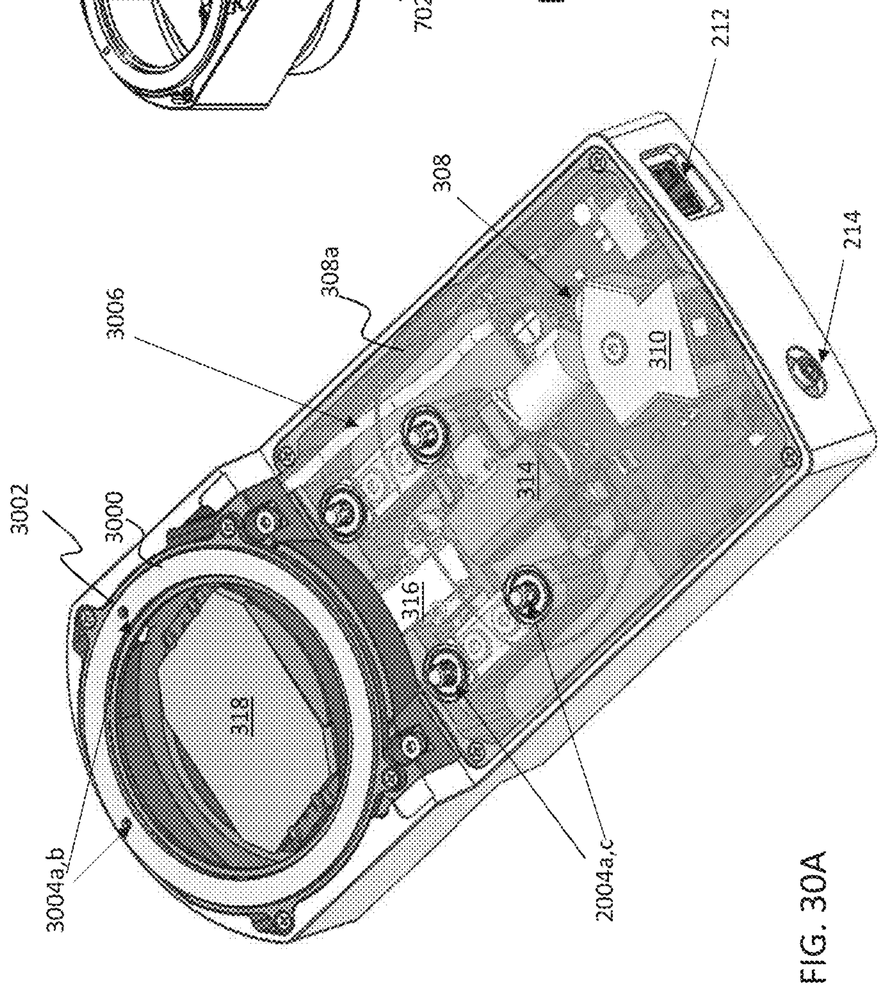
FIG. 30A shows schematically an example of a LED gasket on a gasket support for an OCT scanner adapter according to some embodiments of the present invention, including an example of an OCT scanner adapter including the keratoscope relay with a revealed interior according to some embodiments of the present invention.

FIGS. 30A and 30B shows an OCT scanner adapter 206 including an example embodiment of a keratoscope relay mechanism according to some embodiments of the present invention.

FIG. 30A shows schematically how a gasket ring 3000 is provided on a support 3002 which prevents LED light from the original microscope keratoscope LEDs from entering the objective lens 210 of the OCT adapter 206. FIG. 30A also shows the locations of two photodetectors 3004*a,b* which detect the state of the keratoscope LEDs they are aligned with on the microscope ring of LEDs. In this way, if the keratoscope functionality on the microscope is activated when the OCT scanner adapter 206 is attached to the microscope, the photodetectors 3004*a,b* will detect the illumination of the original microscope LEDs, and responsive to this, the OCT scanner adapter ring replica LEDS 2700 are illuminated. FIG. 31D also shows an example of a flexible circuit 3006 which includes photodetectors 3100 and 3102 (see FIGS. 31C and D described below).

FIG. 30B below shows the top, in other words, the microscope optics carrier facing side, of the OCT scanner adapter housing 208 with the location of the keratoscope LED gasket 3000.

The keratoscope LED gasket assembly 3000 comprises a foam material or similar flexible light impervious material so that a light tight seal against the under carriage of the surgical microscope 200 is formed when the OCT scanner adapter 206 is mounted in place. This prevents illumination from the keratoscope LEDs located in the under carriage of the microscope from being seen by a patient or by users of the microscope.

The keratoscope LED gasket assembly 3000 also comprises strategically placed photodiode detector openings 3004*a,b*. The photodiode detectors are located underneath the LED gasket 3000 and are used to detect both modes of the Keratoscope function when activated on the microscope 200. The keratoscope modes which can be detected in this way comprise the fixation mode in which only the front most facing LED is illuminated as a target for the patient to look at or fixate on and the Keratoscope mode in which the full ring of LEDs is illuminated.

Figure 31C:
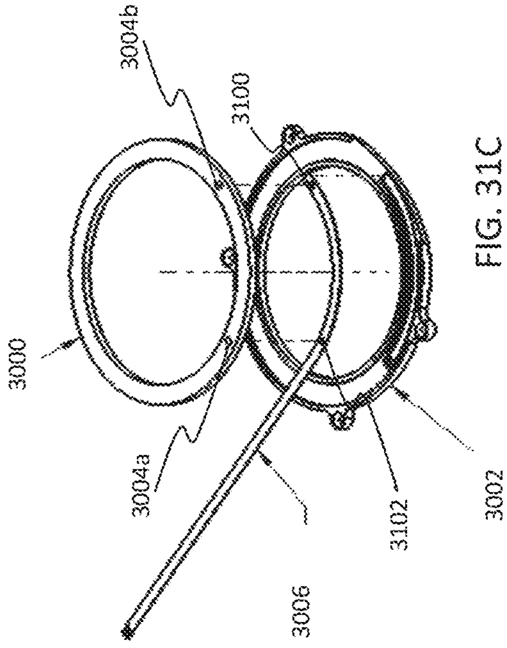
FIG. 31C shows schematically an exploded view of an example of a keratoscope relay comprising the photodiode flex circuit assembly of FIG. 29C according to some embodiments of the present invention.
Figure 31D:
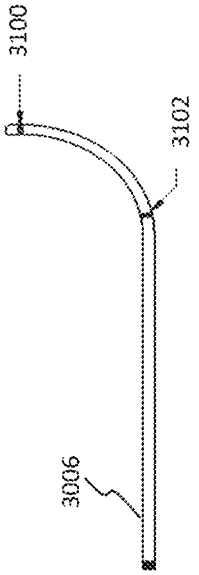
FIG. 31D shows schematically a photodiode flex circuit assembly for an OCT scanner adapter according to some embodiments of the present invention.
Figure 31A:
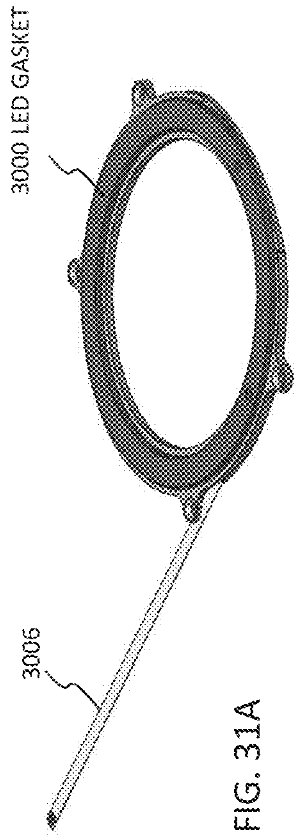
FIG. 31A shows schematically the LED gasket of FIG. 29A for an OCT scanner adapter according to some embodiments of the present invention.
Figure 31B:
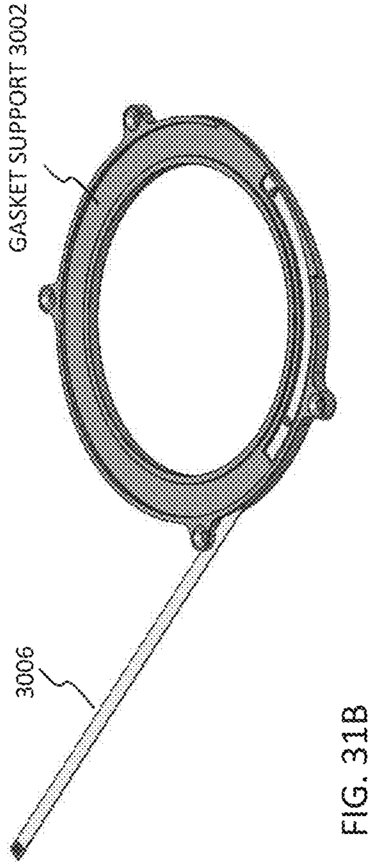
FIG. 31B shows schematically the LED gasket of FIG. 29A removed from the gasket support for an OCT scanner adapter according to some embodiments of the present invention.

FIG. 31A shows schematically an example of the LED gasket 3000 located on the gasket support 3002 with flexible circuit 3006 also shown passing to the ring printed circuit board, pcb, 2800. FIG. 31B shows the LED gasket support 3002 without the LED gasket 3000.

FIGS. 31C and 31D show schematically more detail of the gasket 3000 and the PFC Assembly 3006.

FIG. 31C shows the foam LED gasket 3000 shown in FIG. 31A more clearly in an exploded view to provide an indication of the location of the PFC 3006 which includes the photodiode detectors 3100, 3102 shown also in FIG. 31D in a plan view. FIG. 31C shows how the photodiode detectors 3100, 3102 are aligned with the photodetector holes 3004*a,b* shown in FIG. 30A.

As shown in FIG. 31C, the gasket 3000 includes openings for the photodiode detectors 3100, 3102 used to detect a keratoscope state of the surgical microscope. The photodetectors 3100, 3102 are strategically located under the front most LED of a surgical microscope 200 when OCT scanner adapter 206 is attached for use as an accessory. The one, usually the front-most relative to the microscope user, LED of the keratoscope ring is used as a fixation target when illuminated and the detector 3100 is preferably aligned with this LED. Another, distanced and preferable orthogonally located around the ring LED is only illuminated when the full LED ring is illuminated for the keratoscope function, and the second LED detector 3102 is preferably aligned with this LED.

By using two orthogonally located LEDs, the likelihood of any crosstalk or light leakage from the fixation LED to the second LED which should be illuminated in the advent of Keratoscope utilization is reduced and/or eliminated.

In some embodiments, the LED gasket 3000 and the Photodiode Flex Circuit 3006 are fitted with a double-sided pressure sensitive adhesive. The LED Gasket support or mount 3002 may be injection moulded from an ABS/Polycarbonate blended polymer material in some embodiments.

Figure 32:
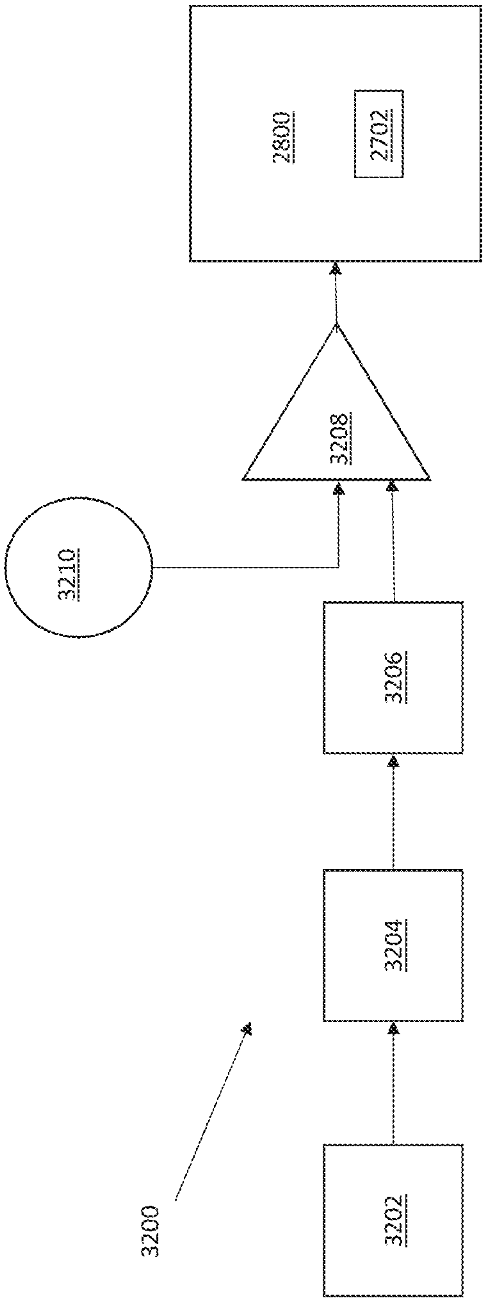
FIG. 32 show a block diagram for a Keratoscope ring LED drive circuit according to some embodiments of the present invention.

FIG. 32 shows a block diagram of an example embodiment of a keratoscope ring-LED drive circuit 3200 used to implement the keratoscope relay functionality of an OCT scanner adapter according to the present invention. The embodiment of the keratoscope drive circuit 3002 shown in FIG. 32 comprises a suitable data interface 3202, for example, an Ethernet interface 3202 which may comprise or be connected to the data port 212. The data interface 3202 is connected to an on-board controller 3204 located in the OCT scanner adapter housing 208. A digital to analogue circuit 3206 provides a suitable threshold setting for a comparator 3208 to compare light levels detected by the photodetectors 3210. Based on the comparison, the operating state of the LEDS 2702 of the ring pcb 2800 can be determined and this is used to actuate a OCT keratoscope relay mechanism of the OCT scanner adapter 206 to provide a replica keratoscope state.

When one or both of the photodiode detectors 3100, 3102 detects light from the primary microscope Keratoscope ring-LED on the microscope, it will activate the secondary ring-LED 2700 in the OCT adapter 206 so that this has the same keratoscope state. Similar circuits are used for both the full ring and the fixation LED photodetectors. The comparator 3208 is used to accommodate for the variability of the coupling of the keratoscope LEDs on the surgical microscope. The digital to analog circuit 3206 is used to set the threshold light intensity for the comparator 3208 which will trigger actuation of the replica ring-LEDs to emulate the microscope keratoscope state. The threshold level is software configurable through the on-board controller 3204 and may be adjusted remotely using the data interface 3202, for example, during installation of the OCT scanner adapter 206 as a microscope accessory if required to ensure a more reliable operation.

Those of ordinary skill in the art will appreciate that a return light path for the OCT beam is also defined by the optical path taken by the OCT beam and that references to the optical path the OCT beam passes through via optics of the OCT scanner and OCT system to scan a sample or tissue area also relate to the return optical path the OCT light will take back to the coupler 104 shown in the OCT system 100 of FIG. 1. It will also be apparent that whilst OCT system 100 shown in FIG. 1 is a spectral domain OCT system, in other words a frequency domain OCT system, the OCT scanner adapter 206 disclosed herein may be adapted for use in other OCT systems in some embodiments.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

It is to be understood that the present disclosure is not limited to the aspects described above and illustrated in the drawings; rather, the skilled person will recognize that many changes and modifications may be made within the scope of the present disclosure. In the drawings and specification, there have been disclosed aspects for purposes of illustration only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A keratoscope relay mechanism for an optical coherence tomography (OCT) scanner adapter configured as a microscope accessory for a microscope, the relay mechanism comprising:

a plurality of light emitting diodes (LEDs) arranged in a ring arrangement, the ring arrangement forming a keratoscope ring replicating an arrangement of a plurality of keratoscope LEDs of the microscope;

a pair of photo detectors, each photo detector aligned with a different keratoscope LED of the plurality of keratoscope LEDs, at least one of the different keratoscope LEDs being activated in a fixation keratoscope mode; and a light sealing gasket comprising two apertures, each respective aperture being aligned with a respective photo detector of the pair of photo detectors, wherein based on one of the pair of photo detectors detecting a keratoscope state of the plurality of keratoscope LEDs, a corresponding keratoscope state of the plurality of LEDs of the keratoscope ring is activated.

2. The keratoscope relay mechanism of claim 1, wherein the keratoscope ring is provided around an objective lens of the OCT scanner adapter which functions as a microscope objective lens when the OCT scanner adapter is attached to the microscope.

3. The keratoscope relay mechanism of claim 1, wherein each respective photo detector of the pair of photo detectors is aligned with a respective one of two orthogonally spaced keratoscope LEDs of the microscope.

4. The keratoscope relay mechanism of claim 1, wherein the corresponding keratoscope state of the LEDs of the keratoscope ring which is activated based on one of the pair of photo detectors detecting the keratoscope state of the plurality of keratoscope LEDs on the microscope comprises one of the following keratoscope states:

a keratoscope off-state;

the keratoscope fixation mode state;

a keratoscope full illumination state;

another type of keratoscope on-state.

5. An OCT scanner adapter configured as a microscope accessory for a microscope, the OCT scanner adapter comprising a keratoscope relay mechanism, the keratoscope relay mechanism comprising:

a plurality of light emitting diodes (LEDs) arranged in a ring arrangement, the ring arrangement forming a keratoscope ring replicating an arrangement of a plurality of keratoscope LEDs of the microscope;

a pair of photo detectors, each photo detector aligned with a different keratoscope LED of the plurality of keratoscope LEDs, at least one of the different keratoscope LEDs being activated in a fixation keratoscope mode; and a light sealing gasket comprising two apertures, each respective aperture being aligned with a respective photo detector of the pair of photo detectors, wherein based on one of the pair of photo detectors detecting a keratoscope state of the keratoscope LEDs, a corresponding keratoscope state of the plurality of LEDs of the keratoscope ring is activated.

6. The OCT scanner adapter of claim 5, wherein:

the plurality of LEDs arranged in the ring arrangement is arranged around an objective lens of the OCT scanner adapter, the plurality of keratoscope LEDs is arranged around an objective lens of the microscope;

the OCT scanner adapter further comprising:

a pair of LED light detectors located at different points around a keratoscope ring; and a gasket which prevents keratoscope LED light from the microscope entering the objective lens of the OCT scanner adapter, the gasket comprising two gasket apertures, each gasket aperture aligned with a respective LED light detector the pair of LED light detectors via which the keratoscope LED light is detectable by the respective LED light detector of the pair of LED light detectors, wherein based on the keratoscope state of the keratoscope LEDs being detected by the one of the pair of photo detectors, the corresponding keratoscope state of the plurality of LEDs of the keratoscope ring of the OCT scanner adapter is activated.

7. The OCT scanner adapter of claim 5, wherein the OCT adapter comprises:

a housing; and a plurality of optical components contained in the housing, the plurality of optical components comprising:

a scanning mirror assembly;

a folding mirror;

a beam splitter; and an objective lens, wherein the beam splitter and the folding mirror are arranged to direct a scanning light beam emerging from the scanning mirror assembly through the objective lens offset from a central optical axis of the objective lens.

8. The OCT scanner adapter of claim 7, wherein the objective lens is configured to be collinear with an optical channel of the microscope when the OCT scanner adapter is attached as an accessory to an undercarriage of the microscope.

9. The OCT scanner adapter of claim 7, wherein the plurality of optical components are housed within the housing, the housing having a height less than 40 mm.

10. The OCT scanner adapter of claim 7, wherein the plurality of optical components are housed within the housing, the housing having a height of about 36 mm.

11. The OCT scanner adapter of claim 5, wherein the OCT scanner adapter is further configured as an accessory for a surgical microscope used for eye surgery.

* * * * *